(12) United States Patent
Sankey

(10) Patent No.: US 11,683,183 B2
(45) Date of Patent: Jun. 20, 2023

(54) AUTONOMOUSLY GENERATED PORTABLE ACCOUNTS

(71) Applicant: Google LLC, Mountain View, CA (US)

(72) Inventor: Jody Sankey, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 118 days.

(21) Appl. No.: 16/948,928

(22) Filed: Oct. 6, 2020

(65) Prior Publication Data
US 2021/0203661 A1    Jul. 1, 2021

Related U.S. Application Data

(60) Provisional application No. 62/955,845, filed on Dec. 31, 2019, provisional application No. 62/955,849, filed on Dec. 31, 2019.

(51) Int. Cl.
*H04L 9/32*       (2006.01)
*G06Q 30/018*     (2023.01)
(Continued)

(52) U.S. Cl.
CPC .......... *H04L 9/3247* (2013.01); *G06F 16/245* (2019.01); *G06F 16/27* (2019.01); *G06F 21/602* (2013.01); *G06Q 30/0185* (2013.01); *H04L 9/0637* (2013.01); *H04L 9/30* (2013.01); *H04L 9/3239* (2013.01); *H04L 9/3297* (2013.01);
(Continued)

(58) Field of Classification Search
CPC ....... H04L 9/3247; H04L 9/0637; H04L 9/30; H04L 9/3239; H04L 9/3297; H04L 63/101; H04L 63/102; G06F 16/245; G06F 16/27; G06F 21/602; G06Q 30/0185;
(Continued)

(56) References Cited

U.S. PATENT DOCUMENTS 10,489,597 B2   11/2019   Safford et al.
10,666,426 B2    5/2020   Roets
(Continued)

FOREIGN PATENT DOCUMENTS

WO   2018165940 A1   9/2018
WO   2019148130 A1   8/2019

OTHER PUBLICATIONS

International Search Report and Written Opinion for PCT Application No. PCT/US2020/070763, dated Mar. 30, 2021, 24 pages.
(Continued)

*Primary Examiner* — Khoi V Le
(74) *Attorney, Agent, or Firm* — Brake Hughes Bellermann LLP

(57) ABSTRACT

Systems and methods are described that include a plurality of devices triggered to be configured with a portable user account to synchronize account events to a distributed log. The plurality of devices includes at least one device configured to trigger a query to determine access rights for the at least one other device. In response to receiving an approval response to the query, the at least one device assigns a provision status to the at least one other device, provides, for the at least one other device, access to at least a subset of the portable user account according to the assigned provision status, and updates the distributed log to include the at least one other device based on the provision status.

19 Claims, 55 Drawing Sheets

(51) Int. Cl.
    *H04L 9/30*         (2006.01)
    *H04L 9/06*         (2006.01)
    *G06F 16/27*       (2019.01)
    *G06F 16/245*      (2019.01)
    *G06F 21/60*       (2013.01)
    *H04L 9/40*         (2022.01)
    *G06Q 50/00*       (2012.01)
    *G06Q 50/18*       (2012.01)
    *G06Q 50/26*       (2012.01)
    *H04L 9/00*         (2022.01)

(52) U.S. Cl.
    CPC .......... *H04L 63/101* (2013.01); *H04L 63/102* (2013.01); *G06Q 50/01* (2013.01); *G06Q 50/186* (2013.01); *G06Q 50/265* (2013.01); *G06Q 2220/00* (2013.01); *H04L 9/50* (2022.05)

(58) Field of Classification Search
    CPC .... G06Q 50/01; G06Q 50/186; G06Q 50/265; G06Q 2220/00
    See application file for complete search history.

(56) References Cited

U.S. PATENT DOCUMENTS

| | | | |
|---|---|---|---|
| 10,708,070 | B2 | 7/2020 | Fallah et al. |
| 10,756,906 | B2 | 8/2020 | Toth |
| 10,867,057 | B1 | 12/2020 | Knas et al. |
| 11,443,062 | B2 | 9/2022 | Latka et al. |
| 2007/0244811 | A1 | 10/2007 | Tumminaro |
| 2009/0038005 | A1 | 2/2009 | Howarth |
| 2010/0115266 | A1 | 5/2010 | Guo et al. |
| 2016/0142772 | A1 | 5/2016 | Pinder et al. |
| 2016/0246970 | A1* | 8/2016 | Otero .................. G06F 21/602 |
| 2016/0335628 | A1 | 11/2016 | Weigold |
| 2017/0222814 | A1 | 8/2017 | Oberhauser et al. |
| 2018/0254898 | A1 | 9/2018 | Sprague et al. |
| 2018/0288063 | A1* | 10/2018 | Koottayi ................. G06F 15/76 |
| 2019/0042601 | A1* | 2/2019 | Ashe .................. G06F 16/9535 |
| 2019/0141048 | A1* | 5/2019 | Fallah ................... H04L 63/102 |
| 2019/0163912 | A1 | 5/2019 | Kumar et al. |
| 2019/0253431 | A1 | 8/2019 | Atanda |
| 2019/0281066 | A1 | 9/2019 | Simons |
| 2019/0332790 | A1* | 10/2019 | Kukehalli Subramanya ............... G06F 21/33 |
| 2019/0333054 | A1 | 10/2019 | Cona et al. |
| 2019/0370847 | A1 | 12/2019 | Khan |
| 2020/0106767 | A1 | 4/2020 | Robinson et al. |
| 2020/0151350 | A1* | 5/2020 | Irazabal ............. G06F 16/2308 |
| 2020/0311298 | A1* | 10/2020 | Dunjic ................ H04L 63/1433 |
| 2021/0021424 | A1 | 1/2021 | Punal et al. |
| 2021/0042764 | A1* | 2/2021 | Rungta ................ H04L 63/0853 |
| 2021/0049611 | A1* | 2/2021 | Yang ...................... H04L 67/02 |
| 2021/0084024 | A1 | 3/2021 | Sadayoshi et al. |
| 2021/0141909 | A1 | 5/2021 | Zhai et al. |

OTHER PUBLICATIONS

Invitation to Pay Additional Fees and Partial International Search for PCT Application No. PCT/US2020/070763, dated Feb. 8, 2021, 19 pages.

Chen, et al., "Efficient, DoS-resistant Consensus For Permissioned Blockchains", arXiv:1808.02252v3, Aug. 7, 2020, 18 pages.

Extended European Search Report for European Application No. 23151408.4, dated Apr. 14, 2023, 8 pages.

\* cited by examiner

FIG. 11A

Inner Account Block pending Deletion ⌐1100

| | |
|---|---|
| ID_account | 802 |
| t[block_creation] | 804 |
| H(previous_inner_account_block) | 806 1102 |
| t[account_deletion] | |
| 808 KU₁ | 812 t[create] | 816 t[revoke] | E[KU₁]{K_inner} 820 |
| 810 KU₂ | 814 t[create] | 818 t[revoke] | E[KU₂]{K_inner} 822 |
| E[K_inner]{inner_device_secrets, outer_seed} 824 |
| 1002 KU₁ | 1006 t[end]_k₂ | E[K_r₁]{ID_recovery1, ID_escrow1} 1008 | E[KU₁]{K_r₁} 1010 |
| 1004 KU₂ | 1012 t[start] | E[K_r₂]{ID_recovery2, ID_escrow2} 1014 | E[KU₂]{K_r₂} 1016 |
| H(inner_account_block) 1104 |
| block_author: KU₂ 828 | S[KU₂]{H(block)} 1106 |

FIG. 11B

Inner Account Block after Deletion ⌐1110

| | |
|---|---|
| ID_account | 802 |
| t[block_creation] | 804 |
| H(previous_inner_account_block) | 806 1102 |
| t[account_deletion] | |
| H(inner_account_block) 1112 |
| block_author: KU₂ 828 | S[KR₂]{H(block)} 1114 |

FIG. 11C

Outer Account Block after Deletion ⌐1116

| | |
|---|---|
| ID_account | 802 |
| nonce | 1118 |
| H(inner_account_block) 1120 |
| H_outer_account_block 1122 |
| block_author: KU₂ 828 | S[KR₂]{H(block)} 1124 |

Transparent Group Block

| | |
|---|---|
| ID$_{group}$ 1302 | |
| t[block_creation] 1304 | |
| H(previous_group_block) 1306 | |
| admin: ID$_{a1}$ 1308 | E[KU$_{a1}$](KR$_{group}$) 1318 |
| admin: ID$_{gt}$ 1310 | E[KU$_{g1}$](KR$_{group}$) 1320 |
| member: ID$_{a2}$ 1312 | E[KU$_{a2}$](KR$_{group}$) 1322 |
| member: ID$_{g2}$ 1314 | E[KU$_{g2}$](KR$_{group}$) 1324 |
| member: ID$_{a3}$ 1316 | E[KU$_{a3}$](KR$_{group}$) 1326 |
| KU$_{group}$ 1328 | |
| H(group_block) 1340 | |
| block_author KU$_j$ 1342 | S[KR$_j$](H(block)) 1344 |

Inner Account Block with Admin

| | | |
|---|---|---|
| ID$_{account}$ 1202 | | |
| t[block_creation] 1204 | | |
| H(previous_inner_account_block) 1206 | | |
| 1208 ID$_{ed}$ | 1210 t[start]$_{adm}$ | 1212 t[end]$_{adm}$ | 1214 E[KU$_{adm}$](K$_{inner}$) |
| 1216 KU$_{i1}$ | 1220 t[create]$_{i1}$ | 1224 t[revoke]$_{i1}$ | 1232 E[KU$_{i1}$](K$_{inner}$) |
| 1218 KU$_{i2}$ | 1222 t[create]$_{i2}$ | 1226 t[revoke]$_{i2}$ | 1234 E[KU$_{i2}$](K$_{inner}$) |
| E[K$_{inner}$](inner_device_secrets, outer_seed) 1230 | | |
| 1236 KU$_{r1}$ | 1240 t[end]$_{r2}$ | | E[KU$_{r1}$](K$_{r1}$) 1242 |
| 1238 KU$_{r2}$ | 1246 t[start]$_{r2}$ | 1248 t[end]$_{r2}$ | E[KU$_{r2}$](K$_{r1}$) 1244 |
| E[K$_{r1}$](ID$_{escrow1}$, ID$_{escrow2}$) 1250 | | |
| E[K$_{r2}$](ID$_{escrow2}$, ID$_{escrow3}$) 1252 | | |
| H(inner_account_block) 1254 | | |
| block_author KU$_j$ | S[KR$_j$](H(block)) 1256 |

AUTONOMOUSLY GENERATED PORTABLE ACCOUNTS

CROSS REFERENCE TO RELATED APPLICATIONS

This application claims priority to U.S. Provisional Patent Application No. 62/955,845, filed on Dec. 31, 2019, entitled "AUTONOMOUSLY GENERATED PORTABLE ACCOUNTS," and U.S. Provisional Patent Application No. 62/955,849, filed on Dec. 31, 2019, entitled "SECURE LOG SCHEME FOR PORTABLE ACCOUNTS," the disclosures of which are incorporated herein by reference in their entirety.

This application is also related to U.S. application Ser. No. 16/948,927, filed on Oct. 6, 2020, the disclosure of which is incorporated by reference herein in its entirety.

BACKGROUND

Traditional user accounts are generally owned and maintained by an account provider (e.g., a service provider) that provides an Internet-based service. Such user accounts may be generated by the service provider in response to receiving a request for an account from the user. The user account may be personalized by the user, but remains owned and maintained by the service provider. The service provider may also be responsible for providing security of information associated with the user accounts.

SUMMARY

The systems and methods described herein may be used to generate secure self-sovereign identity (SSI) portable user accounts to operate on any number of computing devices (e.g., electronic devices). The SSI portable user accounts are, in general, owned, operated, and otherwise controlled by an individual user without using an intervening administrative authority (e.g., a service provider, an account provider, etc.). In some implementations, the computing devices may operate within a distributed ambient computing environment, which may utilize computing devices and/or other electronic devices as interchangeable modules of a virtual computing environment that can use the portable user account to access other user-owned devices.

The systems and methods described herein can be used to configure the various electronic devices with a portable user account that is cryptographically secure while utilizing transparently logged data (e.g., blockchain technology, immutable logs, ledgers, distributed logs, transparency logs, etc.) as well as various user-configurable recovery options for account access. Such data may be utilized and accessed based on user configured permissions associated with the portable user account.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect a computer-implemented method is described that includes in response to receiving a request, at a device of a plurality of devices configured to synchronize account events associated with a portable user account to a distributed log, to access to the portable user account, triggering generation and submission of a query to determine access rights for the at least one other device. The request may include information associated with the at least one other device. Such information associated with the at least one other device includes at least one unique access key and an author identifier corresponding to at least one of the plurality of devices that is provisioned as an inner entity within the distributed log.

In response to receiving an approval response to the query, the method may include assigning a provision status to the at least one other device, the provision status indicating whether the at least one other device is assigned as an inner entity or as an outer entity for the portable user account, providing, for the at least one other device, access to at least a subset of the portable user account according to the assigned provision status, and updating the distributed log to include the at least one other device based on the provision status.

Implementations may include any or all of the following aspects. In some implementations, the method may include denying access to the portable user account for the at least one other device and updating the distributed log to include an event corresponding to the triggered query, in response to receiving a disapproval response to the query.

In some implementations, the devices in the plurality of devices that are provisioned as an inner entities are configured to add additional devices, remove any of the devices provisioned for the portable user account, the addition and removal being time delayed according to a policy associated with the portable user account. In some implementations, the devices in the plurality of devices provisioned as outer entities are configured to self-revoke from the portable user account.

In some implementations, the portable user account is provisioned on a mobile device configured as an inner entity where each inner entity being capable of maintaining the portable user account in combination with other provisioned inner entities in a local log configured to synchronize with the distributed log using distributed log transactions. In some implementations, the portable user account is a self-sovereign identity account.

In some implementations, the method may further include generating a recovery account for the portable user account where the recovery account is generated as a recovery block in the distributed log. The recovery block may include at least a timestamp at which the recovery account becomes valid, an identity of a service provider configured to provide access to the portable user account, and an encrypted key readable both by devices provisioned as inner entities and by the service provider during recovery In response to detecting use of the recovery account, the method may include generating a recovery account access event by generating a new block for the distributed log and appending the new block in the distributed log to memorialize the recovery account access event in the distributed log.

In some implementations, the portable user account is associated with a plurality of personae and each of the plurality of personae are configured to obfuscate an identity of a user associated with the portable user account and include customized data for the portable user account that disassociates others of the plurality of personae.

In a second general aspect, a computer-implemented method is described that includes triggering configuration of a plurality of devices with a portable user account to synchronize account events to a distributed log, receiving by at least one device of the plurality of devices and from at least one other device, a request to access the portable user account, the request including information associated with the at least one other device, triggering generation and submission of a query to determine access rights for the at least one other device. In response to receiving an approval response to the query, the method further includes assigning a provision status to the at least one other device, the provision status indicating whether the at least one other device is assigned as an inner entity or as an outer entity for the portable user account, providing, for the at least one other device, access to at least a subset of the portable user account according to the assigned provision status, and updating the distributed log to include the at least one other device based on the provision status. In some implementations, the information associated with the at least one other device includes at least one unique access key and an author identifier corresponding to at least one of the plurality of devices that is provisioned as an inner entity within the distributed log.

In some implementations, the method further includes in response to receiving a disapproval response to the query, denying access to the portable user account for the at least one other device, and updating the distributed log to include an event corresponding to the triggered query. In some implementations, the devices in the plurality of devices that are provisioned as an inner entities are configured to add additional devices, remove any of the devices provisioned for the portable user account, the addition and removal being time delayed according to a policy associated with the portable user account, and the devices in the plurality of devices provisioned as outer entities are configured to self-revoke from the portable user account.

In some implementations, the portable user account is provisioned on a mobile device configured as an inner entity, each inner entity being capable of maintaining the portable user account in combination with other provisioned inner entities in a local log configured to synchronize with the distributed log using distributed log transactions, the portable user account being a self-sovereign identity account. In some implementations, the method further includes generating a recovery account for the portable user account, the recovery account being generated as a recovery block in the distributed log, the recovery block including at least a timestamp at which the recovery account becomes valid, an identity of a service provider configured to provide access to the portable user account, and an encrypted key readable both by devices provisioned as inner entities and by the service provider during recovery and in response to detecting use of the recovery account, generating a recovery account access event by generating a new block for the distributed log and appending the new block in the distributed log to memorialize the recovery account access event in the distributed log.

In some implementations, the portable user account is associated with a plurality of personae. Each of the plurality of personae may be configured to obfuscate an identity of a user associated with the portable user account and include customized data for the portable user account that disassociates others of the plurality of personae.

In a third general aspect, a non-transitory computer-readable medium is described that includes at least one processor and a memory storing instructions that, when executed by the at least one processor, cause the at least one processor to perform operations comprising generating a portable user account on an electronic device, the portable user account configured to store account data, grant access rights to devices provisioned for the portable user account, and synchronize events associated with the portable user account to a distributed log capable of negotiating transactions corresponding to the events. In response to receiving, at a provisioned device and from a non-provisioned device, a request to access the portable user account, the request including information associated with the non-provisioned device, triggering a query to determine access rights for the non-provisioned device. In response to receiving an approval response to the query, the operations may include assigning a provision status to the non-provisioned device, the provision status assigning the non-provisioned device a provision status as an inner entity or as an outer entity for the portable user account, providing, for the non-provisioned device, access to at least a subset of the portable user account according to the assigned provision status, and updating the distributed log to include the non-provisioned device as a provisioned device for the portable user account based on the assigned provision status.

In some implementations, the operations further include in response to receiving a disapproval response to the query, denying access to the portable user account for the non-provisioned device, and updating the distributed log to include an event corresponding to the triggered query.

In some implementations, the portable user account is provisioned on a mobile device configured as an inner entity, each inner entity being capable of maintaining the portable user account in combination with other provisioned inner entities in a local log configured to synchronize with the distributed log using distributed log transactions, the portable user account being a self-sovereign identity account.

In some implementations, the operations further include generating, using the electronic device, a recovery account for the portable user account, the recovery account being generated as a recovery block in the distributed log, the recovery block including at least: a timestamp at which the recovery account becomes valid, an identity of a service provider configured to provide access to the portable user account, and an encrypted key readable by devices provisioned as inner entities. In response to detecting use of the recovery account, generating a recovery account access event by generating a new event for the distributed log and appending the new event in the distributed log to memorialize the recovery account access event.

Implementations of the described techniques may include hardware, a method or process, and/or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIGS. 11A-11C illustrate block diagrams of example account blocks for use with a portable user account, in accordance with implementations described herein.

FIG. 12 is a block diagram of an example inner account block for use with an administrator of a portable user account, in accordance with implementations described herein.

FIG. 13 is a block diagram of an example transparent group block for use with a portable user account, in accordance with implementations described herein.

The use of similar or identical reference numbers in the various drawings is intended to indicate the presence of a similar or identical element or feature.

DETAILED DESCRIPTION

Figure 1:
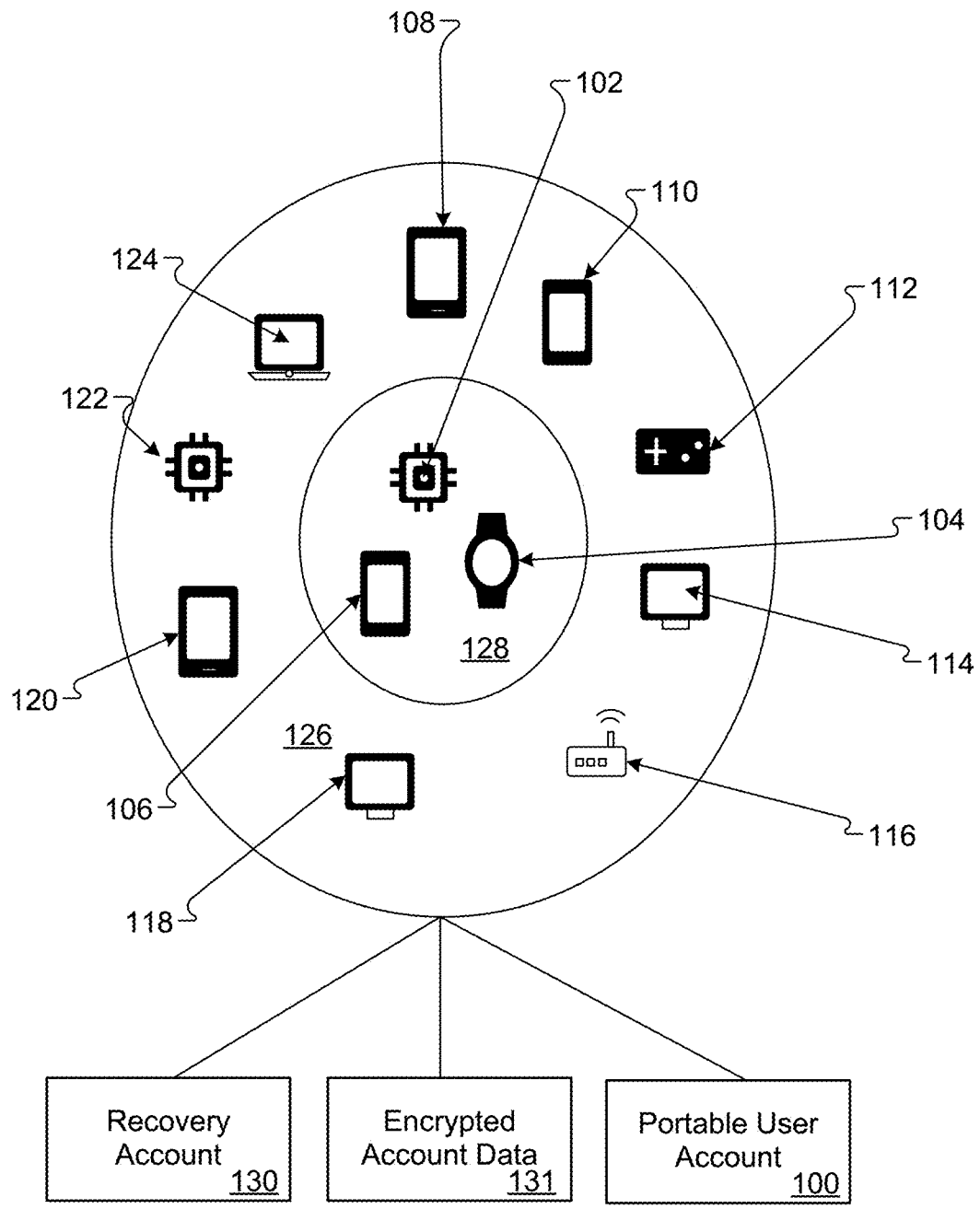
FIG. 1 is a block diagram illustrating an example set of computing devices that may be granted access to a self-sovereign identity (SSI) portable user account, in accordance with implementations described herein.

This document describes systems and methods for self-sovereign identity (SSI) account generation, SSI account security schemes, and SSI account management to allow for such accounts to be portable and shareable from device to device for users and associated user personas. The systems and methods described herein may generate secure portable user accounts to operate on any number of computing devices (e.g., electronic devices). The portable user accounts are, in general, owned, operated, and/or otherwise controlled by an individual user without using an intervening administrative authority (e.g., a service provider, an account provider, etc.) to provide the portable user accounts. For example, the portable user accounts may be SSI accounts configured by particular users on devices owned by the users and such accounts may not be accessed by any other person or entity other than the user unless the user chooses to allow access. In some implementations, the portable user accounts described herein may be generated autonomously by an electronic device and may be uniquely identified using a random string, as will be described in detail below. A user may use and/or access apps, services, and data from many different organizations through the portable user account without having to rely on a service provider or account provider to manage, access, and/or recover the portable user account.

Conventional accounts that utilize administrative authorities to provide user accounts may not provide the privacy nor the autonomy for an individual user to maintain private data. Such authorities may provide some security and authentication services, but may still share personal user information with many different databases when the user wishes to access new services and applications using the conventional accounts. Furthermore, conventional accounts utilize service providers to verify a user login to each device, and with each login, additional information may be sent from a device to the administrative authority.

Accordingly, the systems and methods described herein may solve a technical challenge of securely controlling and managing portable user accounts amongst a number of devices. The systems and methods described herein may solve such a technical challenge (e.g., problem) by enabling portable user accounts to be generated, configured, and secured by a user and independently of any administrative organization (e.g., service provider, account provider, etc.). Devices can be provisioned for use with such portable user accounts and the systems described herein can effectively provide improved account security while allowing the user to maintain the roles of account management, device provisioning, and account recovery. Aspects of the systems and methods described herein may allow portable user accounts to be easily distributed among a number of devices without unnecessarily compromising security. Aspects of the present disclosure may increase the security of portable user accounts and thereby increase the security of devices on which the accounts are provisioned.

One technical solution provided by the systems described herein may include providing secure digital identity (e.g., account) management without intervening administrative authorities. The described systems and methods may provide a mechanism to enable a user to autonomously generate and control a portable user account (e.g., identity) on several electronic devices according to user-configured permissions. Such an account may be portable amongst any number of devices that the user chooses to provision account data upon. For example, the systems described herein may protect portable user accounts using public key cryptography and distributed log technology (e.g., blockchain, transparency ledger, distributed ledger, distributed log, distributed storage, etc.) in which each cryptographically generated block of account information is verified with ancestor blocks previously generated by one or more devices utilizing the portable user account. For example, the portable user account may be configured to utilize a distributed log (e.g., a cryptographic ledger/log) to ensure that any entity with access to a block of account information and all ancestor blocks can verify the legitimacy of a newly generated account block of information. The cryptographic storage may be used to support publishing of immutable transactions (e.g., events) for devices (or between devices) accessing the portable user account.

As used herein, a portable user account may represent a human user identity within a particular user environment (e.g., a set of user devices operating using the portable user account). The user identity may be associated with identity aspects including, but not limited to biometric data, account secrets known to the user, usernames and personae names, activities, etc. In some implementations, after initial portable user account setup, the user may choose to use a centralized organization and/or account provider to help manage the account. The user may also choose to revert to managing the account directly at a future time. For example, the user may change account services and/or affiliations without losing the account or associated account data. This may ensure that a centralized organization and/or account provider may not be capable of locking a user out of the portable user account.

In some implementations, the devices described herein that utilize the portable user account may include any computer that implements the user identity aspects associated with a particular portable user account. For example, the devices may operate, provision, and share data with other user-owned devices using a particular operating system to execute computing tasks associated with the user identity aspects of the portable user account. In some implementations, the devices may operate, provision, and share data with other user-owned devices using an application that interfaces with the user identity aspects of the portable user account.

In general, each device associated with a portable user account may be provisioned as an inner entity or may be provisioned as an outer entity. An inner entity may represent a device with elevated privileges over the portable user account. For example, inner entities may represent devices that can access and/or change all available data for the portable user account. In addition, inner entities may provision the portable user account on other devices and may revoke access to the account for other devices whereas an outer entity may not provision devices for use with the portable user account.

An outer entity may represent a device with fewer privileges than an inner entity, with respect to the portable user account. For example, an outer entity may revoke portable user account access for itself, but may not control which other devices have access to the portable user account. An outer entity may access the portable user account data, but the access may be limited. For example, some outer entities may be configured to access one user persona associated with the account.

In addition, various account recovery options may be configured by the user based on a number of devices and based on the provisioned devices being inner entities or outer entities. The recovery options may enable the user to use one or more devices to recover lost or stolen device data or account data, or to recover otherwise infiltrated information regarding a portable user account. One example recovery option may include using a recovery service provider to provide a recovery account associated with the portable user account. The recovery account may function as a virtual device associated with the portable user account. In some implementations, the recovery account can be capable of adding new devices to the portable user account and capable of revoking existing devices associated with the portable user account. In some implementations, the recovery account may not have direct access to the data stored for the portable user account. With a recovery account, a user may gain access to the portable user account on a new device. Such a recovery account may be configured to be altered from an inner entity, but may be associated with an imposed time delay for implementing further account and/or device changes. This can ensure that an attacker (e.g., thief, account infiltrator, etc.) that gains temporary access to the portable user account may not immediately add another device (e.g., an attacker-owned device) and attacker-owned recovery account to gain more power over the portable user account.

In some implementations, a recovery account may be configured as another portable user account that has a defined relationship with another portable user account. For example, a first portable user account may have a defined relationship with a second portable user account. The second portable user account may function as a recovery account for the first portable user account. For example, the first portable user account may be owned by a particular user while the second portable user account may be owned by a guardian of the particular user. Such relationships may be used to grant account addition and/or revocation power for particular devices.

The systems and methods described herein may configure portable user accounts that function as identities for users to access a number of unique operating systems (on different devices) and gain access to User Interface (UI) content, data, audio content, etc., on electronic devices associated with the portable user accounts. Each device may include (or have access to) an operating system and/or application that may operate to configure a number of policies and/or preferences for a portable user account. The portable user account may access and share data from a distributed log (e.g., transparency log) on each device associated with the account (and/or a device configured for the account) to obtain information regarding device states, past activities, etc. The distributed storage may be configured to retain device data and/or user data, which remains cryptographically signed by the portable user account to ensure that such data is not compromised. For example, a user can set policies and preferences targeted to the account and/or devices associated with the account. The policies may apply to an entire portable user account, a specific device, a location of a device, specific times, etc.

In general, one technical problem that may arise when attempting to share user accounts amongst devices may include device incompatibilities at the software, hardware, and/or firmware level. For example, the various electronic devices owned and/or accessed by a user throughout a day are generally not configurable to ambiently function together as a single computer. Such devices typically operate using different hard coded operating systems that may not be compatible amongst all devices. This may present a technical challenge in that it may be complicated, time consuming, or improbable for a user to synchronize account data, devices, in general, and also difficult to synchronize communication and/or policies when devices are added or revoked for the portable user account.

The systems and methods described herein provide a technical solution to the technical problem by enabling communication amongst electronic devices and to allow for distribution and sharing of portable user account data in order to provide convenient execution of tasks requested by users. For example, an underlying operating system (O/S) executing on one or more of the devices associated with a particular portable user account, for example, can be configured to log events in a transparent distributed log which enables secure access to devices and account data while allowing transparent view of such access to the account owner.

The technical solutions described herein may provide a technical effect of improved security, improved security management, and/or improved decision handling amongst devices accessing portable user accounts. The systems and methods described herein may also provide a way for a user to configure a portable user account and to select amongst which devices will be allowed to access data associated with or stored within a portable user account.

FIG. 1 is a block diagram illustrating an example set of computing devices that may be granted access to a self-sovereign identity (SSI) portable user account 100, in accordance with implementations described herein. In the example account 100, a user (not shown) may have provisioned a number of devices as inner entities or outer entities. Provisioning may represent a process of establishing account credentials on a device (even limited or temporary ones).

In general, devices associated with a particular portable user account may include, but are not limited to mobile devices, smart watch devices, laptop devices, tablet devices, door lock devices, security devices, camera devices, smoke detector devices, occupancy sensor devices, thermostat devices, Internet connected speakers, workstations, cars, televisions, video game consoles, assistant and/or hub devices, audio/microphone devices, etc.

As shown, a number of provisioned electronic devices 102, 104, 106, 108, 110, 112, 114, 116, 118, 120, 122, and 124 are shown within an outer circle 126 or an inner circle 128. The provisioned electronic devices 102-124 may be devices that are being provided at least some access to account data associated with the portable user account 100. The devices 102, 104, and 106 within inner circle 128 represent provisioned inner entities that may provide or revoke account 100 access to other devices. The devices 108-124 in outer circle 126 represent provisioned outer entities with limited control over other devices and/or account 100 data, for example.

An inner entity (e.g., device) that has been provisioned for at least a particular time period (e.g., 2 days, 10 days, 14 days, 1 month, etc.) represents a tenured inner entity (e.g., inner device). The tenure time period may be user selected and/or configured based on a default account configuration. An outer entity may represent a device in which the user(s) associated with the portable user account 100 may have temporary or specialized access to. For example, public devices/kiosks, televisions or computers in public spaces, flight entertainment systems, rental cars may be configured as outer entities in which the user may access some account data to gain access to entertainment content, email, for example. By placing such temporary and specialized devices in their own category (i.e., as outer entities in outer circle 126) and ensuring that such devices do not have access to cryptographic key material that may be used for inner entities, for example, the portable user account 100 may remain protected and safe against attacks including, but not limited to, device theft, software vulnerabilities, implementation bugs, and user mistakes (such as forgetting to sign out of a device).

In some implementations, the portable user account 100 may be configured to allow an inner entity to read and write the data in the portable user account 100, including the data of personae associated with the account 100. The portable user account 100 may be configured to allow an inner entity to provision new inner entities for the account. The portable user account 100 may be configured to allow an inner entity to provision new outer entities for the account and may allow setting the subset of data within the account that the outer entities may access. The portable user account 100 may be configured to allow an inner entity to revoke itself (i.e., remove itself from provisioned devices). The portable user account 100 may be configured to allow an inner entity to revoke other provisioned devices. In general, the revocation of inner entities is constrained to allow tenured inner entities to delete other tenured inner entities. Inner entities may be configured to perform any combination of the above example actions.

In some implementations, provisioning devices, providing device tenure, or revoking devices may be based on privileges associated with a rate limit (e.g., minimum time threshold). The rate limit may ensure that an inner or outer entity is incapable of quickly changing a particular amount of account data and device access to limit the impact of theft or attack on the portable user account associated with the particular device. For example, to prevent disablement of all user owned devices associated with the account, the rate limit for deprovisioning (e.g., revoking) devices may be on the order of days rather than hours or minutes. This can allow the owner of the devices to take action for the portable user account 100, for example, in the event of a theft of one or more devices with access to the account 100.

In some implementations, a smart watch device or a mobile phone device may be configured as an inner entity since such devices may be carried with the user on a regular basis. However, the device type and/or hardware associated with the device does not determine and/or indicate whether the device is an inner entity or an outer entity. Instead, the user associated with the portable user account may configure and control whether a device is an inner entity or an outer entity. For example, a user may be associated with a first tablet residing in a bedroom of a home. The first tablet may be configured with the portable user account as an inner entity based on the location being less likely prone to device loss or theft. The same user may be associated with a second tablet that resides in an office of a work location. The second tablet may be configured with the portable user account as an outer entity based on being more prone to theft in a public work location, for example.

In some implementations, particular devices may be associated with multiple portable user accounts. In such examples, a device may be an inner entity for one account (or user persona) while the same device is configured as an outer entity for another account (or user persona). Thus, there may be no global hardware configuration that indicates whether a device may be an inner entity (or an outer entity).

In some implementations, the portable user account 100 may be configured to allow an inner entity to add, remove, or alter the recovery account 130, for example. Any changes to the recovery account 130 may be configured to be delayed, and not take effect for a particular time period after the changes are requested. A pending change may be abandoned at any point before the change takes effect. In some implementations, the portable user account 100 may be configured to allow an inner entity to delete the portable user account 100. This deletion may be delayed ensuring that the deletion does not occur for a time period after the deletion was requested. A pending deletion may be abandoned at any point before the deletion takes effect.

Each account 100 may be associated with (and/or include) encrypted account data 131. Encrypted account data 131 represents data that is stored about a particular portable user account. The data is stored in encrypted form inside a distributed log (e.g., blockchain) to enable the user to use the particular portable user account with any number of electronic devices.

As for outer entities (e.g., devices 108-124), each device 108-124 may be configured to read and write some subset of the data in the portable user account 100. The subset may be fixed at the time the particular outer entity is provisioned. In addition, each outer entity 108-124 may revoke itself. In some implementations, outer entities 108-124 may represent devices that are used for a short time or a specialized purpose and as such, constraining outer entity access to the portable user account 100 may reflect this usage to limit the attack on the account 100. For example, a user may wish to configure a family persona with the portable user account 100. If the user wishes to access the family persona on a hotel television, there is no need to transfer the log key material for any other personae configured for the account 100. Similar constraints could be imagined along different axes, such as allowing access to data for particular components or particular service provider accounts. Outer entities may be configured to perform any combination of the above example actions.

The portable user account 100 may have access to one or more recovery accounts 130. In general, recovery accounts may be configured to provision new inner entities, subject to the user providing an authentication factor controlled by the user, such as a PIN, passphrase, or a security key and/or such provisioning being recorded in an immutable log, such as a key distributed log or a blockchain. Such limits may ensure that a malicious recovery provider is unable to provision new devices without the user providing this factor (i.e., which allows end-to-end encryption for the account 100) or that a recovery provider is unable to conceal its malicious actions.

Although a few different devices are shown in FIG. 1, any number of computing devices (e.g., ambient devices, personal computing devices, electronic devices, etc.) may be configured to operate using the accounts, systems and methods described herein. The devices (e.g., electronic devices and/or computing devices) described herein may include, but are not limited to, smart displays, televisions, mobile devices, tablets, computers, game controllers, lights, alarm clocks, electronic assistants, smart watches, smart phones, thermostats, appliances, fans, switches, sprinklers, air fresheners, blinds, awnings, shutters, curtains, windows, garage door openers, showers, security systems, electronic doorbells, cameras and devices having cameras, electronic locks, smoke detectors, proximity sensors, Internet connected speakers, laptops, desktops, workstations, cars, or other device which may communicate information using a portable user account.

Figure 2A:
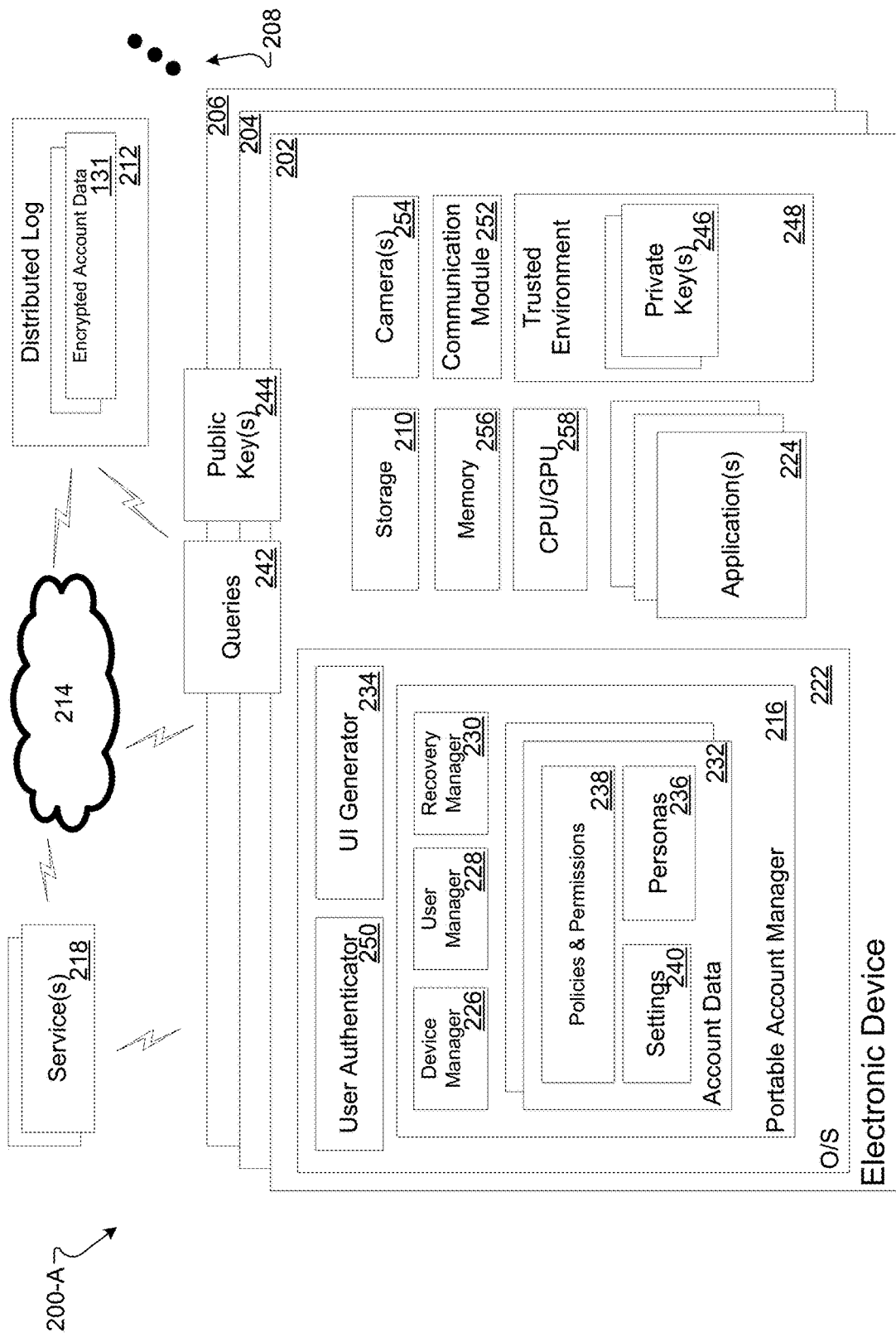
FIGS. 2A-2B represent block diagrams of example distributed computing systems, in accordance with implementations described herein.
Figure 2B:
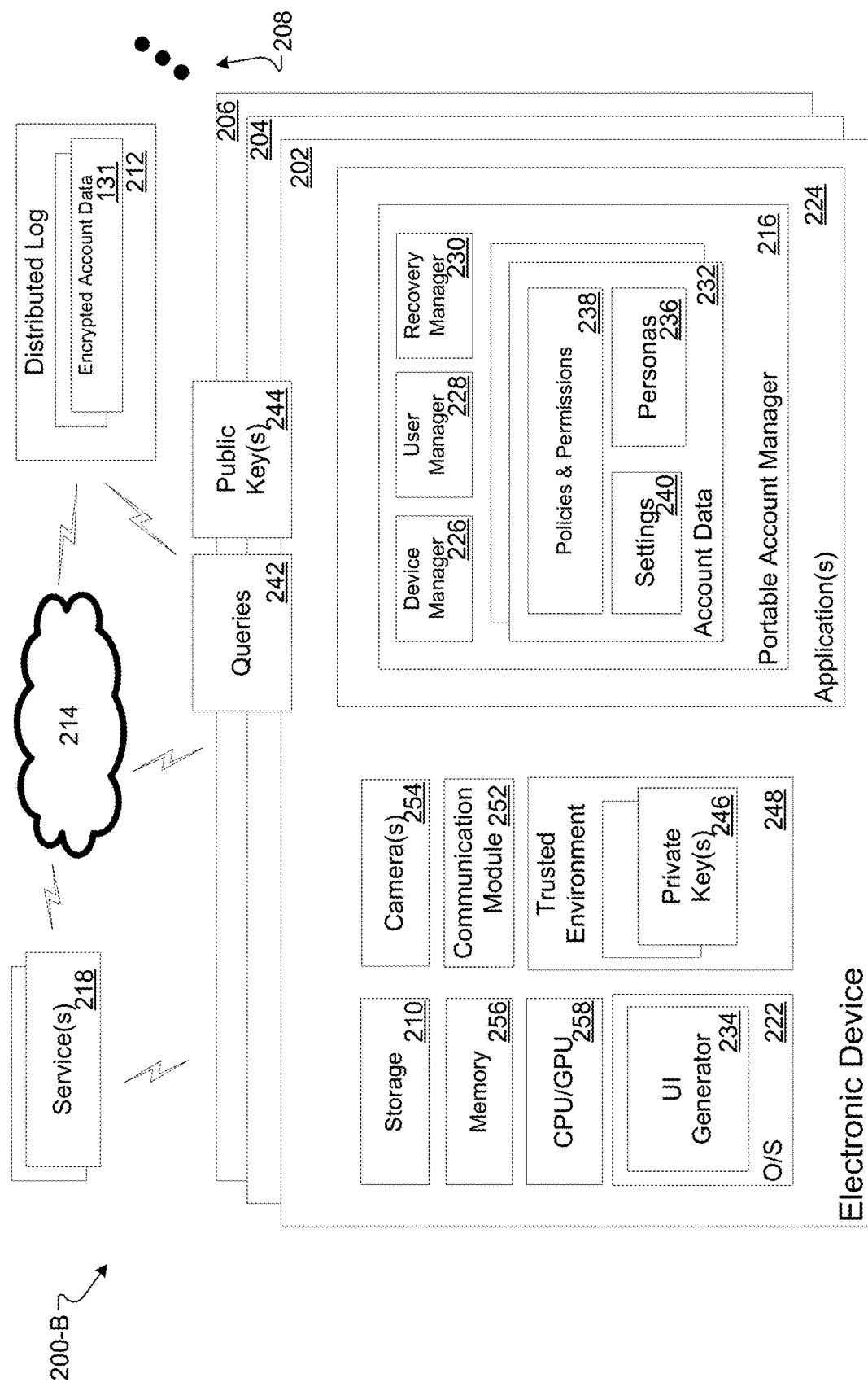

FIGS. 2A-2B represent block diagrams of example distributed computing systems 200-A and 200-B usable with a number of electronic devices or operating on one or more of the electronic devices, in accordance with implementations described herein. The computing systems 200-A and 200-B illustrate example systems for use with a portable user account, such as portable user account 100.

Referring to FIG. 2A, a block diagram is shown illustrating an example operating system (O/S)-implementation of a distributed computing system 200-A. The O/S-level implementation is configured to allow the O/S of an electronic device to control access to and use of a portable user account. For example, the O/S of the electronic device manages the portable user accounts described herein and provides data from the accounts to one or more applications on the electronic devices.

Referring to FIG. 2B, a block diagram is shown illustrating an example application-level implementation of a distributed computing system 200-B. The application-level implementation is configured to allow an application on an electronic device to manage access to and use of the portable user accounts described herein. In some implementations, the portable user accounts described herein may simultaneously use the O/S-level implementation on particular electronic devices while using the application-level implementation on other electronic devices.

Referring again to FIG. 2A, the system 200-A includes multiple electronic devices 202, 204, and 206. Although three electronic devices are shown, any number of electronic devices may be part of system 200-A. The system 200-A may be used to configure computing devices and/or ambient devices (e.g., device 202, device 204, and device 206), and/or other devices (not shown specifically in FIGS. 2A-2B, but indicated by ellipses 208) to function as a single distributed computing system, such that a portable user account 100 may be dispatched, provisioned, maintained, and/or shared amongst any of the devices within the distributed computing system 200-A. For example, system 200-A may include devices (e.g., devices 202-206, etc.) that may be used to provision other devices to access the portable user account 100 associated with system 200-A and/or system 200-B.

In general, each device provisioned for the portable user account 100 may be provided decentralized access to the portable user account 100 via the architecture shown in system 200-A and/or system 200-B. The decentralized access may provide secure and anonymous electronic interactions with such devices while each interaction is maintained by distributed logs 212 and/or blockchain-based transactions (e.g., using storage 210 and encrypted account data 131) and distributable as encrypted account data 131 across devices via network 214. In addition, account data 232, services 218, queries 242, and public keys 244 may be passed amongst devices and/or portable user accounts.

As shown in FIG. 2A, the O/S 222 includes a portable account manager 216. The portable account manager 216 may have access to account data 232, which may include any or all policies and permissions 238, settings 240, and personas 236. In some implementations, the portable account manager 216 may also include or have access to device manager 226, user manager 228, and recovery manager 230. In general, the portable account manager 216 may control functions carried out using account data 232.

In some implementations, the portable account manager 216 may generate and submit queries 242 based on receiving by at least one device, a request to access the portable user account 100. The request may include information associated with the requesting device. The queries 242 may submit the requests to services 218 or another electronic device with access to the user account in order to determine access rights for the requesting device.

The storage 210 (e.g., blockchain) may represent a decentralized and distributed storage network. Stored distributed logs 212, encrypted account data 131, account data 232, policies and permissions 238, settings 240, and public cryptography information (e.g., public keys 244) may be stored in the storage 210 and/or shared across network 214 from device to device. In some implementations, storage 210, distributed logs 212, and blockchains described herein may be or have access to cryptographic storage logs.

In some implementations, the computing device (e.g., electronic device 202) may access the distributed logs 212 (and encrypted account data 131) to maintain device statuses, security statuses, and task statuses during operation of the computing system 200-A. In some implementations, the storage 210 and access to distributed logs 212 may be provided as a service 218. Such a service may be synchronized across all devices owned (e.g., and provisioned by) a particular portable user account. In some implementations, the storage 210 may be distributed storage. In some implementations, storage 210 and distributed logs 212 may be provided by one or more applications 224 on the electronic device or provided by a cloud-based application.

Each application 224 and/or component executing on behalf of a particular portable user account may have a separate data store provided and managed by the storage 210, for example, and provided to other user-associated devices. Each data store in storage 210 may be transparently synchronized across devices associated with a user account through a cloud provider (e.g., network 214, for example).

In some implementations, distributed logs 212 and/or storage 210 may be bound to an identifier of a portable user account and/or personas 236 that the logs, etc. were created for, which may prevent a malicious device from creating a fresh account using the same logs to prevent the malicious device from then adding back a subset of the public keys 244, for example. In some implementations, devices store the associated account identifiers for each of the respective public keys 244 to avoid scenarios in which devices may be tricked into performing operations on the wrong portable user account.

Each device in a particular distributed computing system (e.g., devices 202, 204, and 206, etc., in computing system 200-A) may be associated with at least one portable user account 100. In some implementations, each device 202-206 includes a number of applications 224 (e.g., apps). The applications 224 may utilize services 218, policies and permissions 238, settings 240, and one or more logs 212 and/or storage 210. The storage 210 may be on device 202 (or other device) as a local copy, but may also be updated via the network 214, an Internet connected network, or other network. Synchronization of encrypted account data 131 (or other account data) can occur between distributed log 212 and storage 210 (or other distributed storage or ledger/log on a provisioned device pertaining to portable user account 100).

In some implementations, the devices 204 and 206 (devices 102-124 or other devices provisioned for account 100) may include any or all of the components shown in device 202. In general, the computing devices 202, 204, 206 and devices 102-124 may communicate and/or transfer data wirelessly amongst one another using the systems and described herein. In some implementations, each device may be configured with portable user account 100 to communicate with each device associated with system 200-A.

Referring again to FIG. 2A, the electronic device 202 includes an operating system (O/S) 222 that may function to execute and/or control applications, services, and device communications, security, and authentication. The O/S 222 may be a first type of O/S while other devices shown in FIG. 2A or FIG. 2B (or associated with a particular user account) may be a different O/S operating different device hardware.

In operation, the systems and methods described herein may provide access to one or more services 218 for any number of devices configured with portable user account 100, for example. The services 218 may be configured to provide content, security, and/or other functions for device 202 accessing the portable user account 100. In some implementations, the services 218 may include personalized computer-based services provided by a service provider to a user. In some implementations, the services 218 may not be personalized, but may instead be general services offered to users for use on their computing and/or electronic devices. In some implementations, the services 218 may be provided via an app (e.g., application) at the request of the user.

In system 200-A, the O/S 222 may execute and or otherwise manage use and access to the portable user account 100. In some implementations, O/S 222 may execute applications 224, a device manager 226, a user manager 228, and a recovery manager 230. The applications may include a user interface (UI) generator 234 and user data such as account data 232 with personas 236. User configured policies and permissions 238 may be stored on the device as well as account settings 240.

The device manager 226 may manage and assess device status and device state within the system 200-A. In some implementations, the device manager 226 may be used to configure devices for particular distributed computing environments that utilize the portable user account 100. For example, one or more setup APIs may be embedded and/or otherwise utilized by a setup application, which may be used by the device manager 226 of any particular device in system 200-A to present brand expression aspects (e.g., UI content per device brand) while still ensuring interoperability with other devices in system 200-A, regardless of the underlying operating system of the devices.

In some implementations, the device manager 226 may provide, or otherwise enable, device to device setup. For example, particular devices may communicate via peer-to-peer networks (or other networks via ultrasound or other wireless technology) upon user confirmation via a previously provisioned device identity. Upon confirmation, the previously provisioned device may automatically communicate services, preferences, policies and permissions, and/or settings to one or more devices provisioned with the portable user account 100, for example. In some implementations, device manager 226 may function with user authenticator 250 to allow users to log into the device and/or portable user account. For example, user authenticator 250 may be used by device manager 226 to confirm that a particular user (e.g., an owner of account 100) is present before allowing access to the device and/or account 100. The user authenticator may receive credentials, fingerprint(s), PIN number, voice recognition, proximity detection, or other authentication protocol to unlock the device and/or portable user account 100 for use.

As used herein, a device (e.g., device 202) may represent computing hardware that executes an O/S and/or kernel. Devices may include or have access to a user interface, processing capabilities, and one or more network connections. In general, devices exist to perform tasks for users. In some implementations, devices may be asked to utilize some form of user credentials to decrypt data or to act on behalf of the user. Even when a device is given credentials, these may be limited across many dimensions including, but not limited to service provider preferences, portable user account settings 240, policies and permissions 238, personae 236, time validity, action type, entities that may be acted upon, etc.

The user manager 228 may manage identities for portable user account 100 associated with the system 200-A. For example, a user may be associated with the device 202 and the device 204 using an identity configured in the portable user account 100. The identity may be represented with a persona, which may be used to present the user (or data associated with the user) to third parties or other devices in system 200-A, for example. In general, the user manager 228 may be used to add and/or modify users, home services, physical buildings, and devices. For example, the user manager 228 may generate an account that may represent a physical building (e.g., a home). The identity of the home may include an address and other identifying data in which a user may claim ownership. The identity of the physical building is typically not directly connected to a human user or a service provider, but instead corresponds to an account set up by the user for the home.

The recovery manager 230 may represent software and/or services that may be used to recover access to portable user accounts. In general, if a user has possession of an inner entity, the user may regain access to the portable user account using the inner entity. The inner entity may also be used to re-provision or re-authenticate other devices to access the account. Each user may choose or not choose to set up a recovery account 130.

In some implementations, the recovery manager 230 may utilize a user-controlled authentication factor to recover an account. A user-controlled authentication factor (e.g., password, biometric marker, etc.) may be used to provide a safety backup recovery in the event that no inner entities are available. However, a user may have to remember or store the user-controlled factor, but the user may not have to rely on a recovery provider to store account information.

In another example, the user may recover a portable user account without a user-controlled authentication factor and may instead set up a recovery account 130 for the user account 100. In this example, the user that controls the recovery account 130 can control the portable user account and provide access to the account. The recovery account 130 may be handled by third party or may be assigned to another user associated with the account. This infers that the user is trusting the recovery provider to handle sensitive account information.

A recovery account 130 may represent an account configured for a portable user account to recover access to the account for a device. The recovery account 130 may be provided by a service provider as a service provider account to allow a user to gain access to the portable user account in the event that the user loses loss of account authentication factors (e.g., passwords, etc.).

In some implementations, a user may not want to configure a recovery account 130 or may not have yet configured such an account 130. Without a recovery account 130 configured, the user may rely on continuous access to their devices in order to use the portable user account. This can provide high security against powerful attackers but a user may lose access to the portable user account if devices are lost. As an advantage, the user does not have to rely or trust in a recovery provider.

The device manager 226 may determine when to revoke device access to the portable user account. In some implementations, the device manager 226 may function via network 214 when determining device-to-device revocation. In some implementations, the device manager 226 may invoke a rate limiting revocation in which tenured inner entities (i.e., inner devices that have been on the portable user account for some minimum period of time) and specifies a rate limit on the deletion (e.g., revocation) of these devices from the account. This feature may provide the advantage of limiting the power of a stolen or otherwise compromised device.

When a device is compromised, the provisioned set of devices may be split into two subsets controlled by two different actors (e.g., a verified user and an attacker). Without any rate limits these sets have equal power, whichever actor moved first could quickly revoke all of the devices controlled by their adversary. Since the attacker has the benefit of premeditation, the attacker may be likely to overtake the device(s) and eventually the portable user account. To alleviate such a technical problem, the device manager 226 may be configured to set a per-device rate limit on revocation such that the rate of revocation is proportional to the number of inner entities an actor holds. Therefore, whichever actor holds the greatest number of inner entities can revoke their adversary's devices first. For users with three or more inner entities, such a configuration may work in favor of the verified user.

The tenure and rate limiting may prevent an attacker from quickly adding a large number of new devices to the portable user account. For example, if the attacker uses a stolen mobile device to add an additional nine devices, the original stolen mobile device is eligible to revoke other tenured devices but is constrained by the rate limit, while the user is free to revoke the untenured new phones immediately. The revocation rate mechanics may be used as a backup option to a recovery account, since whichever actor controls the recovery account can ultimately gain control of the portable user account.

User configured policies and permissions 238 may be stored on the device as well as account settings 240. The system 200-A (or devices within system 200-A) may generate and/or distribute particular policies and permissions 238 and settings 240. The policies and permissions 238 and settings 240 may be configured by the user. Policies and permissions 238 and settings 240 may include user or device based policies, preferences or routines (i.e., a set of actions) that trigger based on receiving data such as an audio command, a visual command, a schedule-based command, or other configurable command. For example, a user may set up an evening routine with preferences and/or actions to trigger devices for a particular account to carry out tasks to begin to power down devices, elements controllable by devices, and/or other tasks. A received command may trigger such a routine. Other policies and preferences may of course be configured to modify and or control other devices associated with a particular portable user account configured with the policies and permissions 238 and/or settings 240.

In some implementations, the O/S 222 may include or have access to trusted environment 248 to enable the security schemes described herein to provide the advantage of sharing secret data (e.g., account secrets) across provisioned devices that have access to the portable user account while cryptographically protecting the account secrets from other devices and providing a transparent log (e.g., via distributed log 212) of events occurring using the portable user account. The trusted environment 248 may provide hardware support for generating private keys 246 and keeping such private keys safe from access unless proper access information is provided (i.e., matching blockchain data).

Cryptographic keys may be utilized for the log (e.g., as a service). Cryptographic keys may also be used to protect account names and/or device names. In some implementations, the system 200-A may allow the account secrets to remain untampered with unless devices are revoked. At that time, the system 200-A may modify the data to add a new revocation key and/or log key set, as described in detail below.

In general, the security schemes described herein may use cryptographic keys (e.g., a public key pair for each account-device combination). For example, there may be one key pair for an account on a particular device. Since such keys do not move between devices, the private keys can be generated and stored in hardware of the device. For example, the trusted environment 248 may generate (e.g., create/define) a private key 246 for each device with access to a portable user account. The trusted environment 248 may then encrypt the account secrets (e.g., account data 232, personas 236, and/or other data) with public keys of all of the provisioned devices. To add a new device, the trusted environment 248 may add the device to the key set. To revoke a device, the trusted environment 248 may remove the device from the key set and rotate the account secrets and encrypt the new account secrets with the keys of the devices that are provisioned, but not currently revoked. Each time a device updates the key set or account data, the trusted environment 248 may sign the block (e.g., block 700) so other devices can verify the integrity of the system. Each block of account data 232 may be linked back to a previous version of the account data to provide system 200-A the ability to verify the legality of a transform from the previous version of the account data 232 to the current version of account data.

Personas 236 may represent entities with which a user is represented in a portable user account 100, for example. In some implementations, each persona associated with the portable user account may be provisioned and removed together. In some implementations, the personae within account 100 and associated public and private keys can include data in account secrets (e.g., hidden data) or may be stored in the log (e.g., storage 210) for the account 100.

In some implementations, each persona may also include a block in the blockchain associated with the portable user account. Such a block may include similarities to the outer account blocks described herein. However, the personae block may include a different account identifier to ensure the personae are not directly traceable back to the user and/or account 100. In some implementations, the personae block may not reference back to an account block and instead may refer back to earlier versions of itself.

The personae block may document the public keys of all of the inner entities that are allowed to generate mutations, but these are not the same public keys as the devices use to sign the account. In some implementations, the personae block may be configured with policies to revoke personas if revocation events occur to inner entities over a threshold time period.

The system 200-A may ensure that particular policies and permissions 238 are enforced as to which device can and cannot revoke provisioned devices for the portable user account. Regardless of where a device request is initiated, the system 200-A may utilize the security schemes to ignore particular updates or requests when such updates or requests are determined to be invalid. This may provide the advantage of ensuring that a malicious device may succeed in isolating itself from the constellation of devices, but the malicious device cannot succeed in continuing with an invalid partial set of the original devices.

As shown in FIG. 2A, the O/S 222 may include or have access to storage 210, a communication module 252, cameras 254, memory 256, and CPU/GPU 258. When new devices are added to (or provisioned for) the portable user account, the new devices may automatically inherit the existing configurations for the portable user account of another device pertaining to policies and permissions 238, settings 240, storage 210, communication module 252, cameras 254, memory 256, and CPU/GPU 258. For example, the system 200-A may utilize an underlying device O/S 222, for example, to trigger notification for each particular device and each device may determine and/or interpret what the policies and permissions 238 are intended to configure. Each device may then configure policies and permissions 238 according to the interpretation of the received notification. For example, a device may determine how to configure a do not disturb policy based on which sensors and/or corresponding capabilities are available within itself. The device can then turn off the disturbing sensors and/or capabilities according to the policy.

Referring now to FIG. 2B, a distributed computing system 200-B is shown as an example application-level implementation of using and managing portable user accounts, such as portable user account 100. The application-level implementation is configured to allow the application(s) 224 on an electronic device to manage access and use of the portable user accounts described herein.

While system 200-B may include any and/or all of the components of system 200-A, the components may be arranged differently to control the user account in a different manner. For example, the applications 224 are depicted as residing outside of O/S 222 and are shown including the portable account manager 216, among other elements (e.g., portable account manager 216, device manager 226, user manager 228, recovery manager 230, account data 232, policies and permissions 238, settings 240, and personas 236). In some implementations, the portable user accounts described herein may simultaneously use the O/S-level implementation of system 200-A on particular electronic devices while using the application-level implementation of system 200-B on other electronic devices.

In the example of system 200-B, the O/S 222 includes the UI Generator 234 to generate content for provision to the user. The application 224 includes the portable account manager 216. The portable account manager 216 may have access to account data 232, which may include any or all policies and permissions 238, settings 240, and personas 236. In some implementations, the portable account manager 216 also includes or has access to device manager 226, user manager 228, and recovery manager 230. In general, the portable account manager 216 (via application 224) may control functions carried out using account data 232.

Each device within system 200-A and/or system 200-B may include or have access to one or more processors (e.g., CPU/GPU 258) in communication with the O/S 222, the communication module 252, services 218, memory 256, and/or cameras 254. The communication module 252 may provide for communication between devices using the portable user account 100. Processors 258 are configured to execute instructions (e.g., computer programs) in order to carry out specific tasks. In some implementations, at least one of the processors 258 executes instructions to operate devices in using account 100. Memory 256 may be utilized throughout communications and interactions amongst the elements in system 200-A and/or system 200-B.

In addition, the devices within system 200-A and/or system 200-B may use or have access to one or more peripherals (not shown). Example peripherals may include any number of controllers, computing devices, head-mounted display devices, cameras, speakers, tracking systems, and/or other device in communication with system 200-A and/or system 200B.

Various solutions to the problems noted above are provided by a computing system, in accordance with implementations described herein. A computing system, in accordance with implementations described herein, may leverage data collected by various sensors and/or devices of system 200-A and/or system 200-B, for example, to generate (e.g., build) networks of devices that function with services and distributed logs 212 to ensure that secure account access is provided for each provisioned device of system 200-A and/or system 200-B.

Figures 3, 4:
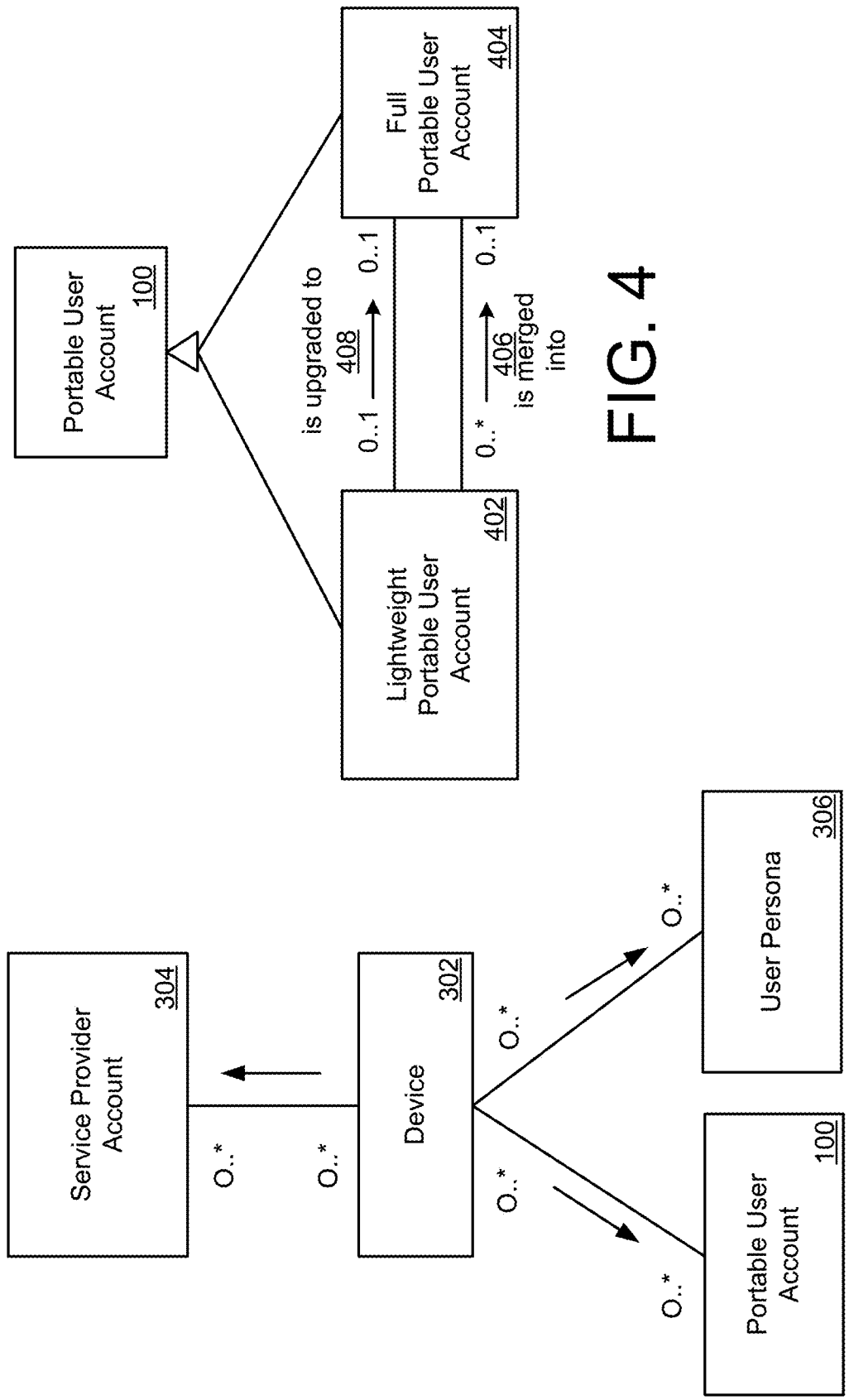
FIG. 3 is a block diagram illustrating example relationships between elements associated with a portable user account, in accordance with implementations described herein.
FIG. 4 is a block diagram illustrating additional example relationships between elements associated with a portable user account, in accordance with implementations described herein.

FIG. 3 is a block diagram illustrating example relationships between elements associated with a portable user account, in accordance with implementations described herein. The elements associated with the portable user account 100 may include a device 302, a service provider account 304, and a user persona 306.

The device 302 may hold credentials for the service provider account 304, the portable user account 100, and the user persona 306. In some implementations, the device 302 may hold no credentials for any portable user account (e.g. a kiosk while not in use). In some implementations, the device 302 may hold credentials for multiple portable user accounts and service provider accounts. Some of the credentials may be short-lived credentials or credentials with limited power.

In some implementations, a device is restricted to using a subset of personae associated with a particular account 100, in which case it holds credentials for these personae and not the account. In some implementations, a device is not restricted to particular personae, in which case the device may hold credentials for the account 100. The credentials may be used to act on persona 306. In addition, the portable user account 100 may be associated with the service provider account 304. The service provider account 304 may be exposed by user persona 306. User persona 306 functions as a facet of the portable user account 100.

The portable user account 100 may be used to present a user identity (or persona) to a device operating system. The portable user account may represent a user identity within a distributed computing system 200, for example. The portable user account may allow users to use multiple devices securely and seamlessly.

In general, service providers may provide service provider accounts 304 which represent a user within a service provider's system. Each user may have multiple accounts with the same service provider. In some implementations, a user may configure a single service provider account 304 as a family account in which multiple users can access the family account. A service provider may provide services and/or may be used to authenticate users before granting access to the service provider account.

In some implementations, a user can associate the service provider account 304 with the portable user account 100 and then choose whether the service provider account 304 is exposed in each user persona 306. Managing visibility of a service provider account 304 at the persona level reflects the fact that personae may control how identity is revealed to third parties. For example, associating service provider accounts 304 at the portable user account level rather than the persona level reduces the friction of using personae. That is, a user need not sign into each third party account multiple times if the user wishes to use the accounts with each of the multiple personae. In some implementations, when a user adds the portable user account 100 to a new device, the user need not re-authenticate with the service provider account(s) 304 because bootstrap credentials for the new device may be created by an existing device, allowing service providers associated with a particular service provider account to leverage trust in that existing device. The service provider account 304 may be associated with more than one user and as such can also be associated with any number of portable user accounts.

A group of users with a shared interest may be referred to as a collective (not shown). A collective can take many different forms. For example, a collective may be a family and users that are part of a family household. In another example, a collective may be a business and users that are part of the business. Other example collectives may include, but are not limited to a circle of friends, a shared interest group, a gaming clan, or a sub-team within a business. In general, a user may be a member of any number of collectives, and a collective may have any number of members. These members may change over time.

In some implementations, a group may represent a collective. Each group may contain a set (e.g., list) of portable user accounts and/or personae which are visible to other members of the group and allow the owners of these personae to interact with other members of the collective. A group may optionally also contain other groups. In some implementations, the membership of a group may be based on personae rather than accounts so that users can control the identity that is revealed to other members of the group. Adding a new persona to a group may trigger request of consent from both the owner of the persona and the group.

FIG. 4 is a block diagram illustrating additional example relationships between elements associated with a portable user account 100, in accordance with implementations described herein. When a user configures an electronic device with the portable user account 100, the user may choose to provision the device with a lightweight portable user account 402, a full portable user account 404, or no account. If the user configures the device to use a lightweight portable user account 402, a basic and empty account may be automatically created and associated with the session. The emptiness of the account may refer to lack of user data without proper authentication. For example, restrictions may be set on a lightweight account 402. Restrictions may include, for example, disallowing custom personae to be created with the lightweight account 402. Other restrictions may include not enabling the lightweight account 402 for use on any other device than which the account 402 was generated. In some implementations, lightweight portable user accounts 402 may be limited to use for a predefined time period and may be deleted after expiration of the predefined time period. In some implementations, use of the lightweight account may be extended using an account merge process 406 or an account upgrade process 408. The account merge process 406 may include the user triggering a merge of some or all data into a full portable user account 404. The account upgrade process 408 may include a user triggering a conversion of the lightweight account 402 to a full account 404.

If the user configures the device to use a full account, a portable user account and all user data and permissions may be associated with a particular device session. Authentication may be implemented to provision proper account and/or user credentials on the device, which will be described in further detail below.

If the user configures the device with no account, the user may use the device without the use of an account. Such situations may include accessing a device with simple queries or using the device as an accessory to another device.

When using lightweight portable user account 402 or a full portable user account 404, the system 200-A and/or system 200-B may employ persistent data retention or ephemeral data retention, which are two options for data retention. With persistent data retention, the device may retain the credentials it has been issued, its own copy of the storage 210, data provided to the user authenticator 250 for unlocking the account 404, and any data the user generated while using the device.

With ephemeral data retention, the device may not retain any user data beyond the session. In this example, the device may not be provisioned with long term credentials. The device may also not retain its own copy of the storage 210

(e.g., log), but any changes the user made in the storage 210 may be synchronized and retained.

Figure 5:
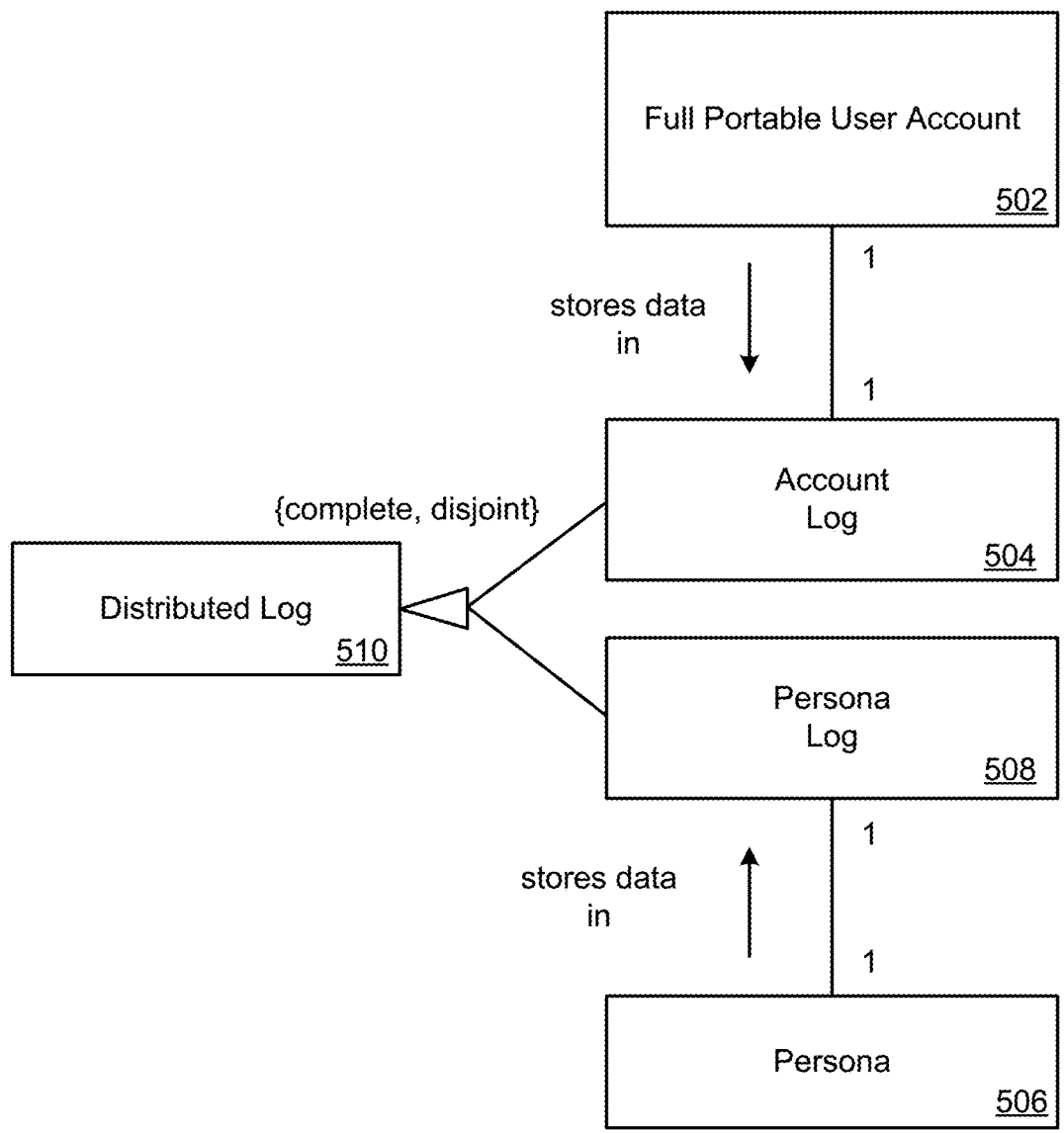
FIG. 5 is a block diagram illustrating additional example relationships between elements associated with a full portable user account, in accordance with implementations described herein.

FIG. 5 is a block diagram illustrating additional example relationships between elements associated with a full portable user account 502, in accordance with implementations described herein. The full portable user account 502 may store data in an account log 504. Personae 506 may store data in a persona log 508. The account log 504 and the persona log 508 are both a type of distributed log 510.

The log 504 and log 508 may function together to provide consistent storage across devices. Each portable user account 502 may have a log (e.g., log 504) to synchronize account level state across devices. Each persona 506 may also have a log (e.g., log 508) to ensure that the data stored for different personae is isolated. In addition, log 508 may enable synchronization when a subset of an account's personae are available. Since user interactions are performed using personae rather than accounts, the account log 504 may be a smaller storage element than those of personae.

Figure 6:
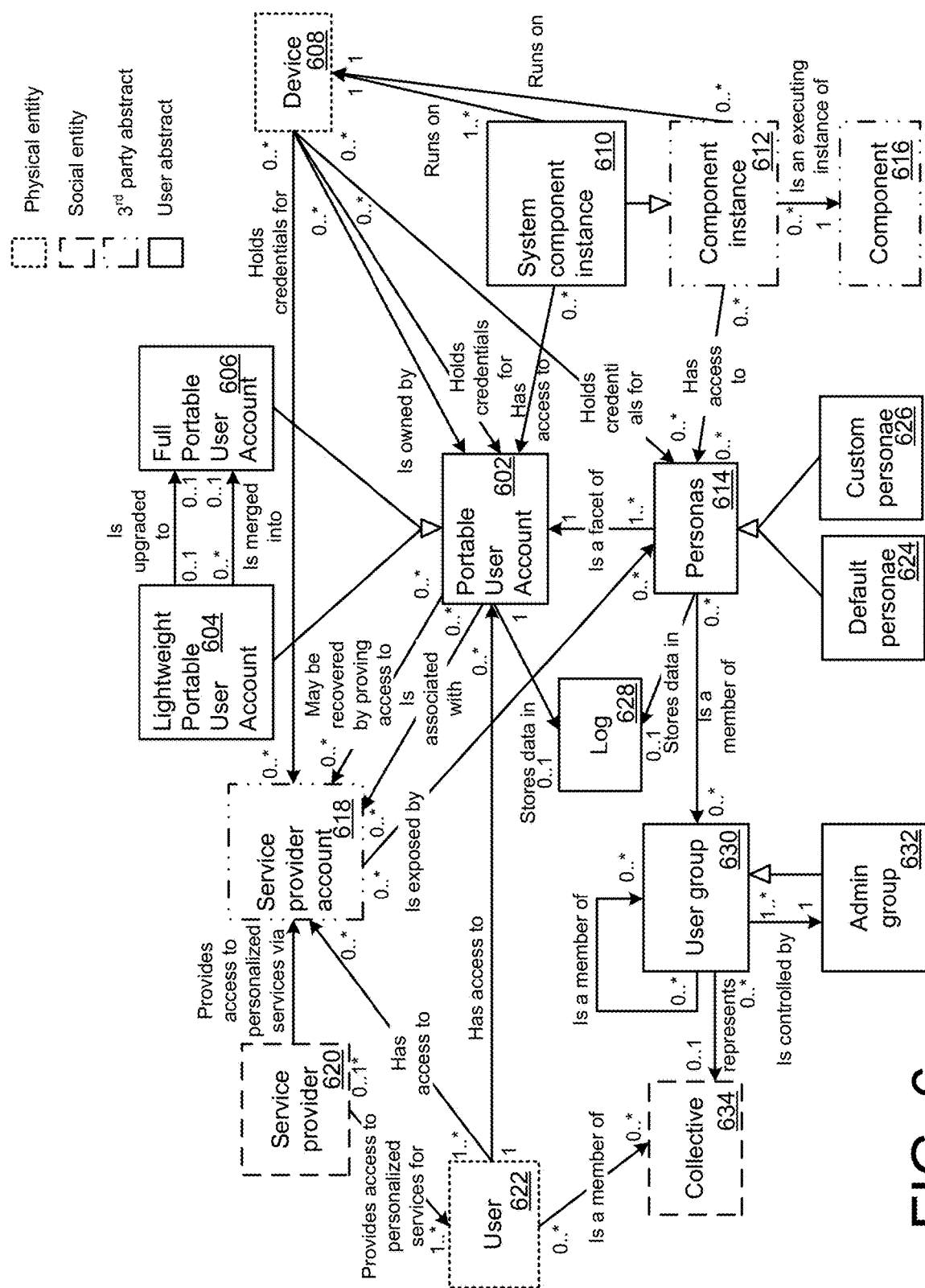
FIG. 6 illustrates an example map of elements associated with portable user accounts, in accordance with implementations described herein.

FIG. 6 illustrates an example map of elements associated with portable user accounts, in accordance with implementations described herein. As shown, a portable user account 602 may be a lightweight portable user account 604 or a full portable user account 606. The lightweight portable user account 604 may be upgraded to and/or merged into a full portable user account 606.

At least one device 608 may be associated with the portable user account 602. The device 608 may be deemed as owned by the portable user account 602. The device 608 may hold credentials for the portable user account 602. As shown in FIG. 6, a system component instance 610 may run on device 608. The device 608 may execute one or more instances 612 of one or more software components 616. The device may give these component instances access to a persona 614. In some cases, these software components form a part of the device's operating system, in which case they may have access to a portable user account 602.

The device 608 may also hold credentials for a service provider account 618. The service provider account 618 may be owned by the service provider 620, which may provide access to personalized services for the user 622. The service provider account 618 may be associated with the portable user account 602 and be exposed by one or more of the portable user account's personae 614. The persona 614 may be a facet of the portable user account 602. In addition, each of the personae 614 may either be a default persona 624 or a custom persona 626. The persona 614 may store data in the log 628 (e.g., distributed storage and/or blockchain based logs). In addition, the portable user account 602 may store data in the log 628. The persona 614 may belong to one or more user groups 630. Each user group 630 may be controlled by an admin group 632 and may represent a collective 634. The user 622 may also be a member of the collective 634 and may have direct access to the portable user account 602. Access to the portable user account 602 may be recovered by a user who is able to prove they have access to the service provider account 618.

Figure 7:
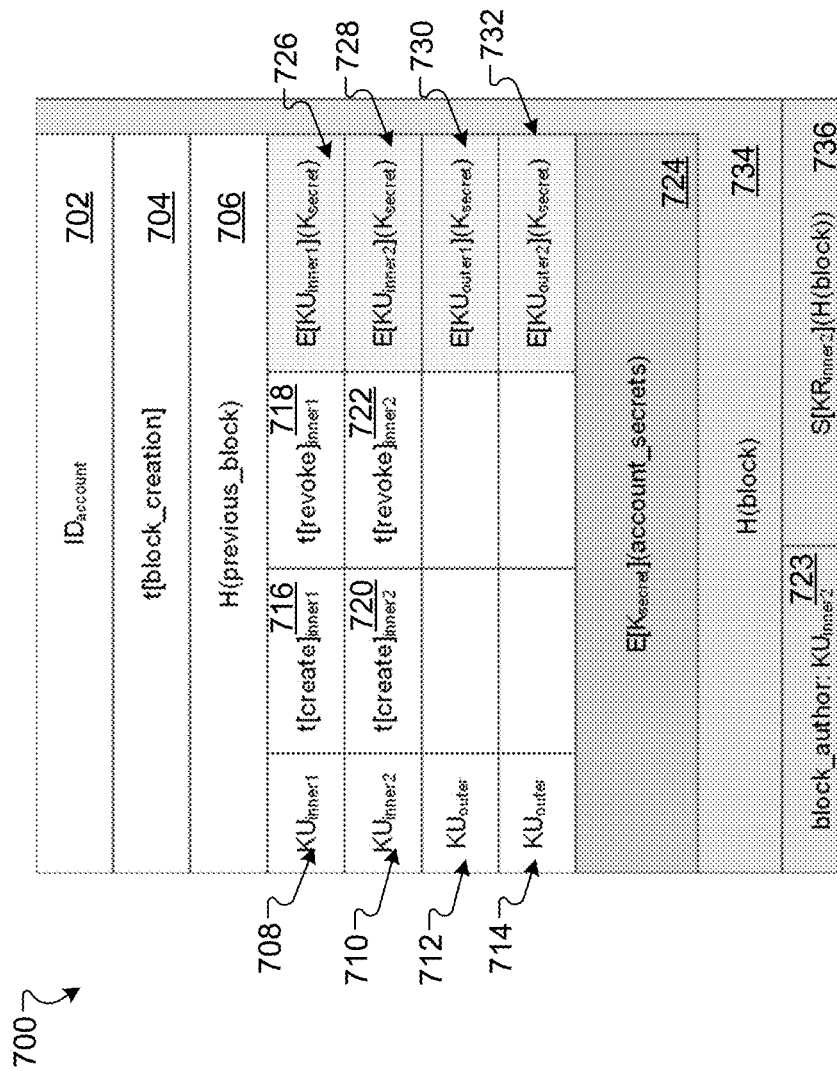
FIG. 7 is a block diagram of an example security scheme for a portable user account, in accordance with implementations described herein.

FIG. 7 is a block diagram of an example security scheme for a portable user account, in accordance with implementations described herein. The following examples may employ particular nomenclature to describe the security schemes. For example, the following variables may be represented in one or more block of account information for the portable user accounts described herein:

TABLE 1

| | |
|---|---|
| $K_{xyz}$ | a symmetric key |
| $KU_{pqr}$, $KR_{pqr}$ | public and private components of a public key pair |
| $E[k](d)$ | encryption of data d using key k |
| $S[k](d)$ | digital signature of data d using key k |
| $H(d)$ | cryptographic hash of data d |
| $ID_{xyz}$ | unique identity |
| $t[e]$ | timestamp for event e, such as device creation or revocation |
| $KDF(a, b)$ | output of a key derivation function over inputs a and b |
| account secrets | account's secret data that the account system exists to protect |

In general, the security schemes described herein can provide the advantage of sharing secret data (e.g., account secrets) across provisioned devices that have access to the portable user account while cryptographically protecting the account secrets from other devices and providing a transparent record of events occurring using the portable user account. Cryptographic keys may be utilized for the account services (e.g., a private file system to store the data for the account). Cryptographic keys may also be used to protect account names and/or device names. In some implementations, the system 200-A and/or system 200-B may allow the account secrets to remain fixed unless devices are revoked. At that time, the system 200-A and/or system 200-B may modify the data to add a new revocation key and/or key set, as described in detail below.

Referring again to FIG. 7, a block 700 includes an account identifier block 702, a creation time block 704 and a hash block 706 of the previous block (e.g., at creation time or the block generated immediately before block 700). In addition, the block 700 includes data for each inner entity 708, 710 (e.g., $KU_{inner}$), and may include data for each outer entity 712, 714.

The block 700 and other blocks generated after block 700 refers to a previous block for the portable user account 100 and includes the block creation time. In general, the previous block may refer to a block immediately before a lastly generated block. In addition, each inner entity documented in the block may include the times at which it took actions with the user account, for example. For example, the block 700 may include a time of creation (e.g., addition of a device to the portable user account 100) and a time of last tenured revocation. For example, the first inner entity 708 may have been created at time 716 and may have last performed a revocation at time 718. Similarly, the inner entity 710 may have been created at time 720 and may have last performed a revocation at time 722. Each entity (e.g., device 708 and 710) also includes a public key. Outer entity 712 and outer entity 714 may not include timestamps (e.g., times 716, 718, 720, and 722) because outer entities are generally incapable of changing account data and such devices have the capability to self-revoke, but may not revoke other devices from accessing the portable user account.

Any entity with access to the block 700 and all the ancestor blocks (e.g., via a blockchain or a distributed log stored in storage 210 and/or distributed logs 212 with encrypted account data 131) may verify particular properties to ensure that the new block is legal. Such properties may include, but are not limited to (a) verifying that the previous block is the most recent legal block for the account, (b) verifying that t[block_creation] is after the previous block and close to time when the block was inserted in the blockchain and/or distributed log, (c) verifying that any new inner entities have a t[create] that matches t[block_creation]

and t[revoke] of zero, (d) verifying that a maximum of one inner entity in the previous block whose t[create] time is far enough before t[block_creation] time to be considered tenured has been removed (i.e., the authoring device is verified to update its own t[revoke] to t[block_creation] and its t[revoke] in the previous block is to demonstrate it is not deleting the revocation rate), (e) verifying that no other devices or times are changed from the previous block, (f) verifying that the block_author is one of the listed inner entities in the previous block, and/or (g) verifying that the signature is valid and produced by the block_author, which in this example is shown author 723 corresponding to inner entity 2 (device 710).

The inner entity that generates a block 723 may encrypt the account secrets 724 using a temporary key and provide this temporary key to each of the devices with access to the account by encrypting the temporary key with the public key for each device, as indicated at block 726, 728, 730 and 732.

Upon encrypting account secrets, all of the encrypted data 726, 728, 730, and 732 for respective devices 708, 710, 712, and 714 are hashed, as shown by hash block 734. The hash block 734 may then be signed by the private key corresponding to block author 723, as shown by block 736.

In some implementations, deterministic public key encryption may be used to ensure that any valid device with access to the temporary key can verify that all devices received the same $K_{secret}$ that the valid device received by re-encrypting with their respective public keys. In some implementations, such a verification may be performed when one or more of the devices is in an online status to verify against encrypted account data 131, for example.

In some implementations, the device functioning to author the block 700 may perform an interactive protocol with the distributed storage (e.g., distributed log 212 or blockchain) then system 200, may use a zero knowledge proof to demonstrate that the authoring device gave the same keys to all parties (e.g., encrypt a series of different partial secret keys which is XOR'ed i.e., exclusively OR'ed together to produce $K_{secret}$). In some implementations, the system 200-A and/or system 200-B may use deterministic public key schemes in which a pairwise verification is performed by encrypting each secret with an additional public key, (i.e., verify $E[KU_{i2}](E[KU_{i1}](K_{inner}))=E[KU_{i1}](E[KU_{i2}](K_{inner}))$).

Figures 8A, 8B:
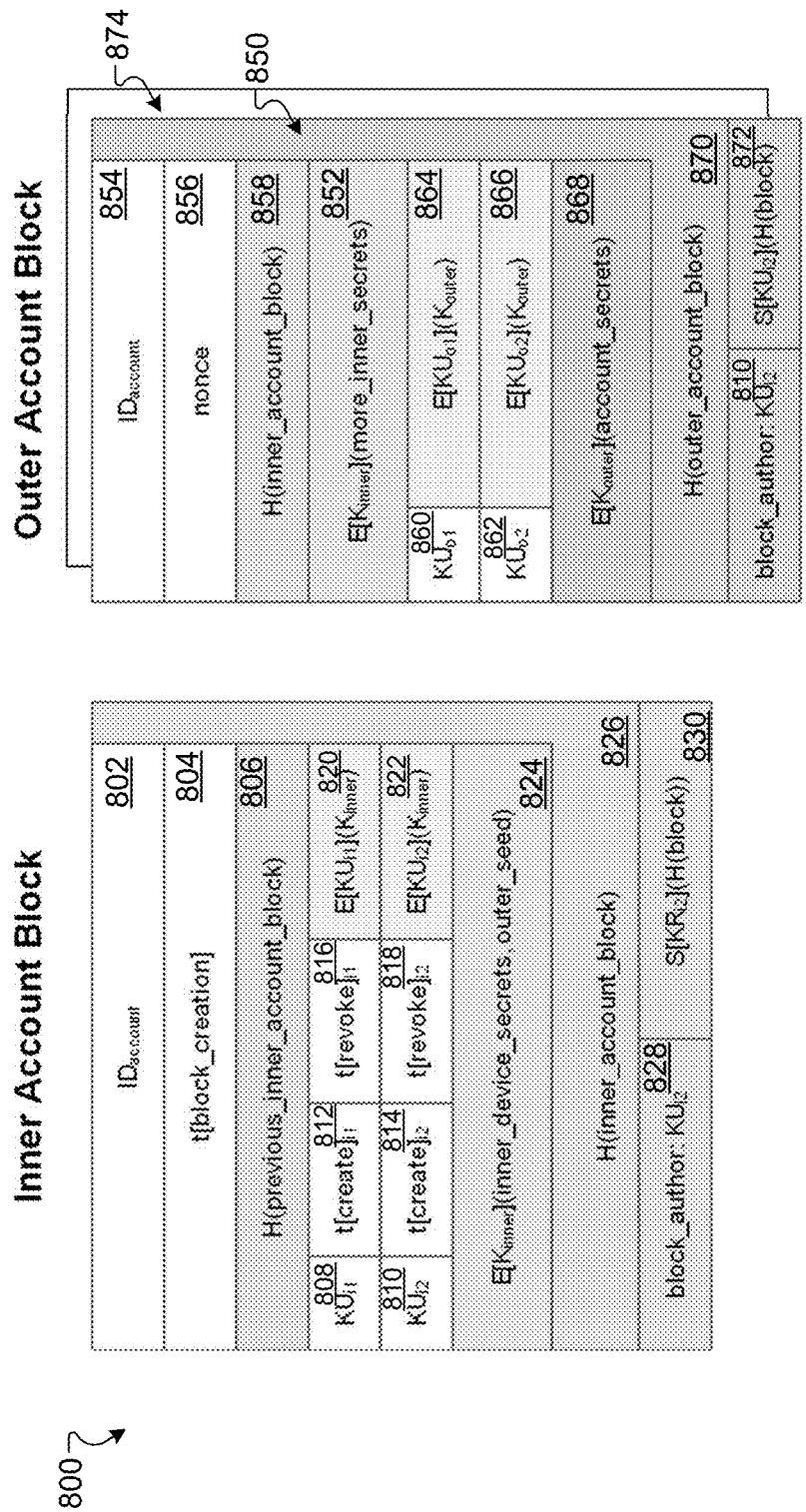
FIGS. 8A-8B illustrate block diagrams of an example security scheme for a portable user account, in accordance with implementations described herein.

FIGS. 8A-8B illustrate block diagrams of an example security scheme for a portable user account, in accordance with implementations described herein. As shown, an inner account block 800 and an outer account block 850 may function for a portable user account 100. In this example, separate sets of encrypted secrets are provided for the inner entities and outer entities, with the inner entities also gaining access to the encrypted secrets for outer entities. The inner account block 800 may be changed each time the inner entities are modified. The inner account block 800 may point (e.g., via pointer) to the previous inner account block generated prior to block 800. The outer account block 850 may point to the inner account block 800. The outer account block 850 may change each time modifications occur for the inner entities, outer entities, or portable user account data 232.

As shown in FIG. 8A, the inner account block 800 includes an account identifier block 802, a creation time block 804, and a hash block 806 of the previous block (e.g., at creation time or the block generated immediately before block 800). In addition, the block 800 includes data for each inner entity 808, 810. Each inner entity 808, 810 includes the device creation time (e.g., time 812 and time 814, respectively). In addition, each inner entity 808, 810 includes the time the device last performed a revocation of a tenured inner entity (e.g., time 816 and time 818, respectively).

The inner entity that generates a block 828 may encrypt the account secrets 824 using a temporary key and provide this temporary key to each of the inner entities by encrypting the temporary key with the public key for each device, as indicated at blocks 820 and 822. Upon encrypting account secrets 824, the encrypted data 820 and 822 for respective devices 808 and 810 may be hashed, as shown by hash block 826. The hash block 826 may then be signed by the private key corresponding to block author 828, as shown by block 830. In the examples described herein, the term first and second may refer to event order, but may indicate first and second events that occur in the beginning, middle, end or other placement in time occurring within a blockchain.

In operation, system 200-A and/or system 200-B may generate block 800 by generating by an electronic device 202, for example, a first inner account block 800 of a blockchain (or distributed log) for the inner entity 204 associated with a portable user account 100. The first inner account block 800 may include an inner entity creation time 812, an inner entity revocation time 816 (set to zero as the new device has not yet performed revocation), and an inner entity identifier 808 associated with the portable user account 100. The electronic device 202 may record the public key it received from inner entity 204, for which the associated private key may be held in protected storage on device 204. The electronic device 202 may hash the contents of the inner account block 800 (e.g., 802-824) to generate a unique identifier for the block that can be used to verify its content. The electronic device 202 may also generate a second inner account block of the blockchain. The second inner account block may include the hash block 826 representing the hidden account information 824 and an identity of the inner entity 802. The second inner account block may be addressed by the hash block 826 of the public key and signed by the private key associated with the portable user account 100 on device 202. The electronic device 202 may provide, using the inner entity identifier 802 associated with the portable user account, the blockchain of blocks to a plurality of other devices (e.g., devices 206, 102-124). Access to the portable user account may be controlled based on portions of the blockchain and/or distributed log (e.g., storage 210 and/or log data 212).

Referring to FIG. 8B, an outer account block 850 may be generated for the portable user account 100. The outer account block 850 may be generated with a different set of hidden account information 852 than hidden account information 824 for inner entities. As shown, the outer account block includes an account identifier block 854, a random number (e.g. nonce 856) and a hash block 858 that may identify the recent (closest in time) inner account block that had been generated for user account 100 at the time 850 was generated. For example, the account data may be encrypted using a temporary key derived from the nonce 856 and an outer_seed that was defined in the recent inner account block (e.g., $K_{outer}$=KDF(nonce, outer_seed), as shown by encryption of hidden account information 868.

Outer entities (first outer entity 860 and second outer entity 862) can decrypt such an encryption because each outer entity is given the temporary key $K_{outer}$ encrypted with the outer entity's public key, as indicated in block 864 and block 866.

Inner entities can decrypt such an encryption because the inner entities can read the encrypted outer_seed from the inner account block and can read the plaintext nonce 856.

Thus, a new inner block is not generated when any outer entity is revoked. Data about the outer entities (such as their human readable names) may also be encrypted using $K_{inner}$ and stored in the outer account block so they may be read by inner entities, but not outer entities.

Since an inner entity is legally allowed to create or delete as many outer entities as it chooses, there are no revocation rules and thus, the system 200-A and/or system 200-B may validate access in the outer account block 850. The blockchain or distributed log may provide a way to find the recent inner account block and outer account block for a given portable user account. In general, an outer block 850 is valid if it references the immediately prior (e.g., recent) valid inner block for the portable user account 800 and if the signature is valid and created by one of the inner entities (e.g., device 810) in that block 800.

In operation, system 200-A and/or system 200-B may generate, by the electronic device 202 (e.g., an inner entity) and for an outer entity (e.g., device 206) associated with the portable user account 100, the first outer account block 850 of the blockchain (e.g., distributed log). The first outer account block 850 may include an outer entity identifier 854 associated with the portable user account 100. The electronic device 202 (an inner entity) may include the public key it received from the outer entity 206 (e.g. 860), the account secrets encrypted with a temporary key (e.g. 868), and this temporary key encrypted with the public key for device 206 (e.g. 864) such that device 206, which holds the corresponding private key, can read the account secrets. The electronic device 202 may generate a hash of the contents of block 850 and sign this hash with its own public key (e.g., 872) so other devices can prove the outer block was produced by an authorized device. The electronic device 202 may generate a second outer account block of the blockchain (block 874) granting account access to a different set of outer entities. The second outer account block 874 may be signed using the private key for account 100 on device 202, similar to block 872. The electronic device may provide the blockchain to other devices using the outer entity identifier 854 associated with the portable user account 100. The systems described herein control access to the portable user account based on portions of the blockchain and/or distributed log (e.g., storage 210 and/or encrypted account data 131).

In general, outer entities cannot modify the set of devices with access to a portable user account. However, outer entities may be able to revoke themselves. Rather than designing a system in which outer entities could themselves create outer account blocks, and using the knowledge that accounts should have at least one inner entity, the system 200-A and/or system 200-B may configure outer entities to publish an outer revocation block 900 stating that the outer entity is revoking itself before the outer entity securely shreds its private key for the account.

Figures 9, 10:
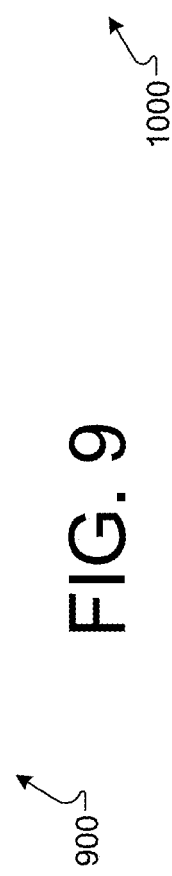
FIG. 9 is a block diagram of an example outer revocation block for use with a portable user account, in accordance with implementations described herein.
FIG. 10 is a block diagram of an example inner account block with recovery for use with a portable user account, in accordance with implementations described herein.

FIG. 9 is a block diagram of an example outer revocation block for use with a portable user account, in accordance with implementations described herein. The outer revocation block 900 includes an account identifier block 854, the hash of the recent outer account block at the time of revocation 870, the public key of the device being revoked 862 and a signature over the block using the corresponding private key 863. In operation, an inner entity may detect the outer revocation block 900 and then may verify that the block 900 is signed with the private key of a valid outer entity. The inner entity may then publish a new outer account block to actually remove the device. The system 200-A and/or system 200-B is configured to trust an outer entity that revokes itself to delete its keys.

FIG. 10 is a block diagram of an example inner account block 1000 with recovery for use with a portable user account, in accordance with implementations described herein. For example, the inner account block 1000 may be configured for use with a recovery account, such as recovery account 130. The portable user account 100 may be configured to grant access rights to the recovery account 130. In this example, the inner account block 800 is shown with the addition of blocks for a recovery account. In particular, the inner account block 1000 includes inner account block 800 with elements for each recovery account.

For example, the inner account block 1000 with recovery includes a first recovery account 1002 and a second recovery account 1004. Each block contains a timestamp at which the recovery account 1002, 1004 becomes valid and ceases to be valid (e.g., if the account is in the process of being replaced). The portable account may be configured to allow one valid recovery account at a time. For example, recovery account 1002 ceases to be valid at time 1006 which, in this example, also represents a time at which recovery account 1004 (e.g., r2) is to become valid. The data for the first recovery account may also include a public key, as indicated at block 1002, for which the recovery provider holds the corresponding private key, and recovery data for use by the recovery provider. For example, the block 1008 specifies the public key of the recovery account, and encrypts a secret key $K_{r1}$=KDF ($K_{inner}$, $KU_{r1}$) to this public key. In general, each inner entity associated with the portable user account for block 1000 can derive this key and read the recovery account data, but different recovery providers cannot read each others recovery data.

In addition, at block 1010, the system 200-A and/or system 200-B may encrypt the identity of the recovery account 1002 in a form that is meaningful to the recovery provider (typically composed of a service provider and an account within that service provider) and the account secrets either directly or indirectly. If the system is configured to provide account secrets indirectly as described in detail below, block 1010 includes the identity of an escrow provider that is holding a wrapped copy of $K_{inner}$, for example.

Similarly, recovery account 1004 may include a time 1012 in which recovery account 1004 becomes valid. The data for this second recovery account may also include a public key and recovery data for use by the recovery provider. For example, the block 1014 specifies the public key of the recovery account, and encrypts a secret key $K_{r2}$=KDF ($K_{inner}$, $KU_{r2}$) to this public key.

Upon encrypting inner account secrets 824, all of the encrypted data and the data encrypted recovery accounts 1002 and 1004 for particular devices are hashed, as shown by hash block 1018. The hash block 1018 may then be signed by the private key corresponding to block author 828, as shown by block 1020.

The inner entities can read the recovery blocks, present UI (using UI generator 234) to users to display and change recovery accounts, as well as deliver a new wrapped copy of $K_{inner}$ to the escrow provider if $K_{inner}$ is to be rotated. In order to recover a portable user account associated with block 1000, for example, the following steps may be carried out. The user may sign into a recovery account (e.g., the $ID_{recovery1}$ in 1010) on a new device. A recovery provider has previously stored $ID_{account}$ and {$KR_{r1}$, $KU_{r1}$} for the portable user account 100 within this recovery account. The recovery provider may request whether or not the user would like to recover the portable user account on to the new device. The user may indicate an affirmed request to recover to the new device. The device may then generate a new key pair for the account 100 (e.g., {$KR_{i3}$, $KU_{i3}$}). The recovery account provider may retrieve the current InnerAccountBlock and use $KR_{r1}$ to decrypt block 1010 to learn the current $ID_{escrow1}$. The recovery provider may then insert a recovery event and $KU_{i3}$ into the blockchain (e.g., distributed log) being monitored by the escrow provider, for example. The recovery provider may then request that the escrow provider provide the wrapped $K_{inner}$. The escrow provider wraps the secret with $KU_{i3}$ (in addition to the wrapping by $KU_{r1}$ that the escrow provider received the secret with) and passes it back to the recovery provider. The recovery provider may remove the wrapping with $KU_{r1}$ and pass the wrapped $K_{inner}$ to the device along with a signed recovery proof (e.g., recovery_proof=S[$KU_{r1}$](t[recovery], $KU_{i3}$, transaction_in_blockchain)). The new device may unwrap $K_{inner}$ and use it to read the account secrets (e.g., hidden account information). The new device may generate a new inner account block and a new outer account block containing the device public key and recovery_proof as evidence of this new block's validity.

In some implementations, additional validation requirements may be placed on particular inner account blocks. For example, when a recovery account is added, the t[start] time (e.g., time 1012) is confirmed to match a predefined correct duration after t[block_creation] and a t[end] (e.g., time 1006) is confirmed to be added to recovery accounts that do not have an established end time. In some implementations, a recovery account may be removed before its t[start] time has arrived, in which case the t[end] time on another recovery account may be removed to, for example, remove a malicious recovery account change before it takes effect. When a recovery account is to be removed, its t[end] time is confirmed to match a predefined duration after t[block_creation] time. In some implementations, new inner account blocks (e.g., InnerAccountBlocks) may not include any recovery accounts whose t[end] time is after t[block_creation] time. Otherwise, recovery accounts and their times, in general, may not be modified from the previous block.

In the event that an inner account block includes a recovery proof, the system 200-A and/or system 200-B uses the recovery proof (e.g., recovery_proof) to trigger confirmation of a valid signature from one of the recovery accounts in the previous block and t[recovery] time is determined to be before the t[end] time for that recovery account in the previous block. In addition, the t[block_creation] time is confirmed to be within a threshold time of t[recovery] time. In some implementations, the inner account block is determined to ensure that it contains either one new inner entity in addition to the devices in the previous block or one inner entity in place of the devices in the previous block. In addition, a public key of the new device is reviewed to ensure that the public key matches that in recovery proof. In some implementations, transactions in the blockchain are confirmed for matching particular blocks in the blockchain, and the public key, account, and timestamp in the transaction are confirmed to match the recovery proof.

In general, the system 200-A and/or system 200-B may use inner account blocks or other blocks in a blockchain or distributed log to verify the validity of modifications to account blocks and should also define how the first block for an account is created. To ensure that accounts are not created with an arbitrary set of devices, the system 200-A and/or system 200-B may define a genesis block as the first inner account block for a particular portable user account. A genesis block generally contains exactly one inner entity with a creation time set to the block creation time and a revocation time of zero. The hash (e.g., H(previous_inner_account_block)) of the genesis block is typically set to zero. The account identifier is typically derived from the public key of the device by some well defined function (e.g., a hash). This may be used to prove that a separate public key has been created for the account and may prevent the creation of arbitrary account identifiers.

FIGS. 11A-11C illustrate block diagrams of example account blocks for use with a portable user account, in accordance with implementations described herein. As shown in FIG. 11A, an inner account block 1100 pending deletion is depicted. Similar to inner account block 800, the inner account block 1100 includes an account identifier block 802, a creation time block 804, and a reference to the hash of the previous block 806 (e.g., the recent valid block for account 100 generated before block 1100). The block 1100 includes an account deletion time block 1102 (e.g., t[account deletion]) defining when the deletion of account 802 is to take effect.

In addition, the block 1100 includes a first inner entity 808 and a second inner entity 810. Each inner entity 808, 810 includes a block creation time (e.g., time 812 and time 814, respectively). In addition, each inner entity 808, 810 includes a last tenured revocation time (e.g., time 816 and time 818, respectively).

The inner entity that generates a block 1100 may encrypt the account secrets 824 using a temporary key (e.g. $K_{inner}$) and provide this temporary key to each of the inner entities by encrypting the temporary key with the public key for each device (e.g. block 820, 822).

The block 1100 also includes elements for two recovery accounts. For example, the inner account block 1100 includes a first recovery account 1002 and a second recovery account 1004. Each block contains a timestamp at which the recovery account 1002, 1004 becomes valid and ceases to be valid (e.g., if the account is in the process of being replaced). For example, recovery account 1002 ceases to be valid at time 1006 which, in this example, represents a time in which account 1004 (e.g., r2) is to become valid. The data for the first recovery account may also include a public key, as indicated at block 1002 and recovery data for use by the recovery provider, encrypted to the recovery provider at 1008.

In addition, at block 1010, the system 200-A and/or system 200-B may encrypt the identity of the recovery account 1002 (typically composed of a service provider and an account within that service provider) and the identity of an escrow provider that is holding a wrapped copy of $K_{inner}$ for example.

Similarly, recovery account 1004 may include a public key (block 1004), a time 1012 at which recovery account 1004 becomes valid, and a temporary key to decrypt recovery data (e.g., 1010), encrypted with the recovery account public key at 1008. The inner account block 1100 includes E[$K_{r1}$]($ID_{recovery1}$, $ID_{escrow1}$) (block 1016).

Upon encrypting inner account secrets 824, all of the encrypted data and the data encrypted recovery accounts 1002 and 1004 for particular devices are hashed, as shown by hash block 1104. The hash block 1104 may then be signed by the private key corresponding to block author 828, as shown by block 1106.

In general, the inner account block 1100 that sets an account_deletion time 1102 should be configured to use a particular predefined offset from the block_creation time 804, for example. Future blocks may remove the account_deletion time but may not modify the account_deletion_time. Once the account_deletion time has passed, the block changes that are allowed are limited to changes that implement the account deletion, for example by removing all devices, recovery accounts, and data from the account.

As shown in FIG. 11B, the inner account block 1100 is shown after deletion as inner account block 1110. In this example, the account identifier block 802, the creation time block 804, the hash block 806 representing a previous inner account block, and the account deletion time block 1102 remain in the block. A hash for this new content may be generated (e.g. block 1112) and signed by the private key corresponding to the device that created 1100 (e.g. 828), as shown by block 1114.

Reducing the block contents after deletion of the portable user account may reduce the chances of anything mistaking an expired, but still fully populated account for valid. In operation, the system 200-A and/or system 200-B may trigger one of the inner entities to perform the reduction of block contents (e.g., cleaning the block) upon observing that the deletion time has passed. In some implementations, such a reduction of block contents may be similar to a policy used to trigger incorporation of outer entity self-revocation. In some implementations, the reduction of block contents may also trigger the device to delete shared resources or links to shared resources associated with the deleted portable user account including logs, distributed storage, etc. Other devices may be prompted to remove their resources for an account once the other devices detect that the particular account has been deleted.

FIG. 11C illustrates an example outer account block 1116 after deletion. The outer account block 1116 may be reduced or cleaned before an inner account block deletion to ensure that the outer block may have an inner entity with which to sign the outer block upon modification. A hash for this new content may be generated (e.g., block 1122) and signed by the private key corresponding to the device that created 1116 (e.g., 828), as shown by block 1124. A hash for an outer account block may also be generated (e.g., block 1120). FIG. 11C also illustrate nonce (block 1118), H(outer_account_block) (block 1122), and S[$KR_{i2}$](H(block)) (block 1124).

In some implementations, the portable user account 100 may be associated with a recovery account 130 according to the example details below. The recovery account may provide a mode of recovery. Provisioning a new device for the portable user account 100 using a recovery account may be recorded in an immutable log (e.g., a blockchain). Thus, if the recovery provider adds new devices onto a user's account (whether by malicious intent, accident, compromise, or compulsion) that fact would be visible to the user in the immutable log.

In a non-limiting example, a user U may have a portable user account ($ID_U$). A recovery provider R may be able to authenticate U and help the user recover the portable user account using a recovery account ($ID_R$). An independent provider ($ID_I$) that can be trusted to not collude with recovery provider R may be used to store data until recovery is requested. The portable user account and the recovery provider may be associated with or have access to a publicly accessible and immutable blockchain (blockchain). The portable user account may be associated with a master secret ($S_U$) that grants complete access to U's portable user account, which may be a concatenation of all the identifiers and key material used to access the account data, for example in a distributed file system or via communication with other provisioned devices. In some implementations, the master secret may be a wrapping key for this material.

In this example, the user may wish to regain access to ($S_U$) at some point in the future, and so registers R as a recovery provider. To register R as a recovery provider for their account, U triggers generation of a unique identifier for this recovery relationship (e.g., $ID_{UR}$=f($ID_U$, $ID_R$)) and completed authentication with R and asks R to register the recovery relationship (e.g., passing $ID_{UR}$ and the identity of the independent provider, ($ID_I$)).

The recovery provider R triggers creation of a new key pair {$KU_R$, $KR_R$} for the relationship, in some implementations using a commutative encryption scheme, and triggers associating ($ID_{UR}$), ($ID_I$), and the private key ($KR_R$) with the user's account in the recovery provider account system. The recovery provider R may add a new entry in the blockchain to register the relationship (e.g., S("create" ||$ID_{UR}$||$ID_I$||{$KU_R$, $KR_R$}). This action may bind the public key, the independent provider identity, and the identity of the recovery relationship, which is signed with the recovery provider's private key. The recovery provider may then return the public key ($KU_R$) to U, encrypt the master secret using ($KU_R$) (i.e. E($KU_R$, $S_U$), request that the recovery provider R sign a hash H using ($KR_R$) (where H=H($ID_{UR}$||E({$KU_R$, $S_U$}))), and request that the independent provider identity store the recovery relationship, passing ($ID_{UR}$), S(H, $KR_R$), and E($KU_R$, $S_U$).

The independent provider (I) triggers verifying that I is listed as the independent provider for ($ID_{UR}$) in the blockchain, triggers verifying that H is consistent with the remainder of the request and is correctly signed with the same key that registered the recovery relationship, and stores (ID $KU_R$) and E($KU_R$, $S_U$) in a key-value map.

In this example, the blockchain documents the existence of the recovery relationship and the account secret has been preserved, but neither R nor I have access to the secret in a form they may use. To recover the account onto a new device (D, U) the device creates a new key pair for the account/device combination {$KU_{UD}$, $KR_{UD}$} using the same commutative encryption scheme described above and authenticates with R and requests that R recover the account, thus passing the public key for (D, $KU_{UD}$).

In response, the recovery provider may retrieve ($ID_{UR}$), ($ID_I$), and ($KR_R$) from the user's account in the recovery provider account system and may add a new entry in the blockchain to record the start of the recovery event (e.g., S("start_recovery"||ID $U_R$||$KU_{UD}$, $KR_R$). This action may bind the new device public key to the recovery relationship and is signed with the same key R used when creating the relationship. The recovery provider may also request that I provide a wrapped secret, thereby passing ($ID_{UR}$) and signing the request with ($KR_R$).

In response, the independent provider verifies that ($ID_I$) is still listed as the current independent provider for ($ID_{UR}$) in the blockchain, that a recent start recovery event is recorded in the blockchain without a subsequent finish_recovery event, and that the incoming request is correctly signed with the same key that registered the recovery relationship. The independent provider may also retrieve E($KU_R$R, $S_U$) from storage using ($ID_{UR}$), encrypt E($KU_R$, $S_U$) using the public key read from the blockchain, (i.e. E($KU_{UD}$, E($KU_R$, $S_U$)), add a new entry in the blockchain to record the end of the recovery event, (e.g., S("finish_recovery"||ID $U_R$||$KU_{UD}$, $K_I$)). This entry ensures that the independent provider (I) releases the wrapped key once for each recovery event. It may be signed using a private key (K I) known to the independent provider, but not other providers or accounts and may prevent availability attacks involving malicious insertion of finish_recovery events. The independent provider may then return the wrapped secret E($KU_{UD}$, E($KU_R$, $S_U$)) to the recovery provider R and may remove one layer of encryption from the wrapped secret by decrypting with ($KR_R$), (i.e. $E(KU_{UD}, S_U)$ using commutative encryption, for example. The independent provider may then return $E(KU_{UD}, S_U)$ to U and decrypt the wrapped key using ($KR_{UD}$) to recover ($S_U$). In this example, the user recovered the account secrets without either I or R gaining access. The independent provider I does not release the wrapped secret without the recovery event being recorded in the blockchain thus ensuring that the wrapped secret is released once per recovery event.

In some implementations, it may be convenient to provide one account power over another account. For example, defining account administrators for enterprise accounts, providing legal guardians an ability to monitor and control usage of the account by other particular users, and providing users administration and maintenance access to the accounts for other relatives that may not wish to maintain accounts and/or devices.

As used herein, a portable user account or group with power over another account may be defined as an administrator of such account or group. These relationships are powerful and have tremendous capability for misuse, thus the system 200-A and/or system 200-B may track the existence of an administration relationship as well as the type of relationship. Any addition of a new administration relationship may trigger consent requests from both accounts (and/or users of the accounts). In addition, the new administration relationship may be configured with a delay of rights. In some implementations, particular accounts may specify in the blockchain during provision of accounts and/or devices that such accounts and/or devices may not be configured with an administrative entity. In addition, portable user accounts with administrators may identify an administrator account or group in their inner account block, along with information about the relationship type and start and end times if available. The inner account secrets may be encrypted to the current public key of the administrator.

FIG. 12 is a block diagram of an example inner account block 1200 with an administrator for use with a portable user account, in accordance with implementations described herein. In general, inner block validation can function to limit the allowed changes to blocks using rules that are appropriate to the type of administration relationship with the portable user account 100, for example. Changes may be made to the inner account block if the changes are signed using a private key corresponding to a public key of the administrator (e.g., a different portable account within system 200) subject to a similar set of rules as the other inner entities. When an administrator wishes to rotate its public key, private key pair, the administrator triggers rotation of information in the inner account block.

As shown in FIG. 12, the inner account block 1200 includes an account identifier block 1202, a creation time block 1204, and a hash block 1206 of the previous block (e.g., the newest recent block generated for account 1202 before block 1200). The block 1200 includes an administrator identifier block 1208 with a respective start time 1210 and end time 1212 for the administrator account usage. The inner account block may also include a temporary key to access the account secrets, encrypted to a public key for the administrator, as shown at block 1214.

In addition, the block 1200 includes a first inner entity 1216 and a second inner entity 1218. Each inner entity 1216, 1218 includes a block creation time (e.g., time 1220 and time 1222, respectively). In addition, each inner entity 1216, 1218 includes the last time the device performed a revocation of a tenured inner entity (e.g., time 1224 and time 1226, respectively).

The inner entity that generates a block 1200 may encrypt the account secrets 1230 using a temporary key and provide this temporary key to each of the inner entities by encrypting the temporary key with the public key for each device, as indicated at blocks 1232 and 1234.

The block 1200 also includes elements for two recovery accounts. For example, the inner account block 1200 includes a first recovery account 1236 and a second recovery account 1238. Each block contains a timestamp at which the recovery account 1236, 1238 becomes valid and ceases to be valid (e.g., if the account is in the process of being replaced). For example, recovery account 1236 ceases to be valid at time 1240 which, in this example, represents a time in which account (e.g., r2) is to become valid. The data for each recovery account may also include recovery data for use by the recovery provider. For example, the block 1236 specifies the public key of the recovery account, and encrypts a secret key $K_{r1}=KDF(K_{inner}, KU_{r1})$ to this public key in block 1242. In general, each inner entity associated with the portable user account for block 1200 can derive this key and read the recovery account data, but different recovery providers cannot read each others recovery data.

In addition, at block 1244, the system 200-A and/or system 200-B may encrypt the identity of the recovery account 1236 (typically composed of a service provider and an account within that service provider) and the identity of an escrow provider that is holding a wrapped copy of $K_{inner}$ for example.

Similarly, recovery account 1238 may include a time 1246 in which recovery account 1238 becomes valid. The block 1238 specifies the public key of the recovery account, and encrypts a secret key $K_{r2}=KDF(K_{inner}, KU_{r2})$ to this public key in block 1248. In general, each inner entity associated with the portable user account for block 1200 can derive this key and read the recovery account data, but different recovery providers cannot read each others recovery data.

Upon encrypting inner account secrets 1230, the encrypted data and the data encrypted recovery accounts 1236 and 1238, the content of the inner account block is hashed, as shown by hash block 1252. The hash block 1252 may then be signed by the private key owned by the device that created the block (e.g., the block author in 1254), as shown by block 1256. The block 1200 includes $E[K_{r1}]$ ($ID_{recovery1}$, $ID_{escrow1}$) (block 1250).

FIG. 13 is a block diagram of an example transparent group block 1300 for use with a portable user account, in accordance with implementations described herein. A transparent group block lists other groups and/or accounts associated with a particular group. Each of the elements in the list represents either an administrator member or a non-administrator member of the group.

Referring to FIG. 13, the transparent group block 1300 is configured to distribute a public key/private key pair for a group to all members of that group, where members may either be portable user accounts or other groups. Each member of a group defines a public key/private key pair that is known to all provisioned inner entities. The key pair of a group member is rotated each time a revocation occurs for an inner entity. The key pair for a group is rotated each time one of the member's keys is rotated and each time a group member is removed.

In some implementations, the members of a group may be split into administrator members and non-administrator members, in which case the administrator members may make changes to the group, but no other members may make changes to the group. In some implementations, the genesis block for a group contains one or more administrators and is signed by a public key with a hash block that represents the group identifier. This may prevent the creation of groups with arbitrary identifiers.

As shown in FIG. 13, the transparent group block 1300 includes a group identifier block 1302, a creation time block 1304, and a hash block 1306 of the previous block (e.g., the transparent group block representing the state of group 1302 immediately before the creation of block 1300). In addition, the block 1300 includes a first admin account member identifier 1308 and a first group account member identifier 1310. Three non-administrator members are also shown in block 1300 including a second account member identifier 1312, a second group member identifier 1314, and a third account member identifier 1316. The public key for the group is included without encryption as shown in block 1328 and the private key for the group is encrypted to each of the group members using their public keys as indicated at blocks 1318, 1320, 1322, 1324, and 1326, respectively.

The contents of a transparent group block (e.g. blocks 1302 through 1328) may be hashed, as shown by hash block 1340. The hash block 1340 may then be signed by the private key corresponding to the group member that created the block 1342 (e.g., the first administrator account), as shown by block 1344.

In operation, a particular transparent group block is valid if the previous block is a recent legal block for the group, the t[block_creation] time is after the previous block and near a time when the block was inserted in the blockchain/distributed log, the signature is valid and produced by the declared approved author, and either (1) the author account is an administrator in the previous block, or a member of any group that is an administrator of the current group or (2) the author is a member in the previous block, and the change being made is to the encrypted value for that member.

In some implementations, when a device provisioned with an account that is a member of a group is revoked remotely, the system 200-A and/or system 200-B may ensure that the device does not retain access to the group. The revoking device can then rotate the account key pair used in the group membership and then proceeds to update the transparent group block. Where the account is an administrator member of the group, the revoking device can replace the account key and also rotate the public/private key for the group. Where the account is a non-administrator member of the group, the revoking device does not have the capability to rotate the group public/private key pair, but it can update the account public key so that the revoking device can learn of any later changes to the group and may also mark the group as awaiting a rotation. Some time later an entity with administrative rights can perform the group rotation (e.g., set a new public/private key pair for the group), thus ensuring that the revoked device can no longer act as a member of the group. In addition, changes may be noted in the blockchain or distributed log, which may provide an efficient way for accounts and groups to list all the groups in which the accounts and/or groups are members.

Figure 14:
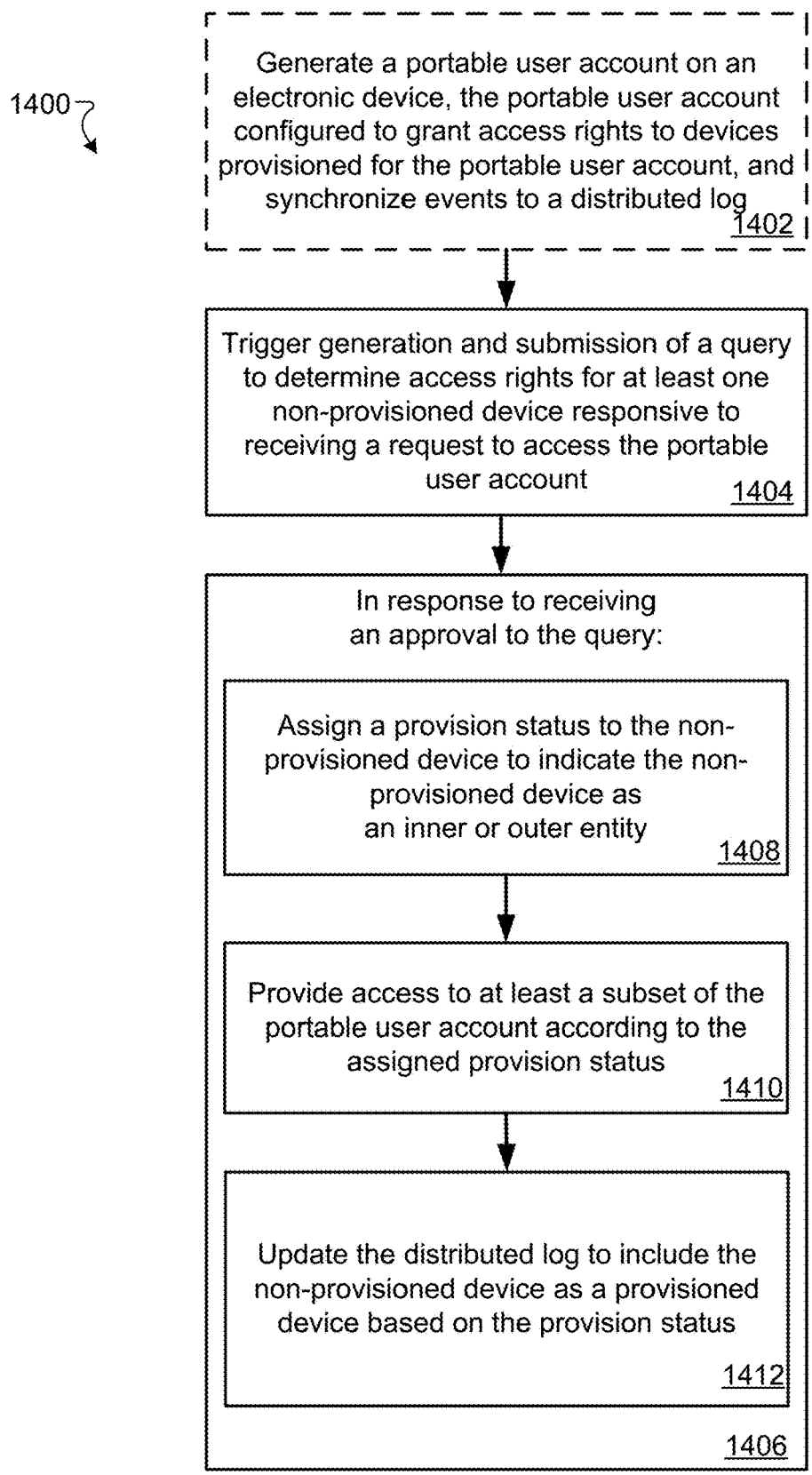
FIG. 14 is a flowchart of an example process of generating a portable user account for use with electronic devices, in accordance with implementations described herein.

FIG. 14 is a flowchart of an example process 1400 of generating a portable user account for use with electronic devices, in accordance with implementations described herein. The process 1400 may be described with reference to system 200, blocks 800 and or 850, for convenience.

At block 1402, the process 1400 may optionally include generating a portable user account 100 on an electronic device, such as device 202, 204, or 206. The portable user account 100 may be configured to store account data 232, grant access rights to other devices provisioned for the portable user account (e.g., via device manager 226 and/or user manager 228, and negotiating blockchain or distributed log transactions corresponding to events associated with the portable user account 100, as described in detail above. Block 1402 may be optional in process 1400 because such a portable user account 100 may be set up by a different approved (or first) electronic device additional access requests to access account 100 are received. For example, the portable user account may be generated before carrying out process 1400 by configuring a first device with the portable user account 100. Subsequent devices may then request access to the portable user account 100. In some implementations, process 1400 may generate the portable user account 100 for access by the subsequent requesting devices, as depicted in FIG. 14.

In general, process 1400 can configure or obtain access to previously configured plurality of devices. The plurality of devices may be configured with a portable user account, such as portable user account 100, to synchronize account events to a distributed log. In general, the plurality of devices includes at least one device that includes memory and at least one processor configured to execute the following instructions.

For example, the configuration of the plurality of other devices may be preconfigured as inner entities or outer entities before process 1400 is carried out. In some implementations, process 1400 may perform the configuration of the device entity status. For example, device 202 may be defined as an inner entity that a user may use to provision other devices. In addition, such inner entities may be configured to add additional devices and remove any of the devices provisioned for the portable user account 100. The removal of devices may be subject to time limits according to a policy associated with the portable user account 100, as described in detail above. Similarly, device 206 may be provisioned as an outer entity configured with fewer privileges than an inner entity. For example, the outer entity 206 may be configured to allow self-revocation from the portable user account 100, but not the revocation of other devices from account 100. In some implementations, the devices in the plurality of devices that are provisioned as an inner entities are configured to add additional devices and remove any of the devices provisioned for the portable user account where the addition and removal being time delayed according to a policy associated with the portable user account. In some implementations, the devices in the plurality of devices provisioned as outer entities are configured to self-revoke from the portable user account.

In some implementations, provisioning the portable user account for the other devices is performed as a feature of the operating system of the respective device being provisioned to access the portable user account. For example, the system 200-A and/or system 200-B may determine an underlying operating system for a device to determine whether the device may be provisioned as an inner entity, for example. In some implementations, the device may be provisioned as an inner entity using an application to provision and/or authenticate the device, rather than as a feature of the underlying operating system.

At block 1404, the process 1400 includes generating and triggering a query (e.g., query 242) to determine access rights for the at least one other device, in response to receiving, by the at least one device of the plurality of devices and from at least one other device, a request to access the portable user account. In some implementations, the request includes information associated with the at least one other device. The information associated with the at least one other device may include at least one unique access key and an author identifier corresponding to at least one of the plurality of devices that is provisioned as an inner entity within the distributed log.

For example, software operating on an inner entity or an outer entity device may request access to account details or account personae so that the user of the respective device may access services, applications, or other account-based items. In some implementations, the user authenticator 250 may use the portable account manager 216 (e.g., account data 232) to generate and trigger the query 242 (see FIG. 2A and/or FIG. 2B).

In response to receiving an approval to the query (block 1406), at block 1408, the process 1400 includes assigning a provision status of the at least one other device (e.g., inner entity 202 or outer entity 206) providing the request. The provision status may indicate whether the at least one other device is assigned as an inner entity or as an outer entity. For example, the portable account manager 216 on a provisioned inner entity device can assign a provisions status to a non-provisioned device, such as the at least one other device requesting access to account 100 (see FIG. 2A and/or FIG. 2B).

At block 1410, the process 1400 includes providing, for the at least one other device, access to at least a subset of the portable user account 100 according to the assigned provision status. For example, if the at least one other device is assigned as an inner entity, access to the entirety of the data (and/or functionality) of the portable user account 100 may be provided to the at least one other device (e.g., the requesting device). If instead, the at least one other device is assigned as an outer entity, particular portions of the data (and/or functionality) associated with the portable user account 100 may be provided to the data. The particular portions may not include data or functionality that is deemed private or hidden by the user and/or device assigned as an inner entity and associated with the portable user account 100.

In some implementations, additional actions may be performed before providing particular access to the portable user account. For example, the system 200-A or 200-B may determine, using a valid account block retrieved from the distributed log 212 and associated with the electronic device, whether the request includes a reference to the valid account block. The determination may include comparing the reference to portions of the valid account block generated at a specified time period indicated in the valid account block. In some implementations, the portions include at least an account block creation time (e.g., creation time 804) and an account block author identifier (e.g., block author 828). For example, a valid account block represents an account block generated by a validated (e.g., properly provisioned) inner entity or a validated outer entity. In the example of FIG. 8A, the block author 828 is indicated as the second inner account 808. If the block 800 were provided in process 1400 as the valid account block, the reference to the account would be matched. Similarly, if the block 850 were provided from an outer entity, the reference to the account would be matched. However, if the author were different and did not match appropriate references, access to the account would be denied.

In some implementations, the account block author identifier may correspond to the electronic device making the request or to at least one of the other devices provisioned as an inner entity. In some implementations, the electronic device is a mobile device configured as an inner entity. Each inner entity may be capable of maintaining the portable user account 100 in combination with other provisioned inner entities in a local log configured to synchronize with the distributed log using blockchain transactions, for example. In some implementations, the portable user account is a self-sovereign identity account, as described in detail above.

Upon determining that the reference and the portions match, the process 1400 includes providing for the at least one other device, access to at least a subset of the portable user account 100 according to the determined provision status.

In some implementations, the process 1400 also includes generating a device access event by generating a new block for the blockchain (or distributed log, storage 210, etc.) and appending (e.g., updating) the new block in the distributed log to memorialize the request and device access event in the blockchain (or distributed log, storage 210, etc.) in response to determining that the reference and the portions match. For example, at block 1412, the process 1400 may update the distributed log 212 to include the at least one other device (i.e., the previously non-provisioned device) to be indicated in the log as a provisioned device based on the assigned provision status.

In some implementations, the process 1400 may further include receiving a disapproval response to the query. In response to receiving the disapproval response, the process 1400 may include denying access to the portable user account for the at least one other device, and updating the distributed log to include an event corresponding to the triggered query. For example, the portable account manager 216 may receive a disapproval from services 218 or other entity over network 214 and may then deny access to account 100 for the requesting device and updated the distributed log 212 to the disapproval event.

In some implementations, the process 1400 includes generating, using the electronic device 202, a recovery account 130 for the portable user account 100. The recovery account 130 may be generated as a recovery block 1000 (FIG. 10) in the blockchain (or transparency log, storage 210, etc.). The recovery block 1000 may include at least a timestamp 1012 at which the recovery account becomes valid, a timestamp 1006 in which the recovery account ceases to be valid (e.g., if the account is in the process of being replaced), an identity of a service provider configured to provide access to the portable user account 100, and an encrypted key shown in blocks 1008 or 1014 shown as (private key Kr1) readable by provisioned inner entities (e.g., at least device 202 and 204). The recovery block 1000 includes block 1016, which is $E[K_{r1}](ID_{recovery1}, ID_{escrow1})$.

In response to detecting use of the recovery account 130, the process 1400 may generate a recovery account access event by generating a new block for the distributed log (e.g., a blockchain or distributed log) in which block 1000 belongs. The process 1400 may additionally append the new block in the distributed log to memorialize the recovery account access event in the distributed log (e.g., a blockchain, distributed log 212, storage 210).

In some implementations, the portable user account 100 is associated with a number of personae. Each of the plurality of personae may be configured to obfuscate an identity of a user associated with the portable user account. For example, each persona associated with the portable user account may not cross over to another persona associated with the portable user account. In some implementations, each of the plurality of personae may be configured to include customized data for the portable user account that disassociates others of the plurality of personae. For example, each persona may include data that ensures that other personas associated with the user may not be traced to one another.

Figure 15:
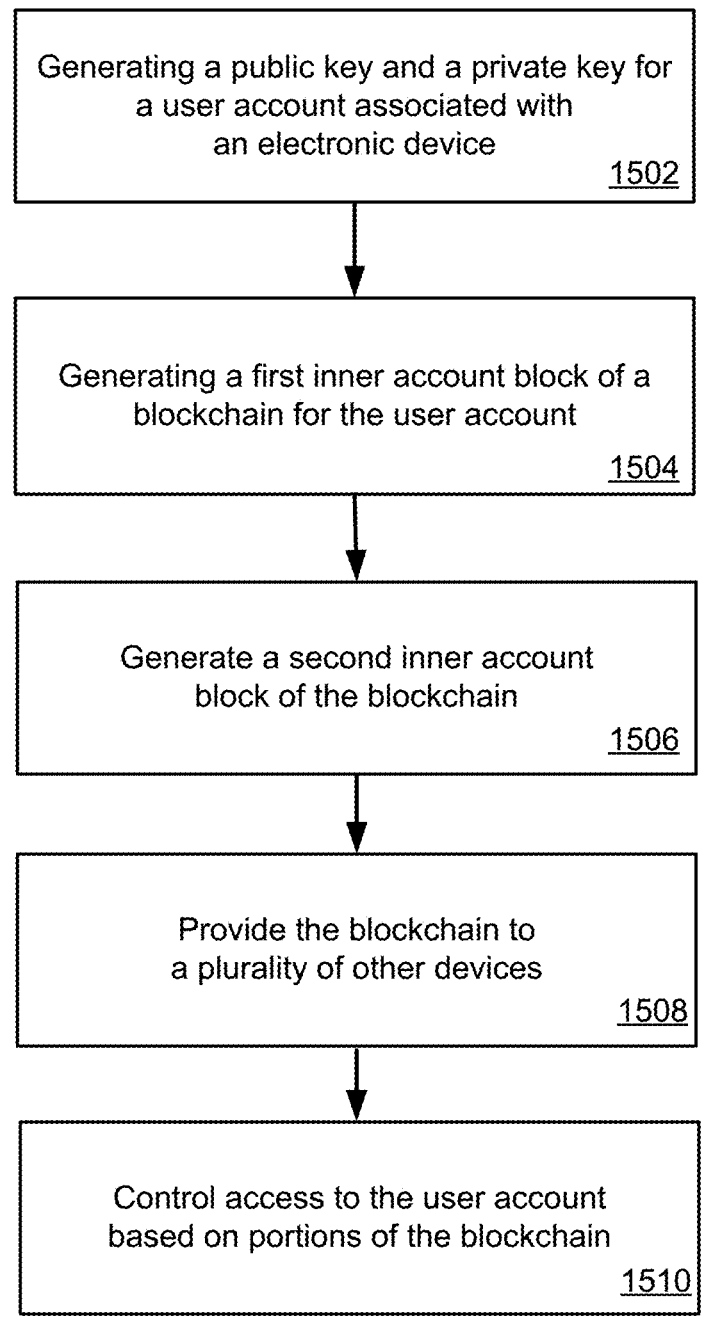
FIG. 15 is a flowchart of an example process for providing decentralized access to a portable user account, in accordance with implementations described herein.

FIG. 15 is a flowchart of an example process 1500 of providing decentralized access to a portable user account, in accordance with implementations described herein. The process 1500 may be described with reference to system 200-A and/or system 200-B, blocks 800 and or 850, for convenience.

At block 1502, the process 1500 includes generating, by the electronic device, a public key and a private key for the electronic device. The electronic device may be electronic device 202, which may represent an inner entity (e.g., device). The electronic device 202 may generate a public key (for encrypting data to the device) and a private key (for decrypting data for the device and for generating signatures) for the inner entity 204, for example. The user account may be portable user account 100, which may be associated with electronic device 202, for example. In some implementations, the association may include configuration as an inner entity with access and/or control of access to user account 100.

At block 1504, the process 1500 includes generating, by the electronic device, a first inner account block on a blockchain (e.g., distributed log 212) for a portable user account (e.g., portable user account 100). The first inner account block (e.g., inner account block 800) may include an identifier (e.g., identifier 802 with a device/account pair and/or block 806 creation time and/or other identifier for the user account). The first inner account block may also include the public key for the user account on the electronic device (e.g., public key 244, shown at block 820 and 822). The first inner account block may also include encrypted data for the user account 100 including, but not limited to secrets shown in block 824. The first inner account block may also include a signature (e.g., as shown at block 830) over the contents of the first inner account block using the private key for the user account on the electronic device. In some implementations, the signature may be a signed set of data in which the device may take a hash of a portion of the data (e.g., a portion of a message, a block, etc.) and then sign the hash. In operation, the system 200-A and/or system 200-B may generate block 800 by generating by an electronic device 202, for example, the first inner account block 800 on a blockchain for the portable user account 100 including the associated electronic device 202, which represents an inner entity.

In some implementations, account data may be defined in an outer account block and as such, the system may generate a first outer account block after generating the inner account block. In some implementations, a "first" block may refer to a first block in a blockchain for a particular account. Additional numbered blocks may refer to the successive blocks generated for the blockchain that began with the first block.

At block 1506, the process 1500 includes generating a second inner account block for the portable user account on the blockchain. The second inner account block may include a new device with access. The second inner account block may be signed by the private key of the device that creates it. For example, the electronic device 202 may generate a second inner account block of the blockchain. The second inner account block may include a list of electronic devices with access to the user account. For example, the second inner account may be generated by a device other than the electronic device to provide access to the user account via the other device. That is, if a user provides content and can match the last known account block in the blockchain and do so on a different electronic device, the different electronic device may be provided access to the user account. In some implementations, the second inner account block may also include access to encrypted user account data including, but not limited to account secrets, device secrets, signatures, etc. The second inner account block may also be updated from the first inner account block and signed by the private key for the user account to ensure that other devices that have access to the private key may use the key and the blockchain to gain access to the user account.

In some implementations, the second inner account block may also include the identity of the account 802, an encrypted block containing the hidden account information 824, the identity of the inner entity generating the block 828, and a signature over the contents of the inner account block by that device 830.

In some implementations, the second inner account block may include the hash of the previous inner account block 806 for the user account and may be signed by the private key associated with the portable user account 100 on the inner entity (e.g., electronic device 202).

At block 1508, the process 1500 includes providing, using the identifier associated with the user account, the blockchain to a plurality of other devices. For example, the blockchain may be distributed to any of the devices provisioned for the portable user account 100, for example. The electronic device 202 may provide, using the identifier (e.g., device-account pair) associated with the portable user account, the blockchain of blocks to a plurality of other devices (e.g., devices 206, 102-124).

In some implementations, the blocks of the blockchain may be stored on a publicly accessible blockchain and the plurality of devices may access the blocks from that blockchain once given the account identifier.

At block 1510, the process 1500 includes controlling access to the user account based on portions of the blockchain. For example, controlling access to the portable user account may include an electronic device 204 decrypting hidden account data from the most recent block for the account in the blockchain using a private key it established when the user account was provisioned on device 204. Devices that should have access to the user account are included in the most recent block and therefore such devices are capable of decrypting the recent hidden account data.

In some implementations, controlling access to the user account based on portions of the blockchain includes controlling access to a generalized distributed storage service for the account (e.g., service 218) and controlling access to properties of the account, for example the names a user has assigned to each of the devices with access to the account. For example, the process 1500 may control access to the user account based on a name associated with the electronic device when the electronic device is configured as an inner entity.

In some implementations, the user account is a digital account for accessing a plurality of other services. The user account may be associated with a user identity and one or more user-defined personas. Each personae may be configured to access applications, user account data, and different services in the plurality of services. In some implementations, the inner entity revocation time represents the last timestamp (e.g., timestamp 816 or 818) in which the inner entity 202 performed a revocation or another tenured inner entity.

In some implementations, the block 800 may be used to generate a tenured status for the inner entity 202 in response to determining that the inner entity 202 has been provisioned to access the portable user account beyond a threshold number of days. Having tenured status permits the inner entity 202 to delete other tenured inner entities, possibly subject to a policy on the minimum time delay between such revocations. The time delay policy may indicate a wait time before revocation of access to the portable user account.

In some implementations, the process 1500 includes generating, by the electronic device and for an outer entity (e.g., device 206) associated with the portable user account, a first outer account block (e.g., block 850) of the blockchain (or distributed log). The first outer account block 850 may include the account identifier 854 associated with the user account.

For example, the system 200-A and/or system 200-B may generate, by the electronic device 202 (e.g., an inner entity) and for an outer entity (e.g., device 206) associated with the portable user account 100, the first outer account block 850 of the blockchain (e.g., distributed log). The first outer account block 850 may include the account identifier 854 associated with the portable user account 100. The electronic device 202 (an inner entity/device) may receive a public key from device 206 for which device 206 holds the corresponding private key.

The electronic device 202 may encrypt the secret data for the account using a temporary key (e.g. 868) and use the public key of the outer entity 206 to encrypt this temporary key such that device 206 can read it (e.g., 864). The electronic device 202 may generate a second outer account block of the blockchain (block 874). The second outer account block 874 may include the account identifier 854. The second outer account block 874 may include encrypted data for the account and be signed using the private key of the device that created it, similar to block 872. The electronic device may let other devices use or verify the portable user account by providing the account identifier 854 such that they can retrieve inner and outer blocks for the account from the blockchain. The electronic device 202 can control access to the portable user account based on portions of the blockchain or distributed log.

In some implementations, the inner entity is configured to enable a plurality of additional devices to access the user account based on matching portions of the last block for the user account in the blockchain. An inner entity (e.g., device) may be configured to revoke access to any device associated with the user account while an outer entity (e.g., device) is configured to revoke access for itself, but not for any of the other devices.

For example, the system 200-A and/or system 200-B may generate, by the electronic device 202 (e.g., an inner entity) and for an outer entity (e.g., device 206) associated with the portable user account 100, the first outer account block 850 of the blockchain (e.g., distributed log). The first outer account block 850 may include the account identifier 854 associated with the portable user account 100. The electronic device 202 (an inner entity) may receive a public key from device 206 for which device 206 holds the corresponding private key.

The electronic device 202 may encrypt the secret data for the account using a temporary key (e.g. 868) and use the public key of the outer entity 206 to encrypt this temporary key such that device 206 can read it (e.g., 864). The electronic device 202 may generate a second outer account block of the blockchain (block 874). The second outer account block 874 may include the account identifier 854. The second outer account block 874 may include encrypted data for the account and be signed using the private key of the device that created it, similar to block 872. The electronic device may let other devices use or verify the portable user account by providing the account identifier 854 such that they can retrieve inner and outer blocks for the account from the blockchain. The electronic device 202 can control access to the portable user account based on portions of the blockchain or distributed log.

In some implementations, the inner entity is configured to enable a plurality of additional devices to access the user account based on matching portions of the last block for the user account in the blockchain. An inner entity may be configured to revoke access to any device associated with the user account while an outer entity is configured to revoke access for itself, but not for any of the other devices.

A number of examples to handle portable user account recovery are described below. In the examples, a User A has not configured a recovery account. A User B has configured a recovery account using user-controlled authentication factors. A User C has configured a recovery account without user-controlled authentication factors. A local attacker is a person that gains physical access to one of the user devices. In some scenarios, an attacker may represent a network attacker. While the term "account" may be used throughout the examples below, each "account" may be or have access to "a portable user account," as described herein.

User A Scenario 1—Lose Sole Inner Device

Figure 16:
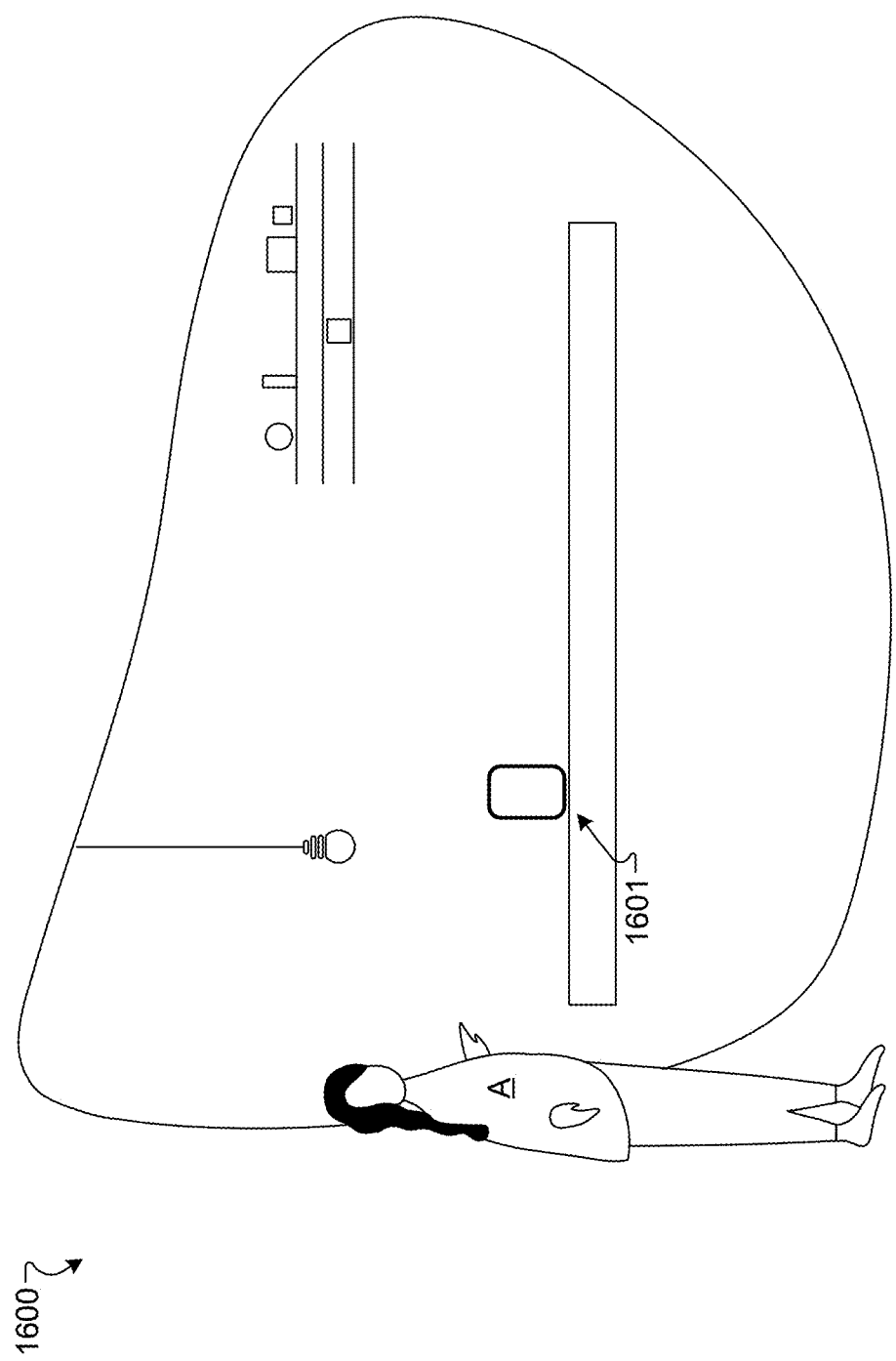
FIGS. 16 through 26 are examples of using a portable user account without configuring a recovery account, in accordance with implementations described herein.

As shown in FIG. 16, a user A is shown in an environment 1600. In this example, user A has a device 1601 configured to function with a user account operating as a self-sovereign identity (SSI) portable account, as described in detail above. In this example, the device 1601 represents a tablet device provisioned for the user account as an inner device. In this example, the device 1601 represents the sole device associated with, or operational within, the user account of user A. No recovery account or service is configured for the user account of user A.

At some point in time, the device 1601 is, in some manner irreparably damaged, or damaged beyond repair, such that the device 1601 is rendered inoperable. In this example, the user A has no recovery account or service configured for the user account, and the device 1601 is the single device associated with the user account. Without access to the user account, via another device, or a recovery account, user A has no means of accessing the user account. Thus, in this example, user A loses access to the user account, unless the user A has otherwise saved or stored account configuration information and is able to manually re-configure the user account.

User A Scenario 2—Sole Inner Device is Stolen

Figure 17:
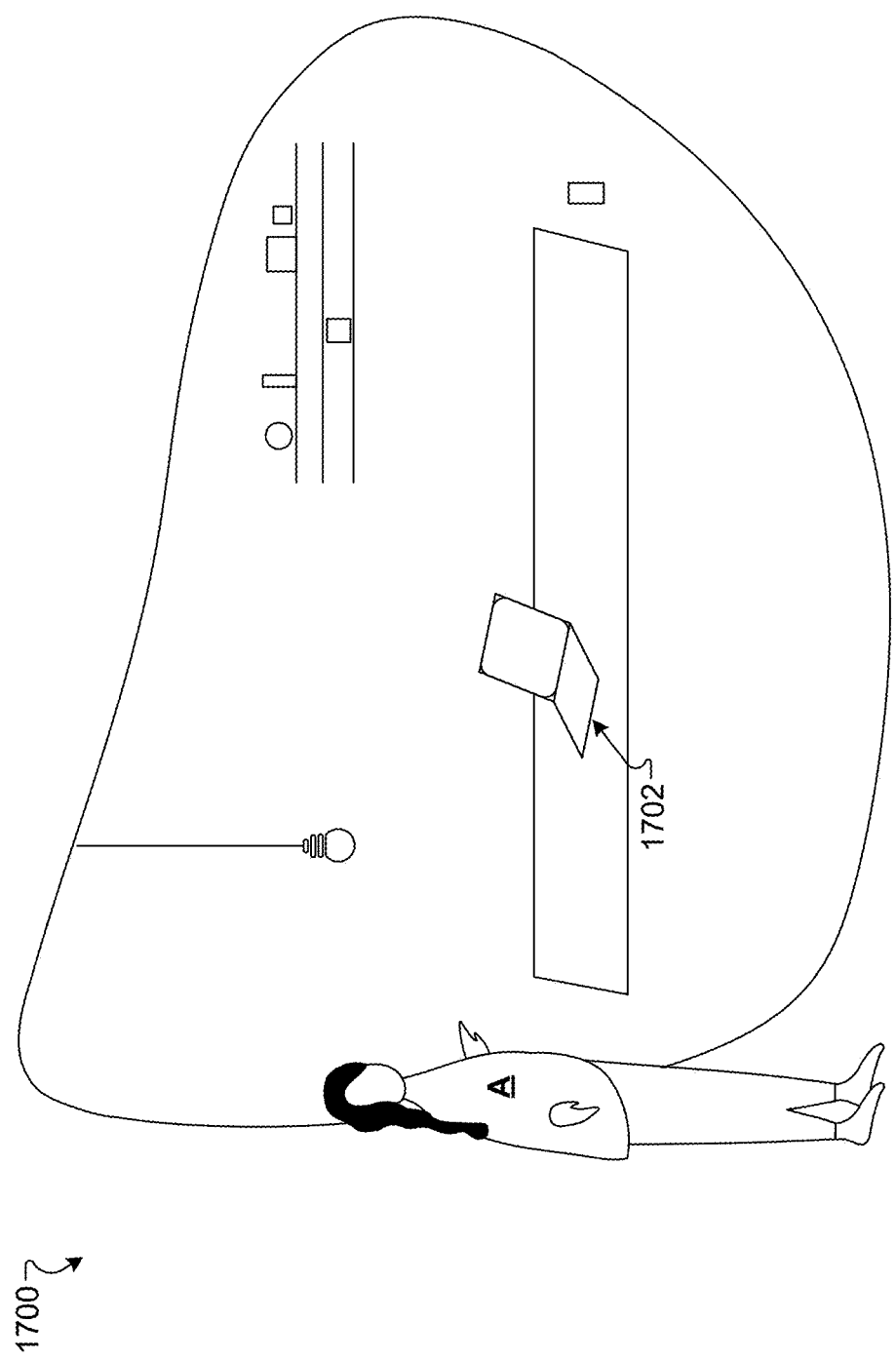

As shown in FIG. 17, a user A is shown in an environment 1700. In this example, the user A has a device 1702 configured to function with a user account operating as an SSI portable account, as described in detail above. In this example, the device 1702 represents a laptop computing device provisioned for the user account as an inner device. In this example, the device 1702 represents the sole device associated with, or operational within, the user account of user A. No recovery account or service is configured for the user account of user A.

At some point in time, user A loses possession of the device 1702. For example, the device 1702 may have been lost by the user A, or may have been stolen while left unattended by the user A. An attacker, for example, a local attacker, may gain access, for example, physical access, to the lost/stolen device 1702, and attempt to steal user information from the lost/stolen device 1702. In this example, the device 1702 may have a local authentication protocol, such as entry of a password or personal identification number (PIN), configured as local device protection.

In some implementations, the attacker may add new devices every few days using a compromised device but modifies the user interface of the compromised device so it does not display these attacker controlled devices. The attacker may use same vulnerability that allowed the remote exploitation of a single device to compromise multiple devices at the same time.

If the attacker overcomes the local device protection, the attacker may gain access to the user account. Because no recovery account or service is configured for the user account, and the device 1702 is the single device associated with the user account, the user A has no means of accessing the user account and protecting the lost/stolen device 1702 and the user account from the attacker. In this situation, the attacker gains permanent and exclusive access to the user account.

If the attacker is unable to quickly defeat the local device protection, the attacker may instead perform a factory reset of the device 1702, and continue to use the device 1702 with their own account, or sell the device 1702. In this situation, without access to the user account, via another device, or a recovery account, user A has no means of accessing the user account, and thus loses access to the user account, unless the user A has otherwise saved or stored account configuration information and is able to manually re-configure the user account.

User A Scenario 3—Lose One of Two Inner Devices

Figure 18:
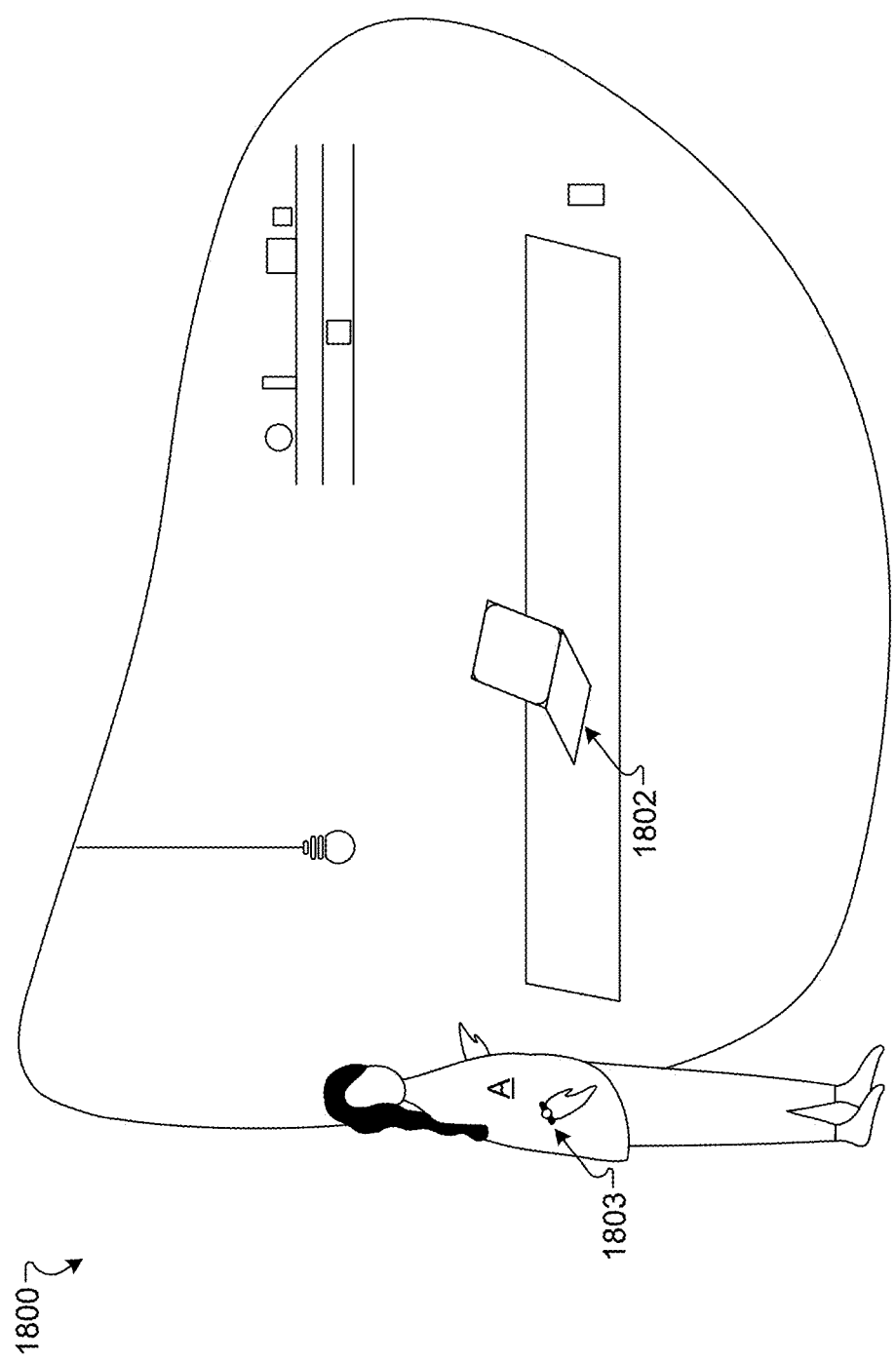

As shown in FIG. 18, a user A is shown in an environment 1800 with a number of electronic devices. For example, the user A may have a device 1802 and a device 1803 configured to function with a user account operating as an SSI portable account, as described in detail above. In this example, the device 1802 represents a laptop computing device provisioned for the user account as an inner device. The device 1803 represents a wrist-worn mobile device, or a watch, provisioned for the user account as an inner device. No recovery account or service is configured for the user account of user A.

At some point in time, the device 1802 is, in some manner irreparably damaged, or damaged beyond repair, such that the device 1802 is rendered inoperable. In response to the determination that the device 1802 is inoperable, or beyond repair, the user A may choose to replace the device 1802 with a new device (for example, a new laptop computing device) and add the new laptop computing device to the user account. In this example, the user A has no recovery account or service configured for the user account. However, the user A still has access to, and use of the device 1803, which is provisioned as an inner device for the user account. In a situation in which the remaining device 1803 is a tenured inner device, the user A may use the device 1803 to revoke the now inoperable device 1802. The user A may also provision the new laptop computing device with the user account using device 1803, and maintain full control of all devices that have access to the user account. In some situations, the user account may be configured to include a policy or rule that disallows tenure of a new device until after a predefined time period W has elapsed, corresponding to device association to the user account.

User A Scenario 4—One of Two Inner Devices is Stolen

Figure 19:
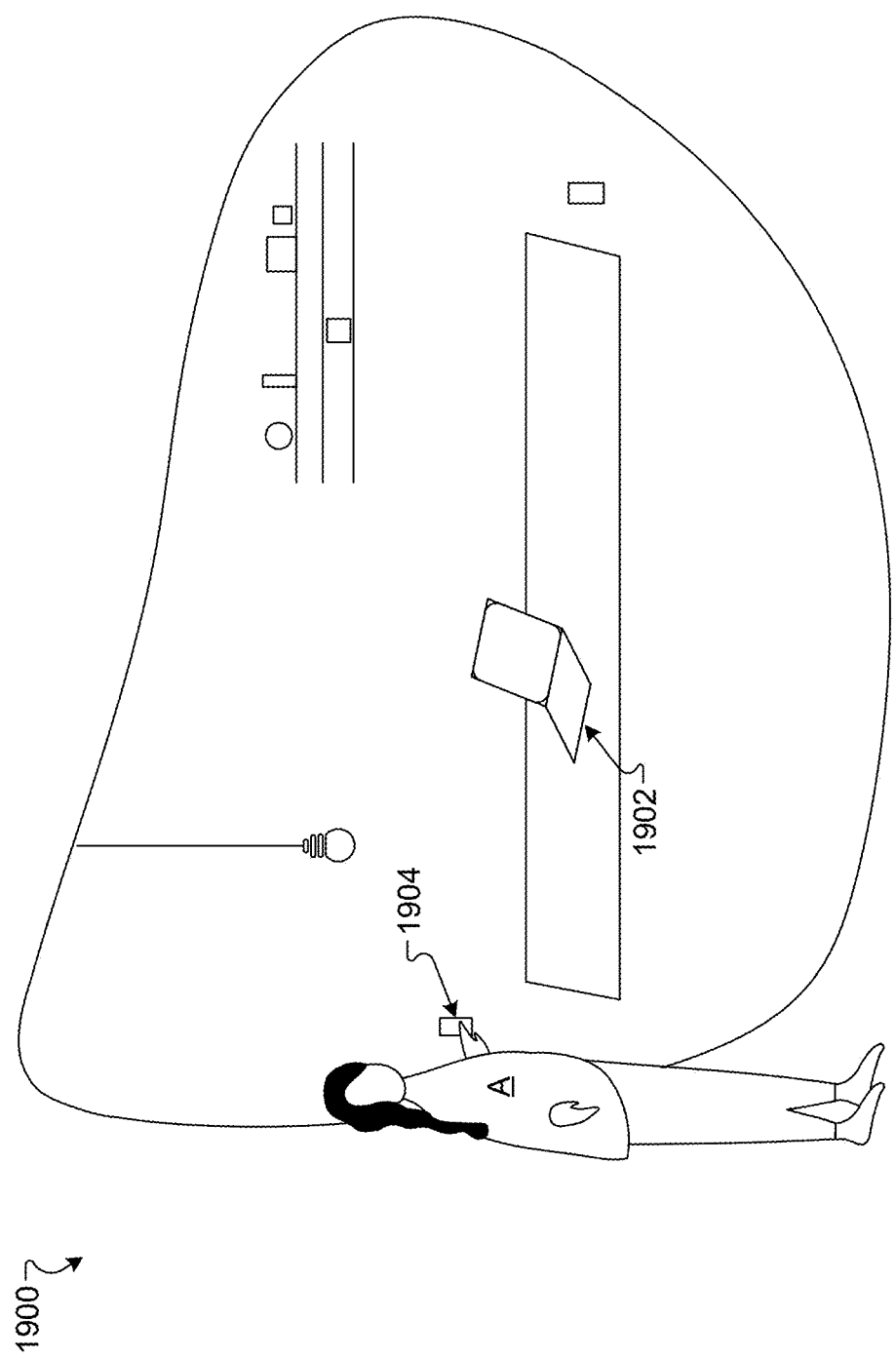

As shown in FIG. 19, a user A is shown in an environment 1900 with a number of electronic devices. For example, the user A may have a device 1902 and a device 1904 configured to function with a user account operating as an SSI portable account, as described in detail above. In this example, the device 1902 represents a laptop computing device provisioned for the user account as an inner device. The device 1904 represents a mobile device provisioned for the user account as an inner device. No recovery account or service is configured for the user account of user A.

At some point in time, user A loses the device 1904, or the device 1904 is stolen, and the device 1904 is in the possession of a local attacker. The attacker may gain access, for example, physical access, in an attempt to steal user information from the lost/stolen device 1904. In this example, the device 1904 may include local device protection in the form of, for example, a fingerprint scanner, entry of a passcode or PIN and the like.

If the attacker is unable to quickly defeat the local device protection, the user A may use the laptop computing device 1902, which is provisioned as an inner device of the user account, to revoke the lost/stolen mobile device 1904, and regain full control of all devices that have access to the user account. In some situations, the user A may choose to provision another, temporary mobile device, for example, as an outer entity of the user account, until the user A is able to purchase a new mobile device. Once the user A purchases a new mobile device, user A can use the laptop computing device 1902 (provisioned as an inner device of the user account) to provision the newly purchased mobile device as an inner device of the user account, and to revoke the temporary mobile device, thereby maintaining full control of all devices that have access to the user account.

However, if the attacker is able to overcome the local device protection relatively quickly, for example, before user A is able to use the laptop computing device 1902 (provisioned as an inner device of the user account) to revoke the mobile device 1904, the attacker may use the mobile device 1904 to revoke the laptop computing device 1902 still held by the user A. As there are no other devices provisioned (particularly as inner devices) for the user account, and no recovery account or service is configured for the user account, this may provide the attacker with full access and control of the user account. In this example, the attacker may then attempt to add a recovery account. However, one of the policies associated with the user account may include a wait time for engaging the recovery account. In this example, the attacker may have access to the account and may steal data, but the attacker may have to wait a predefined time period Y for the recovery account to become active.

User A Scenario 5—One of Three Inner Devices is Stolen

Figure 20:
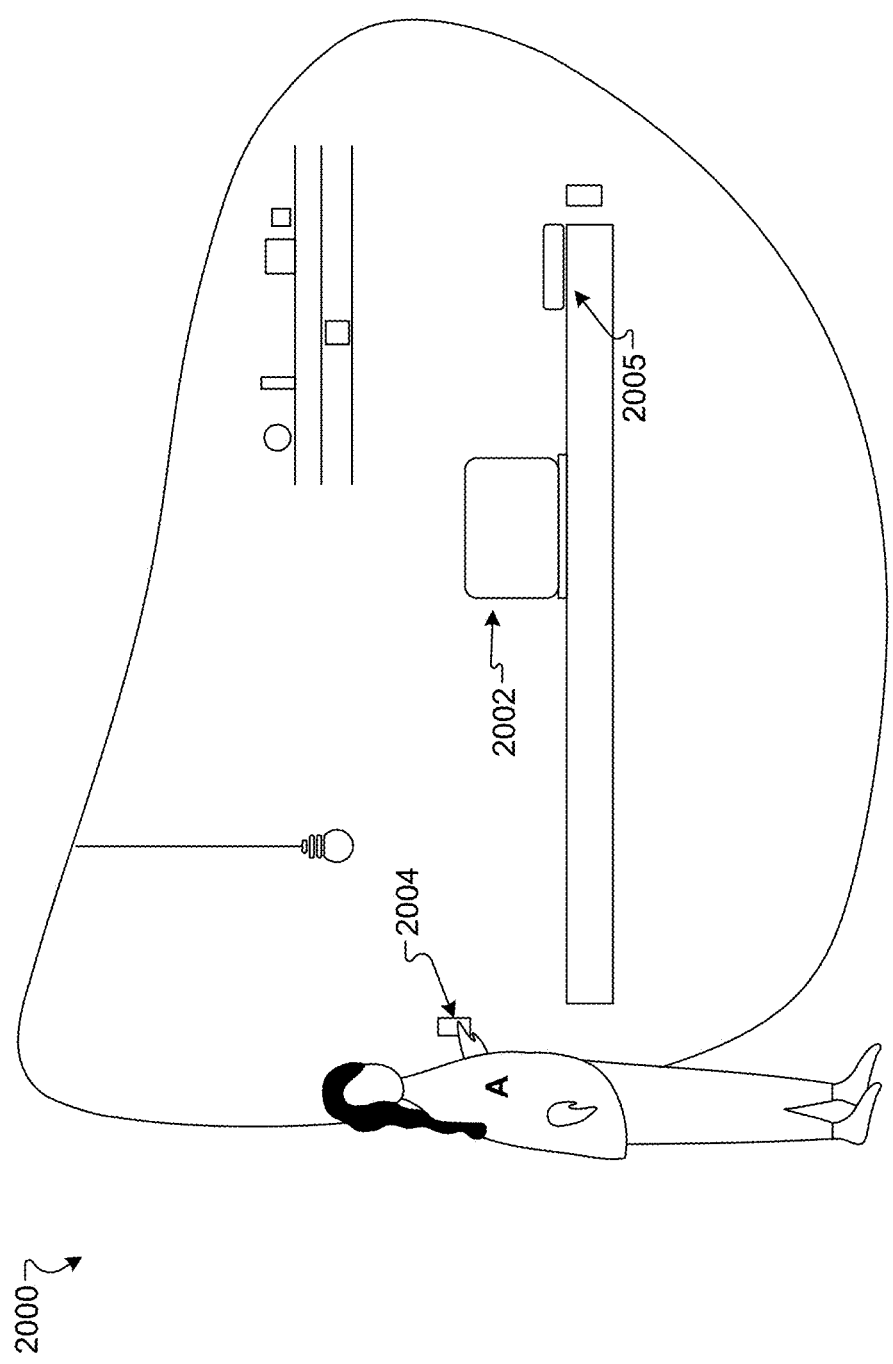

As shown in FIG. 20, a user A is shown in an environment 2000 with a number of electronic devices. For example, the user A may have three devices 2002, 2004 and 2005 configured to function with a user account operating as an SSI portable account, as described in detail above. The device 2002 represents a laptop device provisioned for the user account as an inner device. The device 2004 represents a mobile device provisioned for the user account as an inner device. The device 2005 represents a game console device provisioned for the user account as an inner device. No recovery account or service is configured for the user account of user A.

At some point in time, user A loses the mobile device 2004. An attacker, for example, a local attacker, may gain access, for example, physical access, to the device 2004 and attempt to steal user information if the attacker finds the lost mobile device 2004. In this situation, the systems described herein may operate in accordance with a policy that allows a user in control of a majority of devices in the number of configured devices associated with a particular user account to defeat an attacker (or other user) that controls fewer devices associated with the same user account. In this example, the device 2004 may have a fingerprint scanner, or passcode, or PIN configured as local device protection, as may be typical on mobile phone devices. However, if the attacker overcomes the local device protection, the user may still protect the lost device 2004. For example, because the user A is still in control of the laptop computing device 2002 and the gaming console device 2005, which are each configured as inner devices of the user account, the user A may take steps to protect the user account from being accessed by the attacker using the lost/stolen mobile device 2004.

If the attacker is unable to defeat the local device protection relatively quickly, the user A may use the laptop device 2005 or the gaming console device 2005 to revoke the lost/stolen mobile device 2004. In addition, the user A may purchase a new mobile device (to replace the lost/stolen mobile device 2004) and may provision the new mobile device with the user account using the laptop computing device 2002 or gaming console device 2005 to regain full control of all devices that have access to the user account.

In the event that the attacker is able to quickly defeat the local device protection, for example, before the user A is able to revoke the lost/stolen mobile device 2004, the attacker may attempt to control the user account. For example, the attacker may use the mobile device 2004 to revoke the laptop device 2002. In this example, the attacker may then attempt to add a recovery account. However, one of the policies associated with the user account may include a wait time Y for engaging the recovery account. The attacker may also attempt to add another device (e.g., a tablet device belonging to the attacker) to the user account. However, another policy associated with the user account may include disallowance of tenure of a new device until after a predefined time period has elapsed corresponding to association of the new device with the user account. In this example, the attacker may have access to the account and may steal data, but the attacker cannot revoke the (third) gaming console device 2005 retained by the user A, because the attacker's device cannot gain tenure nor the associated abilities of an inner device of the user account without waiting the predefined time period W. Thus, the attacker will wait a time period W (for example, W days) for the tablet to gain tenure, a time period X (for example, X days) for the lost/stolen mobile device 2002 to leave a rate limit, or a set period of elapsed time, associated with the ability to revoke devices (in particular the ability to revoke more than one device) from the user account, and a time period Y (for example, Y days) for the recovery account to become active. In general, W, X, and Y time periods may be in minutes, hours, days, months, etc. For example, W, X, and Y time periods may be configured by the user to be about 4 to about 15 days.

At some point, user A may return home and notice that mobile device 2004 is missing, and accordingly, may use the console device 2005 to revoke any attacker devices that user A may determine to be associated with the user account. For example, messages may be broadcast to other devices associated with the user account when new devices are provisioned or attempted to be provisioned with the user account. A rate limit for revoking devices, or a time period for revoking devices, such as the device 2004 may not be met by user A because the mobile device 2004 is configured in this example as the sole device to have tenure. User A may then cancel a pending request to use the attacker's account for recovery. User A may also re-provision the laptop computing device 2002 using the console device 2005. User A may additionally purchase a new mobile device and provision the newly purchased mobile device using laptop computing device 2002. Upon completion of the above steps, the user A may regain full control of the user account. However, the attacker may have accessed some of the data associated with the user account.

User A Scenario 6—an Outer Device is Stolen

Figure 21:
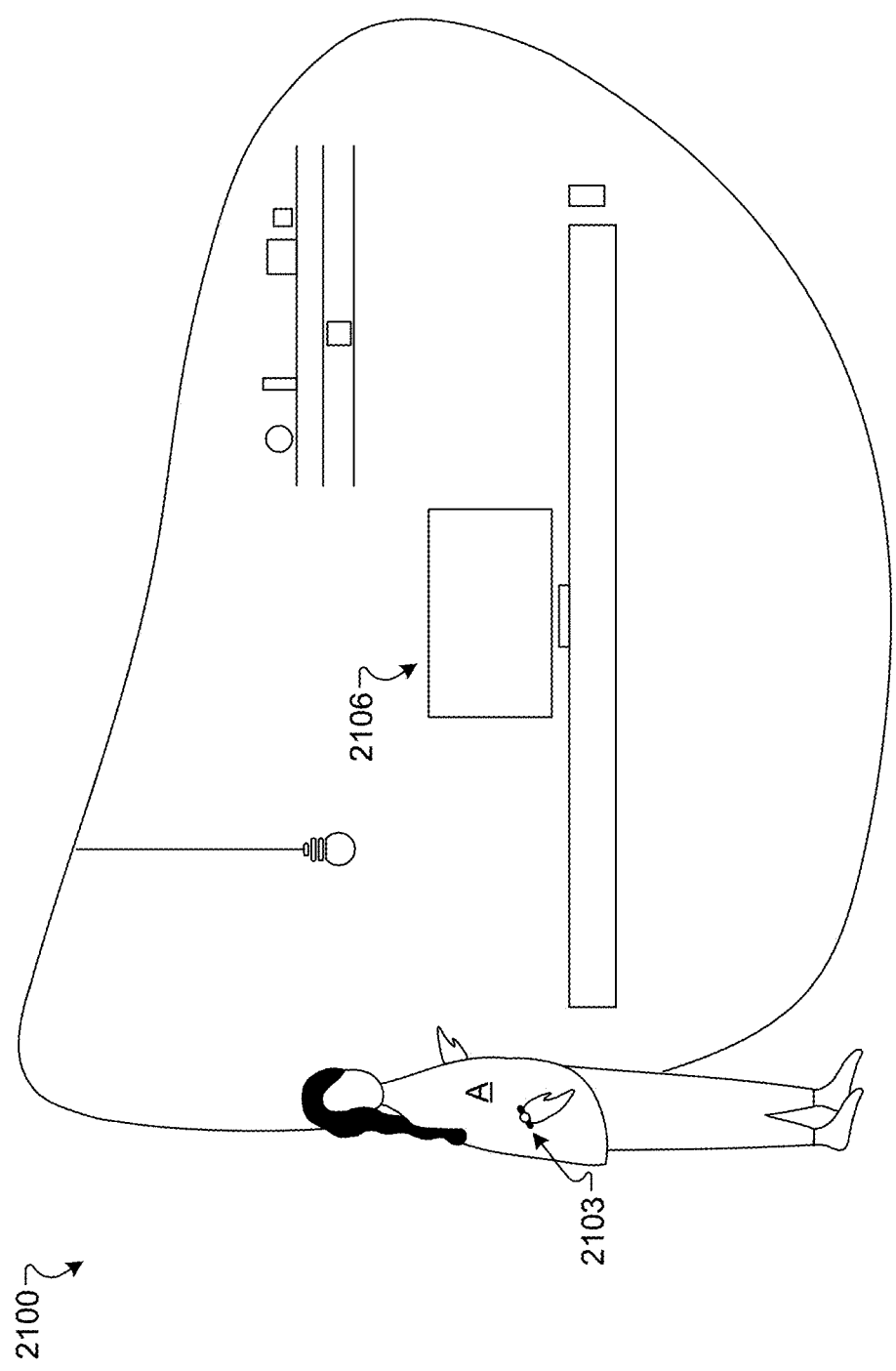

As shown in FIG. 21, a user A is shown in an environment 2100 with a number of electronic devices. For example, the user A may have a device 2103 and a device 2106, each configured to function with a user account operating as an SSI portable account, as described in detail above. In this example, the device 2103 represents a wrist worn device provisioned for the user account as an inner device. The device 2106 represents a television device provisioned for the user account as an outer device. No recovery account or service is configured for the user account of user A.

At some point in time, the device 2106 is removed from the environment 2100, or stolen, while the user A is outside of the environment 2100. An attacker, for example, a local attacker, may gain access, for example, physical access, to the stolen device 2106, and may attempt to steal user information using the stolen device 2106. In this example, the device 2106 may include local device protection for accessing the functionality of the device 2106, such as a passcode, or a PIN, or a facial image.

If the attacker is unable to defeat the local device protection relatively quickly, the attacker may still be able to use the device 2106 (for example, watch television programming using the device 2106). However, the attacker cannot access information within the user account without defeating the local device protection.

If the attacker is able to defeat the local device protection relatively quickly, the attacker may use the device 2106 to access some information, for example, a subset of information, held in the user account, in accordance with policies associated with the device 2106 provisioned as an outer device of the user account. However, even if the attacker defeats the local device protection and gains (partial) access to the user account, the attacker cannot use the stolen device 2106 (provisioned as an outer device) to revoke the wrist worn device 2103 (provisioned as an inner device). That is, policies associated with the user account limit the capabilities of outer devices such as the device 2106.

At some point, user A may return to the environment 2100 and notice that device 2106 is missing, and accordingly, may use the wrist worn device 2103 (provisioned as an inner device) to revoke the stolen device 2106. In addition, the user A may purchase a new television (to replace the stolen device 2106) and may use the wrist worn device 2103 to provision the new television device. At this point, user A has regained full control of all devices that have access to the user account, although the attacker may have accessed some of the data from the user account.

User A Scenario 7—a New Malicious Inner Device is Added

Figure 22:
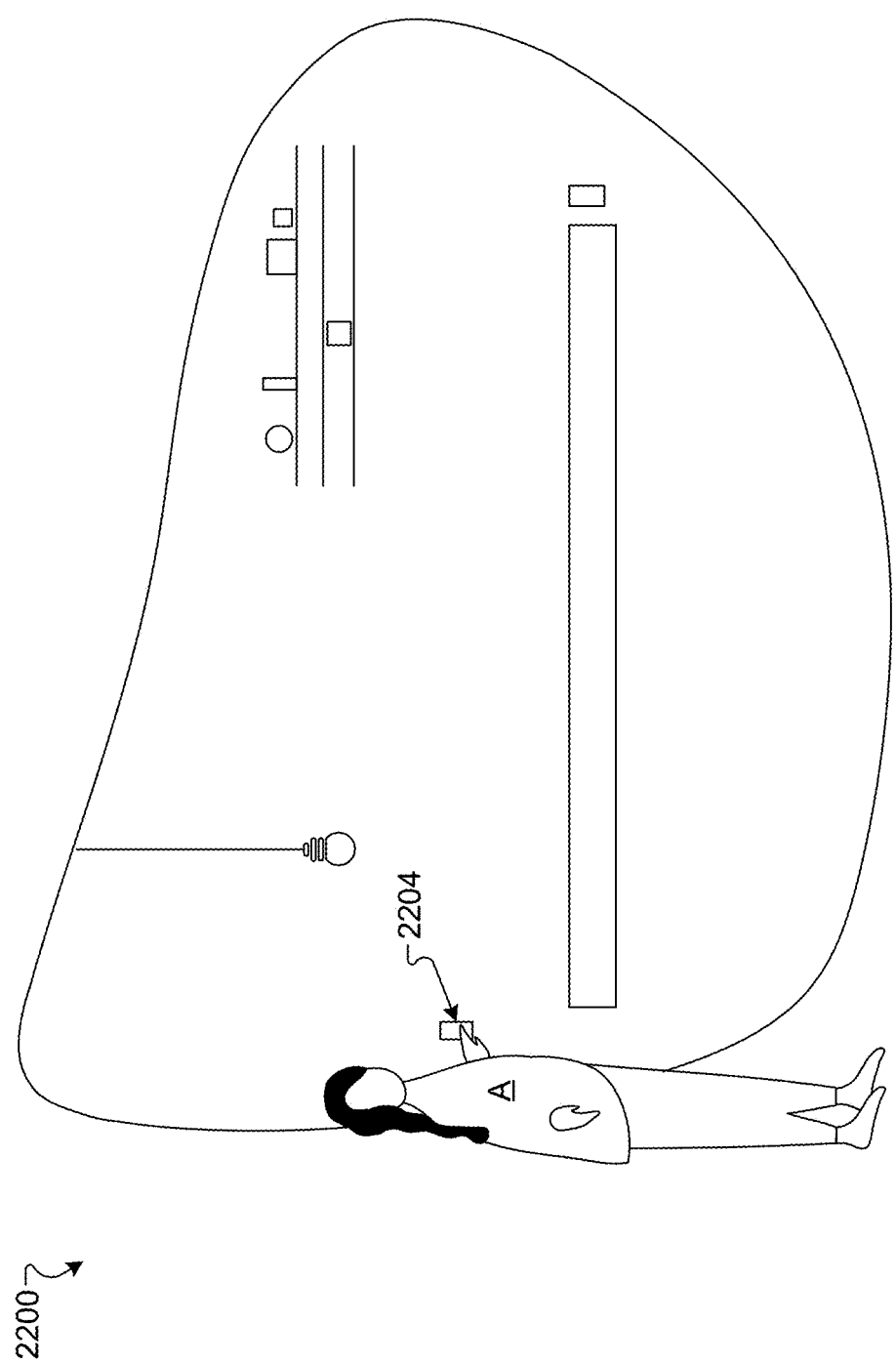

As shown in FIG. 22, a user A is shown in an environment 2200. In this example, user A has a device 2204 configured to function with a user account operating as an SSI portable account, as described in detail above. In this example, the device 2204 represents a mobile device provisioned for the user account as an inner device. In this example, the device 2204 represents the sole device associated with, or operational within, the user account of user A. No recovery account or service is configured for the user account of user A.

At some point in time, user A lends the mobile device 2204 to another user. Before lending the mobile device 2204 to the other user, user A enters the information used to overcome the local device protection resident on the mobile device 2204, and unlocks access to the mobile device 2204 (which is provisioned as the sole inner device associated with the user account). Because the mobile device 2204 is provisioned as an inner device, unlocking of the mobile device 2204 by user A in this manner (for temporary use by the other user) provides the other user with temporary, but full, access to all of the user account information, and full functionality and control of the user account. Unknown to user A, the other user is a local attacker, who now has physical access to the mobile device 2204 of user A, and temporary, but full, access to all of the user account information, and full functionality and control of the user account.

While using the mobile device 2204 of user A, the attacker uses the access provided by the mobile device 2204 to surreptitiously add another device (i.e., a device belonging to the attacker) as an inner device associated with the user account. The attacker then returns the mobile device 2204 to user A. User A is not yet aware that the attacker has added the attacker device to the user account as an inner device. In this situation the attacker now has access to the information in the user account, and can steal data from the user account. However, the attacker cannot use the attacker device (newly added as an inner device) to revoke the mobile device 2204, as the attacker device has not been associated with the user account as an inner device for greater than the period of time W, and thus does not yet have tenure. Rather, the attacker device cannot gain tenure nor the associated full capabilities of an inner device of the user account without waiting the predefined time period W for tenure.

Similarly, without tenure, the attacker cannot use the newly added attacker device to add a new device, to add a recovery account and the like.

At some point, user A may notice that a new device (the attacker device) has been added to the user account, and may use the (tenured) mobile device 2204 to revoke the attacker device. For example, messages may be broadcast to other devices associated with the user account (in this case, the mobile device 2204, which is the sole device associated with the user account) when new devices are provisioned or attempted to be provisioned with the user account. The user A may use the mobile device 2204 to revoke the attacker device. Upon completion of the above steps, the user A may regain full control of the user account. However, the attacker may have accessed some of the data associated with the user account.

User A Scenario 8—Lose Local Authentication Factor

Figure 23:
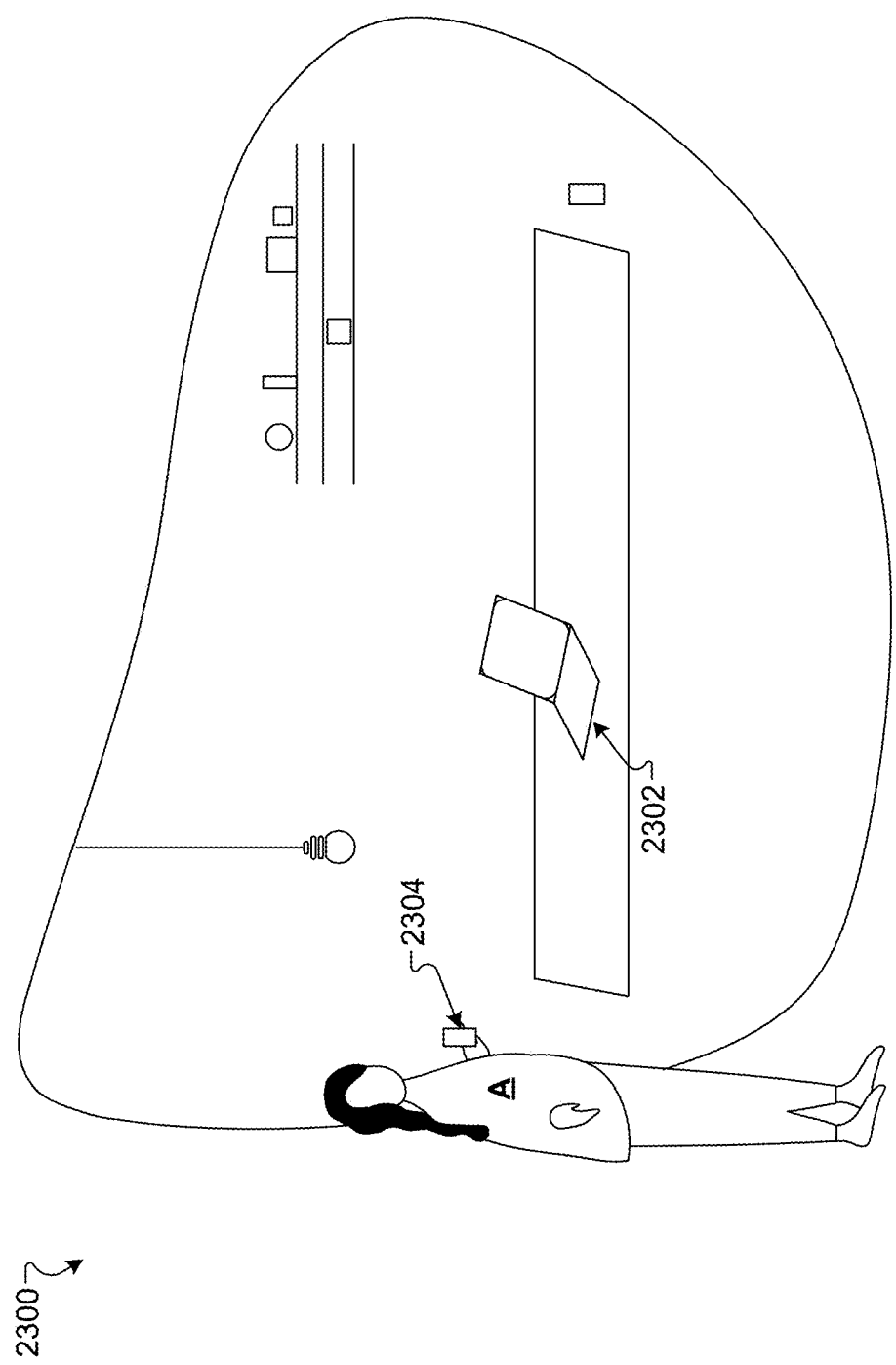

As shown in FIG. 23, a user A is shown in an environment 2300. In this example, user A has a device 2302 and a device 2304, each configured to function with a user account operating as an SSI portable account, as described in detail above. In this example, the device 2302 represents a mobile device provisioned for the user account as an inner device, and the device 2304 represents a laptop computing device provisioned for the user account as an inner device. No recovery account or service is configured for the user account of user A. In this example, the device 2302 and the device 2304 each include local device protection, in the form of a strong random passcode, for accessing the functionality of the respective device 2302, 2304, and for accessing the user account.

At some point in time, user A is in a situation in which the device 2302 and the device 2304 are not used by the user A for a somewhat extended period of time, such as, for example, a period in which user A travels without the devices 2302, 2304, and/or a period of travel during which connectivity is not readily available. Upon returning, the user A has forgotten the strong random passcode associated with the devices 2302, 2304. In this example, the user A has no recovery account or service configured for the user account, the devices 2302, 2304 are the devices associated with the user account, and the sole way to access the user account is through entry of the (forgotten) strong random passcode. Without access to the user account, via another device, or a recovery account, user A has no means of accessing the user account. Thus, in this example, user A loses access to the user account, unless the user A has otherwise saved or stored account configuration information and is able to manually re-configure the user account.

User A Scenario 9—One of Three Inner Devices is Hacked

Figure 24:
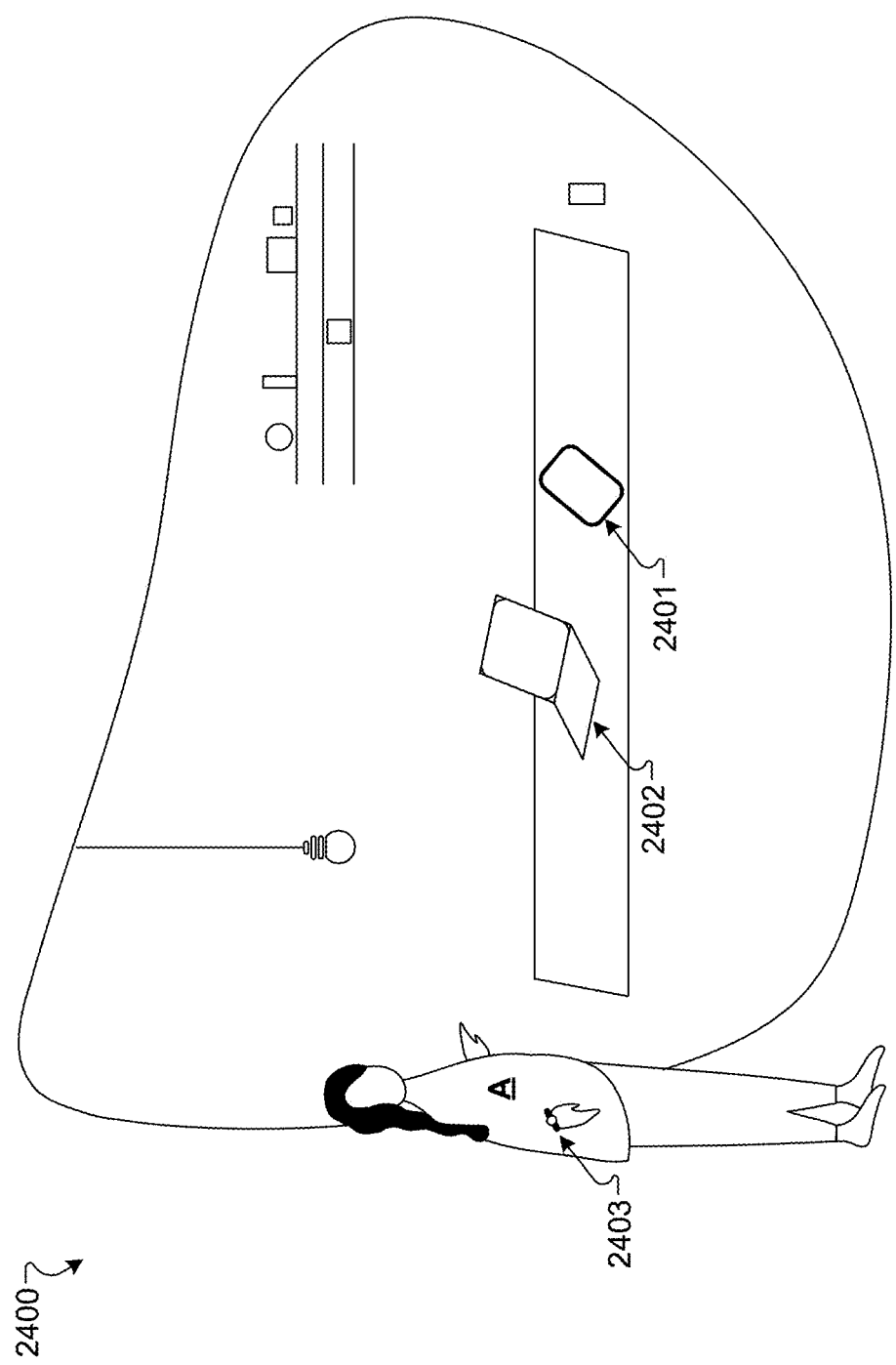

As shown in FIG. 24, a user A is shown in an environment 2400. In this example, user A has a device 2401, a device 2402 and a device 2403, each configured to function with a user account operating as an SSI portable account, as described in detail above. In this example, the device 2401 represents a tablet computing device provisioned for the user account as an inner device. The device 2402 represents a mobile device provisioned for the user account as an inner device. The device 2403 represents a wrist worn device provisioned for the user account as an inner device. No recovery account or service is configured for the user account of user A.

In some situations, a remote attacker, or a network attacker, may discover a vulnerability in one, or more, of the devices 2401, 2402, 2403 associated with the user account of user A. Depending on the individual ability of the network attacker, and the security provisions associated with the user account, the network attacker may be able to provision new devices, even remotely, and without physical access to one of the inner devices 2401, 2402, 2403 associated with the user account. Similarly, the network attacker may be able to user the remotely provisioned device to remotely revoke existing devices, without physical access to one of the inner devices 2401, 2402, 2403 associated with the user account. In some situations, the network attacker may be able to remotely circumvent existing protocols regarding the tenure period W for the remotely provisioned device, and/or the rate limiting period X for revoking inner device(s), and/or the period of time Y for a (new) recovery account and/or credentials to become active. In these types of situations, the network attacker has access to the user account, and can steal information from the user account. Because there is no recovery account or service is configured, user A will have difficulty in regaining control of the user account.

User A Scenario 10—Quickly Erase Data

Figure 25:
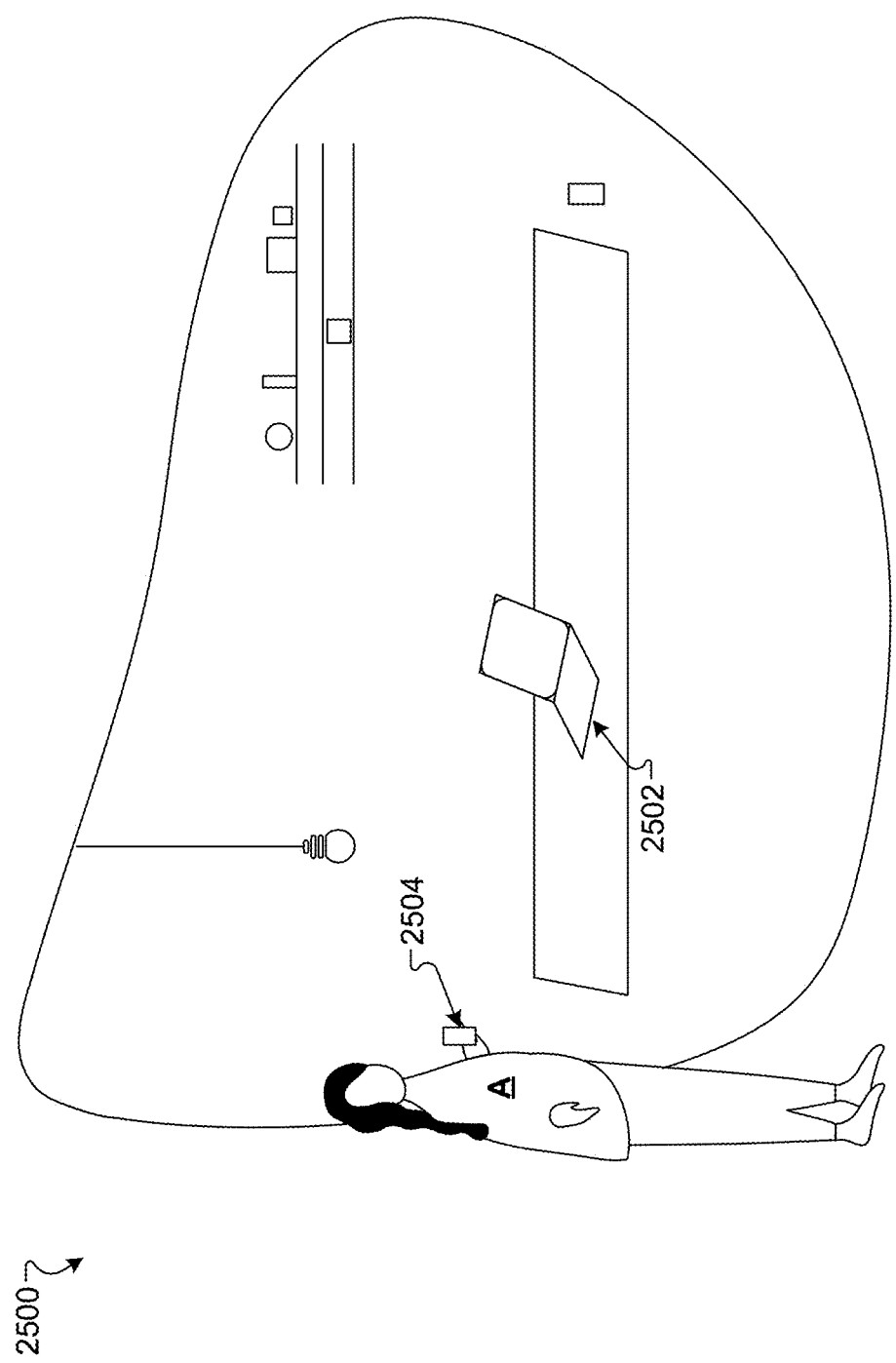

As shown in FIG. 25, a user A is shown in an environment 2500. In this example, user A has a device 2502 and a device 2504, each configured to function with a user account operating as an SSI portable account, as described in detail above. In this example, the device 2502 represents a mobile device provisioned for the user account as an inner device, and the device 2504 represents a laptop computing device provisioned for the user account as an inner device. No recovery account or service is configured for the user account of user A.

User A may have information and data stored in association with the device(s) 2502, 2504 and with the user account.

At some point in time, user A may want to permanently delete some, or all, of the information and data, so that the information and data is no longer available, for example, to an outside party. The user A may attempt to delete the user account, so that the information and data is no longer available. However, in accordance with policies associated with the user account, a period of time Z (for example, Z days) may be associated with the ability to delete a user account. Thus, user A may have to wait for the period of time Z to have elapsed before the account may be deleted. In some situations, user A may wish for the information and data to be unavailable before the period of time Z has elapsed, for example, substantially immediately. In this situation, user A may use one of the inner devices 2502, 2504 to revoke both of the inner devices 2502, 2504. User B may have to wait a period of time Y (for example, Y days) for the revocation of both of the inner devices 2502, 2504 to take effect. By revoking both of the inner devices 2502, 2504, and without a recovery account or service configured for the user account, the user account is now permanently inaccessible, either by the user A or by an outside party, after the period of time Y has elapsed.

User A Scenario 11—User is Incapacitated

Figure 26:
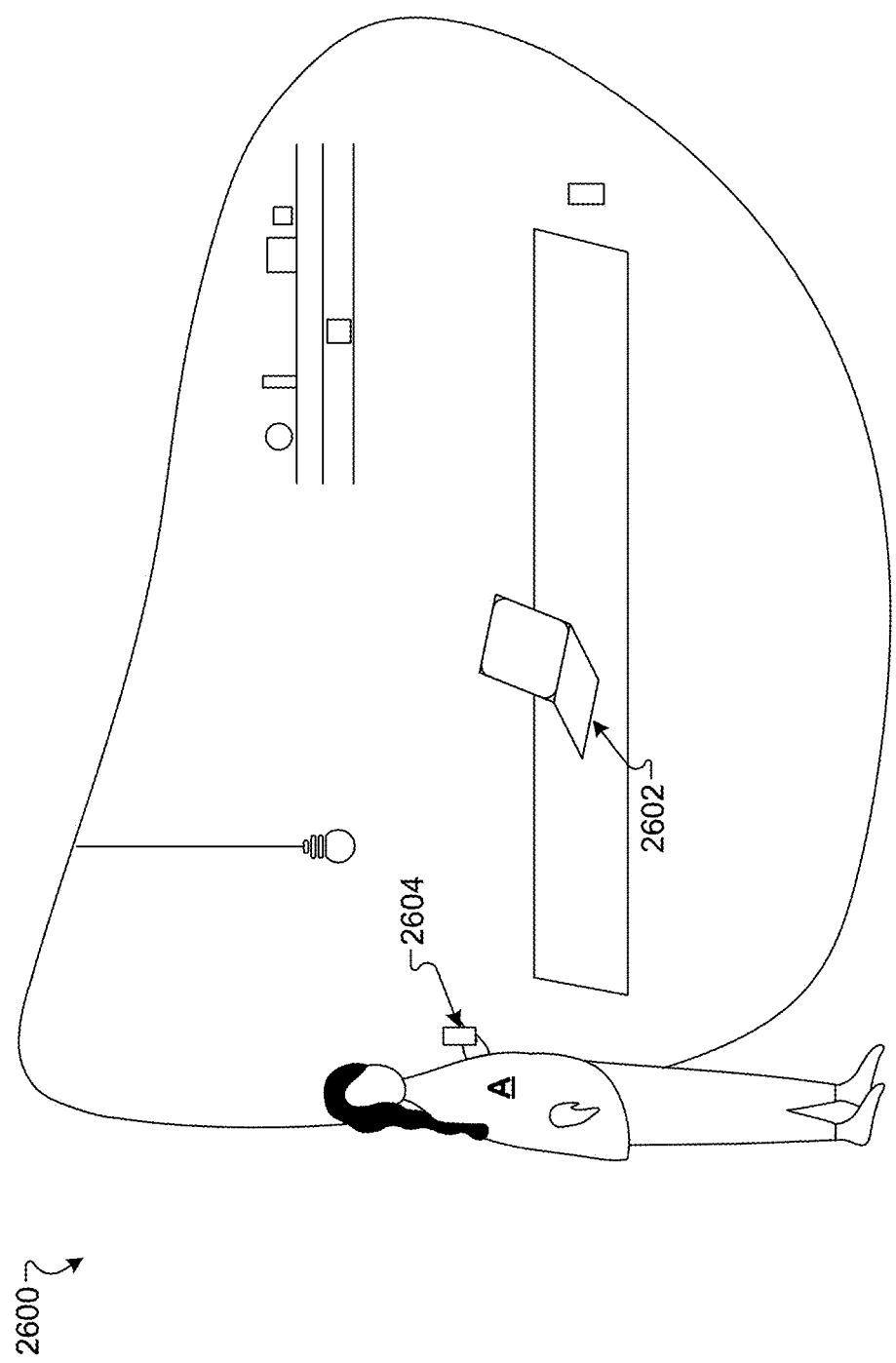

As shown in FIG. 26, a user A is shown in an environment 2600. In this example, user A has a device 2602 and a device 2604, each configured to function with a user account operating as an SSI portable account, as described in detail above. In this example, the device 2602 represents a mobile device provisioned for the user account as an inner device, and the device 2604 represents a laptop computing device provisioned for the user account as an inner device. No recovery account or service is configured for the user account of user A. In some situations, user accounts may include provisions for a legacy recovery account, or a specialized recovery account, to be invoked in the event the primary user becomes incapacitated (or passes away).

At some point in time, user A becomes incapacitated. User A did not intend for another entity (i.e., family/friends) to be able access to the user account in this situation, and thus did not make provisions for a specialized recovery account associated with the user account. In this situation, family/friends have no access to the user account, as intended by user A.

In some situations, user A may wish for another entity to have access to the user account in the event user A becomes incapacitated, but user A does not make provisions for a specialized recovery account associated with the user account. In this situation, because user A did not proactively make provisions for the specialized recovery account, family/friends have no access to the user account, even though user A wanted to allow for this.

In some situations, user A may wish for another entity (i.e., family/friends) to have access to the user account in the event user A becomes incapacitated, and provides credentials in the form of, for example, a security key, to unlock one of the (inner) devices 2602, 2604 associated with the user account, to be delivered to the other entity by a trusted third party in the event of incapacitation. In this situation, the other entity may use the security key to unlock one of the devices 2602, 2604, and gain access to the user account, as intended by the user A.

In some situations, user A may wish for another entity (i.e., family/friends) to have access to some, or all of the information in the user account in the event user A becomes incapacitated. To enable this, user A establishes a shared user account, and leaves account access credentials with a trusted third party, to be provided to the other entity in the event of incapacitation. In this situation, the other entity may use the account access credentials to access the shared user account, and to access the information included in the shared user account, as intended by the user A.

In some situations, the user A may wish for another entity (i.e., family/friends) to have access to the user account in the event user A becomes incapacitated. To enable this, user A may add a specialized recovery account, that will allow for provisioning of a new device from a single use code, for example, a single use two-dimensional bar code (for example, a quick response (QR) code), which may be provided to the other entity by a trusted third party. The other entity may use the single use code to provision the user account on a new device, to gain access to the user account, as intended by the user A.

User B Scenario 1—Lose Sole Inner Device

Figure 27:
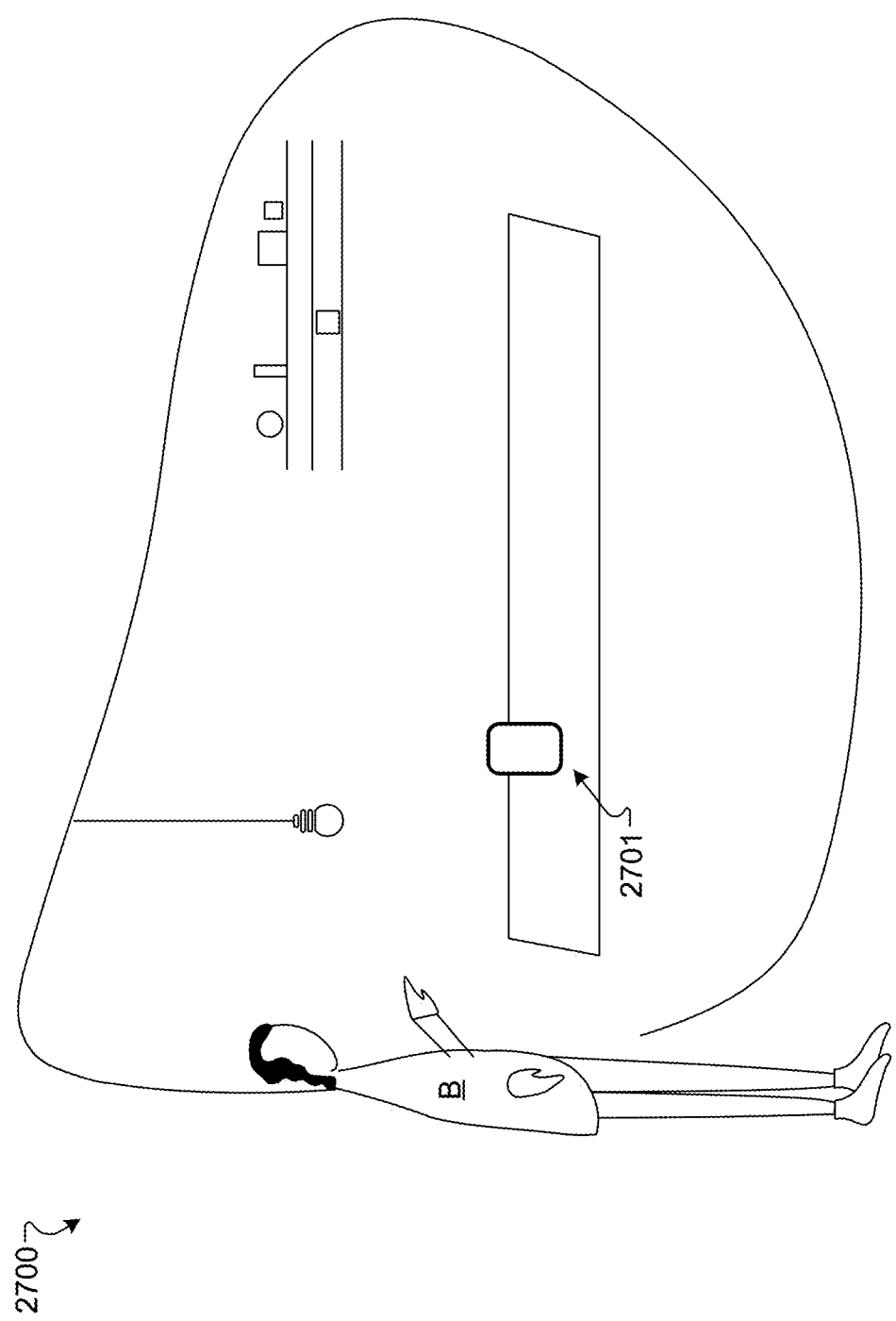
FIGS. 27 through 41 are examples of using a portable user account with a configured recovery account using a user-controlled factor, in accordance with implementations described herein.

As shown in FIG. 27, a user B is shown in an environment 2700. In this example, user B has a device 2701 configured to function with a user account operating as an SSI portable account, as described in detail above. In this example, the device 2701 represents a tablet device provisioned for the user account as an inner device. In this example, the device 2701 represents the sole device associated with, or operational within, the user account of user B. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

At some point in time, the device 2701 is, in some manner irreparably damaged, or damaged beyond repair, such that the device 2701 is rendered inoperable. The user 27 may choose to replace the inoperable device 2701 with a new device (for example, a new tablet computing device) and add the new tablet computing device to the user account. If user B is able to find, or remember, or access, the user-controlled recovery factor, user B can sign into the recovery account and provision the new tablet computing device to the user account.

If user B is unable to find, or unable to remember, or unable to access, the user-controlled recovery factor, user B will be unable to access the recovery account. In this situation, as the recovery account is not administered by an outside recovery service, user B has no way to recover and gain access to the user account. Thus, in this situation, user B loses access to the user account, and cannot provision a new device for the user account.

User B Scenario 2—Sole Inner Device is Stolen

Figure 28:
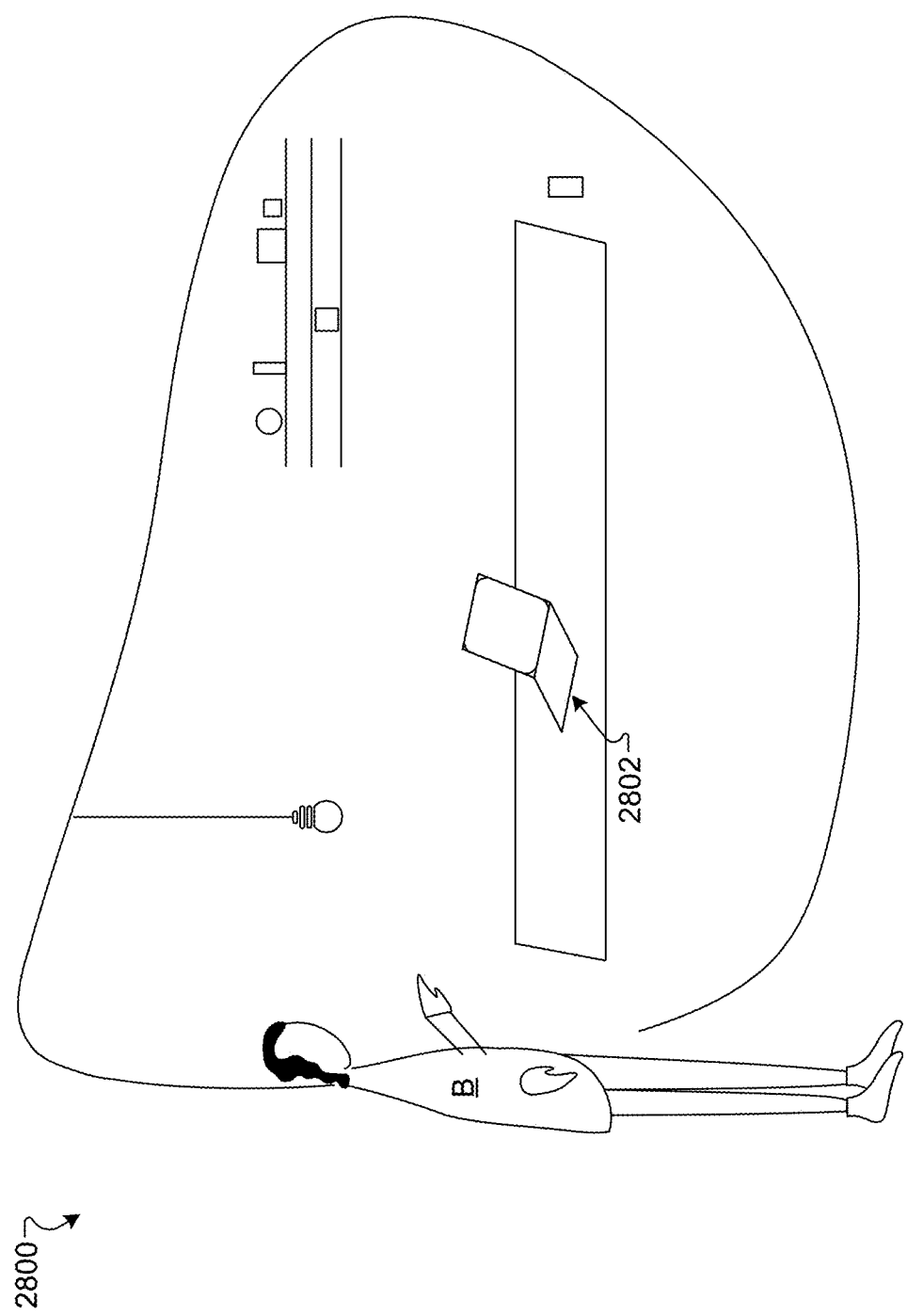

As shown in FIG. 28, a user B is shown in an environment 2800. In this example, the user B has a device 2802 configured to function with a user account operating as an SSI portable account, as described in detail above. In this example, the device 2802 represents a laptop computing device provisioned for the user account as an inner device. In this example, the device 2802 represents the sole device associated with, or operational within, the user account of user B. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

At some point in time, user B loses possession of the device 2802. For example, the device 2802 may have been lost by the user B, or may have been stolen while left unattended by the user B. An attacker, for example, a local attacker, may gain access, for example, physical access, to the lost/stolen device 2802, and attempt to steal user information from the lost/stolen device 2802. In this example, the device 2802 may have a local authentication protocol, such as entry of a password or personal identification number (PIN), configured as local device protection. If the attacker overcomes the local device protection, the attacker may gain access to the user account. Because the device 2802 is the single device associated with the user account, gaining access to the user account without the device 2802 relies upon user B being able to provide user-controlled recovery factor.

If the attacker is unable to defeat the local device protection relatively quickly, the attacker may instead perform a factory reset of the device 2802, and continue to use the device 2802, or sell the device 2802. If user B is able to access, or remember, or provide, the user-controlled recovery factor and access the user account, user B has full access to the user account, and can use that access to provision a newly purchased device (to replace the stolen device 2802), and to revoke the stolen device 2802, thus regaining full control of the user account. If user B is not able to access, or remember, or provide, the user-controlled recovery factor, and with no other device associated with the user account, user B will lose access to the user account.

If the attacker is able to defeat the local device protection relatively quickly, and gain access to the user account, the attacker may use this access to the user account, via the stolen device 2802, to add a new device (i.e., a device belonging to the attacker) provisioned as an inner device. However, one of the policies associated with the user account may require that a period of time W has elapsed before a newly added device gains tenure. In this example, the attacker may also attempt to add a recovery account. However, another of the policies associated with the user account may require that a period of time Y have elapsed before engaging the recovery account. In this example, the attacker may have access to the account and may steal data, but the attacker has limited capabilities within the user account during the periods of time W until the newly added device gains tenure, and the period of time Y until the new recovery account can be established.

During this time, if user B is able to access, or remember, or provide, the user-controlled recovery factor, user B may sign into the user account using another device (for example, a borrowed device or a newly purchased device), may revoke all other devices associated with the user account, and may revoke the pending recovery account change. User B may also then revoke the borrowed device and/or provision the newly purchased device. At this point, user B has regained full control of the user account, although the attacker may have been able to steal some information.

User B Scenario 3—Lose One of Two Inner Devices

Figure 29:
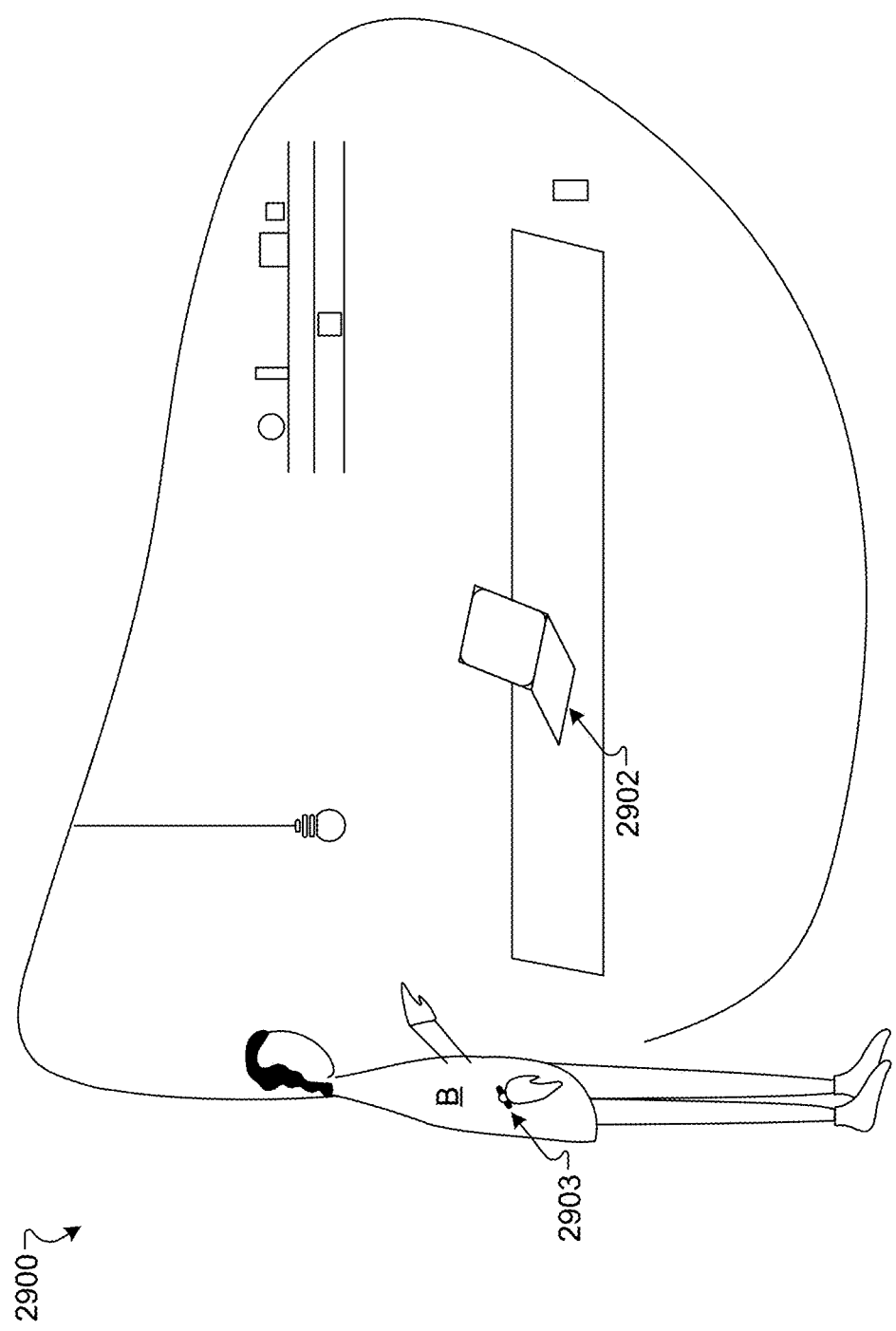

As shown in FIG. 29, a user B is shown in an environment 2900 with a number of electronic devices. For example, the user B may have a device 2902 and a device 2903 configured to function with a user account operating as an SSI portable account, as described in detail above. In this example, the device 2902 represents a laptop computing device provisioned for the user account as an inner device. The device 2903 represents a wrist-worn mobile device, or a watch, provisioned for the user account as an inner device. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

At some point in time, the device 2902 is, in some manner irreparably damaged, or damaged beyond repair, such that the device 2902 is rendered inoperable. In response to the determination that the device 2902 is inoperable, or beyond repair, the user B may choose to replace the device 2902 with a new device (for example, a new laptop computing device) and add the new laptop computing device to the user account. In this example, the user B has access to, and use of the device 2903, which is provisioned as an inner device for the user account. In a situation in which the remaining device 2903 is a tenured inner device, user B may use the device 2903 to revoke the now inoperable device 2902. The user B may also provision the new laptop computing device with the user account using device 2903, and maintain full control of all devices that have access to the user account. In some situations, the user account may be configured to include a policy or rule that disallows tenure of a new device until after a predefined time period W has elapsed, corresponding to device association to the user account.

User B Scenario 4—One of Two Inner Devices is Stolen

Figure 30:
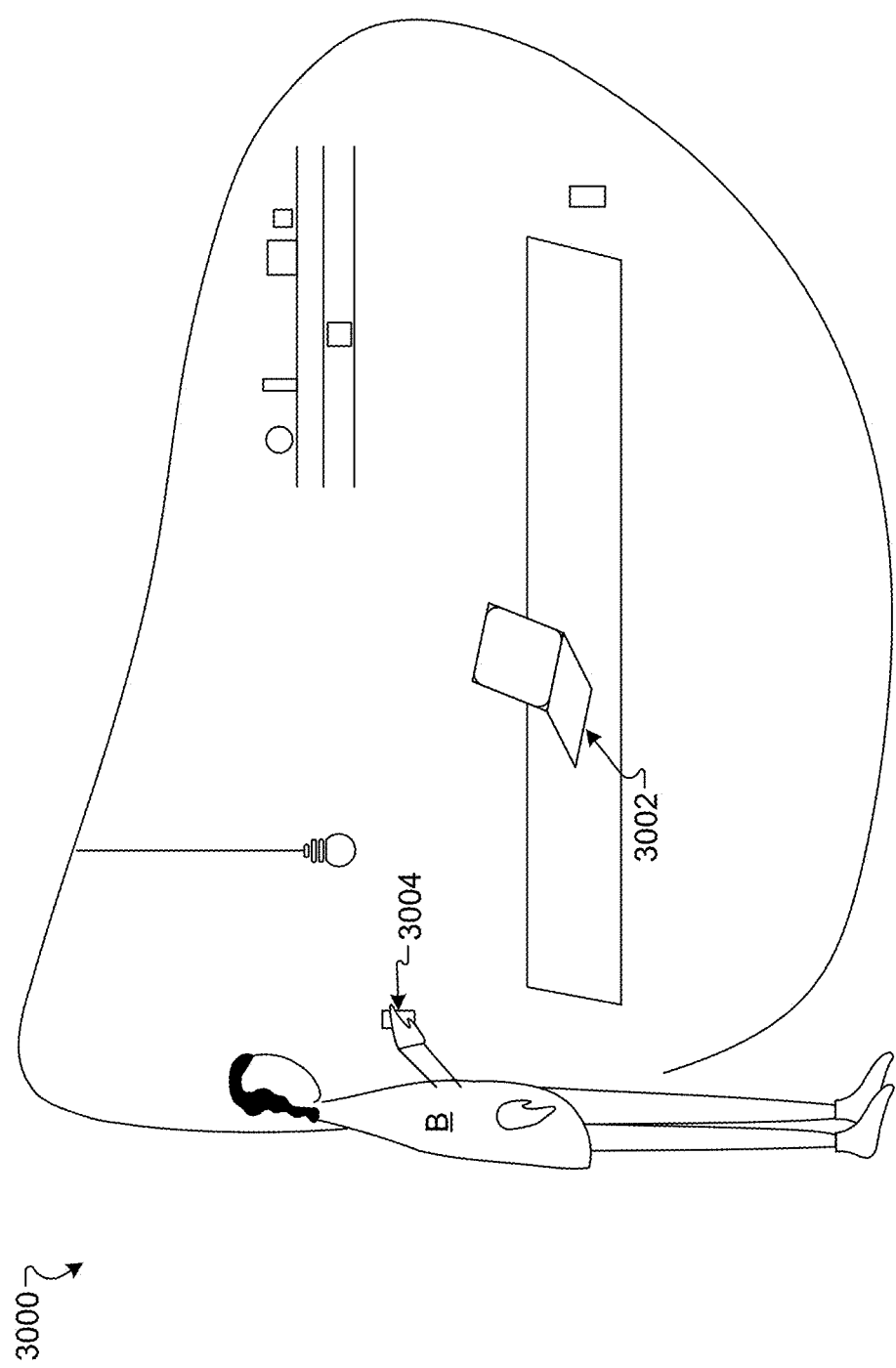

As shown in FIG. 30, a user B is shown in an environment 3000 with a number of electronic devices. For example, the user B may have a device 3002 and a device 3004 configured to function with a user account operating as an SSI portable account, as described in detail above. In this example, the device 3002 represents a laptop computing device provisioned for the user account as an inner device. The device 3004 represents a mobile device provisioned for the user account as an inner device. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

At some point in time, user B loses the device 3004, or the device 3004 is stolen, and the device 3004 is in the possession of a local attacker. The attacker may gain access, for example, physical access, in an attempt to steal user information from the lost/stolen device 3004. In this example, the device 3004 may include local device protection in the form of, for example, a fingerprint scanner, passcode or PIN entry and the like.

If the attacker is unable to quickly defeat the local device protection, user B may use the laptop computing device 3002, which is provisioned as an inner device of the user account, to revoke the lost/stolen mobile device 3004, and regain full control of all devices that have access to the user account. In some situations, user B may choose to provision another, temporary mobile device, for example, as an outer device of the user account, until user B is able to purchase a new mobile device. Once user B purchases a new mobile device, user B can use the laptop computing device 3002 (provisioned as an inner device of the user account) to provision the newly purchased mobile device as an inner device of the user account, and to revoke the temporary mobile device, thereby maintaining full control of all devices that have access to the user account. Alternatively, if user B is able to produce the user-controlled recovery factor, user B may sign into the user account (for example, from a borrowed device or a newly purchased device) to revoke the lost/stolen mobile device 3004 and/or provision the temporary (outer) device, and/or provision the newly purchased device.

If the attacker is able to overcome the local device protection relatively quickly, for example, before the user B is able to use to the laptop computing device 3002 (provisioned as an inner device of the user account) to revoke the mobile device 3004, the attacker may use the mobile device 3004 to revoke the laptop computing device 3002 still held by user B. This may provide the attacker with full access and control of the user account. In this example, the attacker may then attempt to add a recovery account. However, one of the policies associated with the user account may require that a period of time Y have elapsed for engaging the recovery account. In this example, the attacker may have access to the account and may steal data, but the attacker may have to wait the predefined time period Y for the recovery account to become active. If, in this situation, user B is able to produce the user-controlled recovery factor before the period of time Y has elapsed, user B may sign into the user account using another device (for example, a borrowed device or a newly purchased device), may revoke all other devices associated with the user account, and may revoke the pending recovery account change. User B may also then revoke the borrowed device and/or provision the newly purchased device. At this point, user B has regained full control of the user account, although the attacker may have been able to steal some information. If, in this situation, user B is not able to produce the user-controlled recovery factor before the period of time Y has elapsed, the attacker will have gained full access and control of the user account.

User B Scenario 5—One of Three Inner Devices is Stolen

Figure 31:
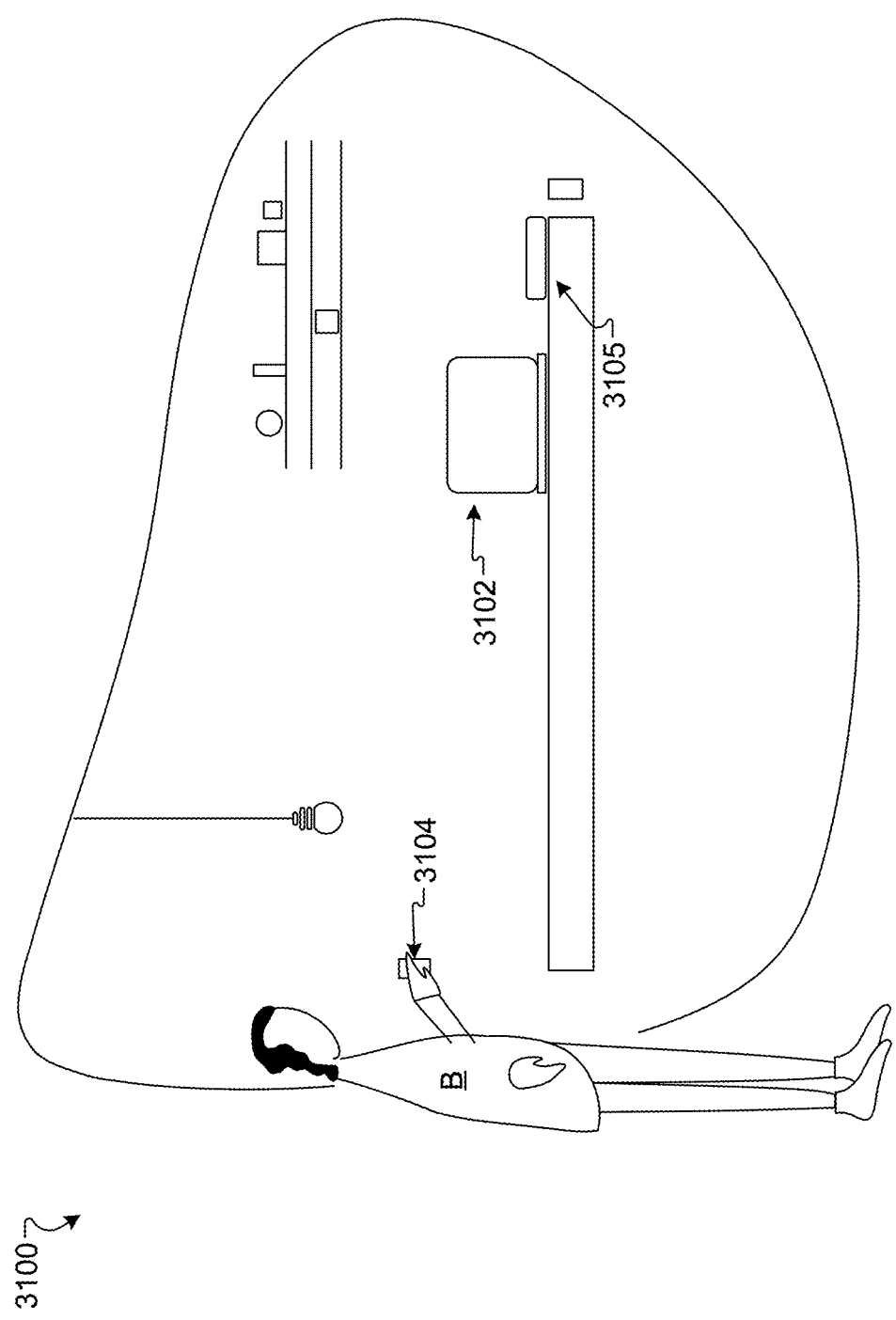

As shown in FIG. 31, a user B is shown in an environment 3100 with a number of electronic devices. For example, the user B may have three devices 3102, 3104 and 3105 configured to function with a user account operating as an SSI portable account, as described in detail above. The device 3102 represents a laptop device provisioned for the user account as an inner device. The device 3104 represents a mobile device provisioned for the user account as an inner device. The device 3105 represents a game console device provisioned for the user account as an inner device. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

At some point in time, user B loses the mobile device 3104. An attacker, for example, a local attacker, may gain access, for example, physical access, to the device 3104 and attempt to steal user information if the attacker finds the lost mobile device 3104. In this situation, the systems described herein may operate in accordance with a policy that allows a user in control of a majority of devices in the number of configured devices associated with a particular user account to defeat an attacker (or other user) that controls fewer devices associated with the same user account. In this example, the device 3104 may have a fingerprint scan, or passcode, or PIN configured as local device protection, as may be typical on mobile phone devices. However, if the attacker overcomes the local device protection, the user may still protect the lost device 3104. For example, because user B is still in control of the laptop computing device 3102 and the gaming console device 3105, which are each configured as inner devices of the user account, user B may take steps to protect the user account from being accessed by the attacker using the lost/stolen mobile device 3104.

If the attacker is unable to defeat the local device protection relatively quickly, user B may use the laptop device 3105 or the gaming console device 3105 to revoke the lost/stolen mobile device 3104. In addition, user B may purchase a new mobile device (to replace the lost/stolen mobile device 3104) and may provision the new mobile device with the user account using the laptop computing device 3102 or gaming console device 3105 to regain full control of all devices that have access to the user account.

In the event that the attacker is able to defeat the local device protection relatively quickly, for example, before user B is able to revoke the lost/stolen mobile device 3104, the attacker may attempt to control the user account. For example, the attacker may use the mobile device 3104 to revoke the laptop device 3102. In this example, the attacker may then attempt to add a recovery account. However, one of the policies associated with the user account may require that a period of time Y (for example, Y days) have elapsed before the recovery account may be engaged. The attacker may also attempt to add another device (e.g., a tablet device belonging to the attacker) to the user account. However, another policy associated with the user account may include disallowance of tenure of a new device until after a predefined time period W has elapsed corresponding to association of the new device with the user account. In this example, the attacker may have access to the account and may steal data, but the attacker cannot revoke the gaming console device 3105 retained by the user B. That is, policies associated with the user account may allow the attacker to revoke a first device (the laptop computing device 3102), but require that a period of time X have elapsed before another device (the gaming console device 3105) can also be revoked, because the attacker's device cannot gain tenure nor the associated abilities of an inner device of the user account without waiting the predefined time period W. Thus, the attacker will wait a time period W (for example, W days) for the newly added tablet to gain tenure, a time period X (for example, X days) for the lost/stolen mobile device 3102 to leave a rate limit, or a set period of elapsed time, associated with the ability to revoke devices (in particular the ability to revoke more than one device) from the user account, and a time period Y (for example, Y days) for the recovery account to become active. In general, W, X, and Y time periods may be in minutes, hours, days, months, etc. For example, W, X, and Y time periods may be configured by the user to be about 4 to about 15 days.

Alternatively, if user B is able to produce the user-controlled recovery factor, user B may sign into the user account (for example, from a borrowed device or a newly purchased device) to revoke the lost/stolen mobile device 3102, to revoke a newly added device (i.e., newly added by the attacker), to (re)provision the laptop computing device 3102, to provision a newly purchased device (i.e., a mobile device newly purchased by user B), revoke the recovery account action initiated by the attacker, and the like.

At some point, user B may return home and notice that mobile device A04 is missing, and accordingly, may use the console device 3105 to revoke any attacker devices that user B may determine to be associated with the user account. For example, messages may be broadcast to other devices associated with the user account when new devices are provisioned or attempted to be provisioned with the user account. A rate limit for revoking devices, or a time period for revoking devices, such as the device 3104 may not be met by user B because the mobile device 3104 is configured in this example as the sole device to have tenure. User B may then cancel a pending request to use the attacker's account for recovery. User B may also re-provision the laptop computing device 3102 using the console device 3105. User B may additionally purchase a new mobile device and provision the newly purchased mobile device using laptop computing device 3102. Upon completion of the above steps, the user B may regain full control of the user account. However, the attacker may have accessed some of the data associated with the user account.

User B Scenario 6—an Outer Device is Stolen

Figure 32:
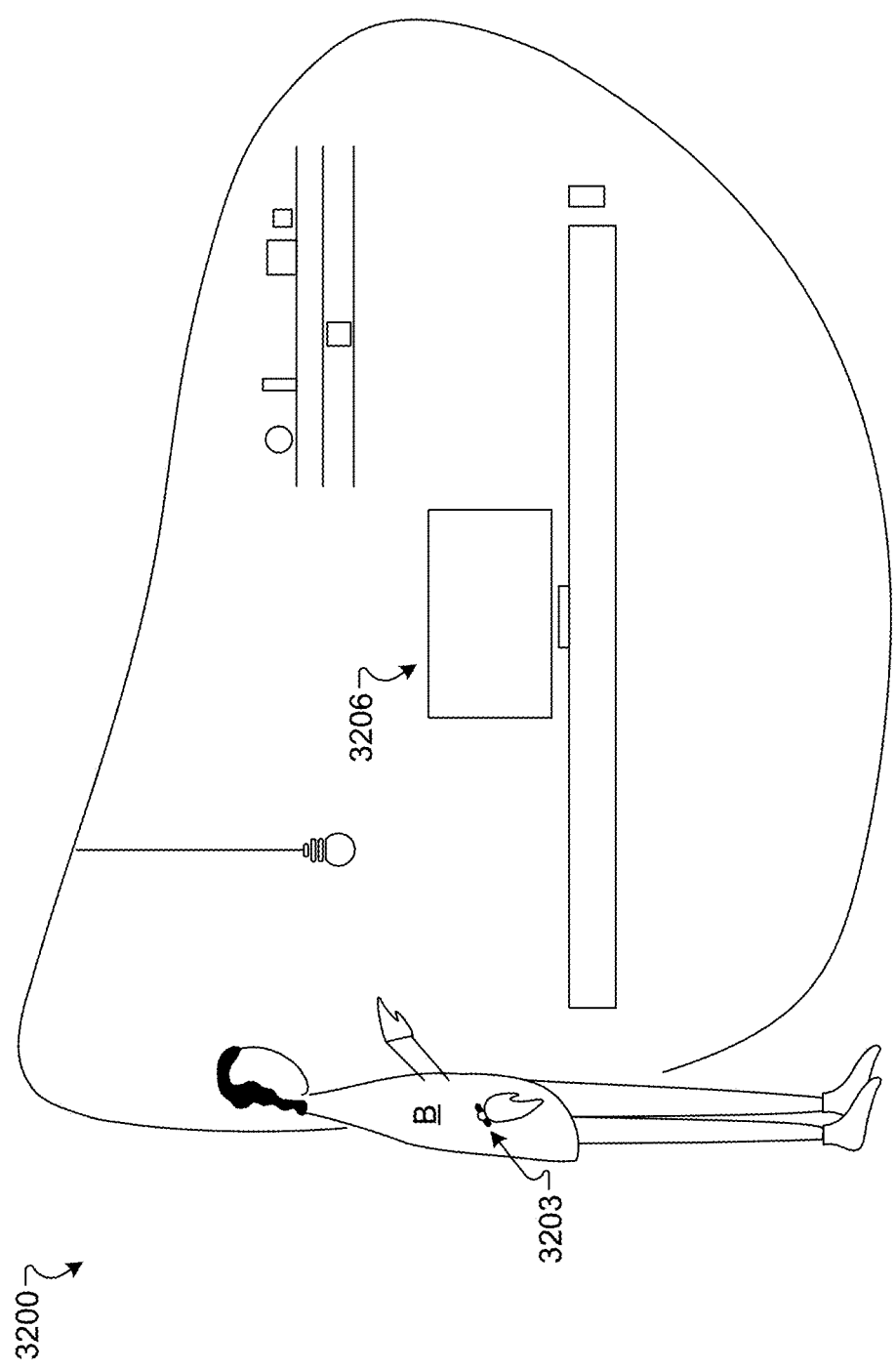

As shown in FIG. 32, a user B is shown in an environment 3200 with a number of electronic devices. For example, the user B may have a device 3203 and a device 3206, each configured to function with a user account operating as an SSI portable account, as described in detail above. In this example, the device 3203 represents a wrist worn device provisioned for the user account as an inner device. The device 3206 represents a television device provisioned for the user account as an outer device. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

At some point in time, the device 3206 is removed from the environment 3200, or stolen, while user B is outside of the environment 3200. An attacker, for example, a local attacker, may gain access, for example, physical access, to the stolen device 3206, and may attempt to steal user information using the stolen device 3206. In this example, the device 3206 may include local device protection for accessing the functionality of the device 3206, such as a passcode, or a PIN, or a facial image.

If the attacker is unable to defeat the local device protection relatively quickly, the attacker may still be able to use the device 3206 (for example, to watch television programming using the device 3206). However, the attacker cannot access information within the user account without defeating the local device protection.

If the attacker is able to defeat the local device protection relatively quickly, the attacker may use the device 3206 to access some information, for example, a subset of information, held in the user account, in accordance with policies associated with the device 3206 provisioned as an outer device of the user account. However, even if the attacker defeats the local device protection and gains (partial) access to the user account, the attacker cannot use the stolen device 3206 (provisioned as an outer device) to revoke the wrist worn device 3203 (provisioned as an inner device). That is, policies associated with the user account limit the capabilities of outer devices such as the device 3206.

At some point, user B may return to the environment 3200 and notice that device 3206 is missing, and accordingly, may use the wrist worn device 3203 (provisioned as an inner device) to revoke the stolen device 3206. In addition, the user B may purchase a new television (to replace the stolen device 3206) and may use the wrist worn device 3203 to provision the new television device. At this point, user B has regained full control of all devices that have access to the user account, although the attacker may have accessed some of the data from the user account.

Alternatively, if user B is able to produce the user-controlled recovery factor, user B may sign into the user account to revoke the lost/stolen device 3206, and/or to provision the newly purchased device.

User B Scenario 7—a New Malicious Inner Device is Added

Figure 33:
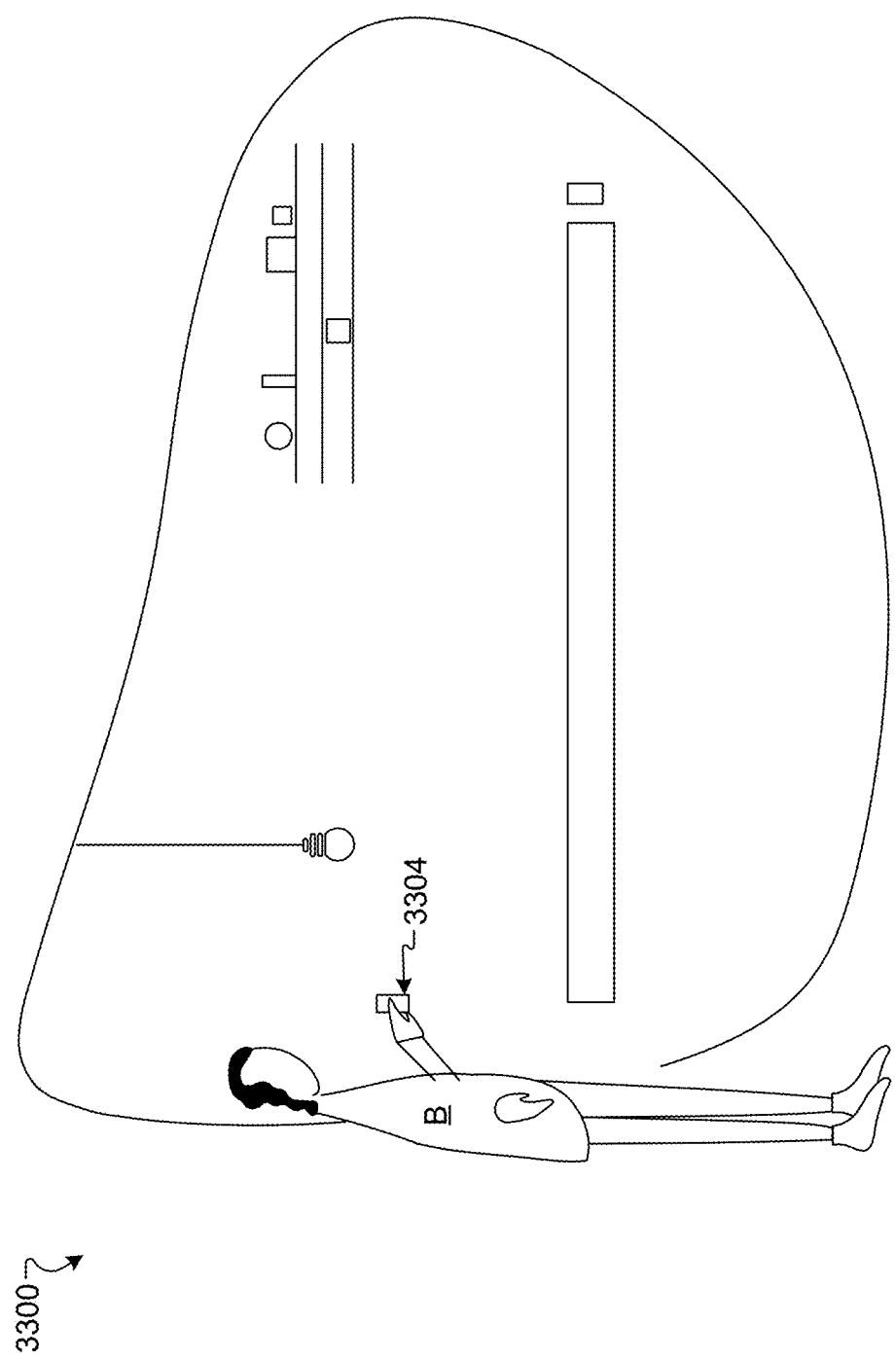

As shown in FIG. 33, a user B is shown in an environment 3300. In this example, user B has a device 3304 configured to function with a user account operating as an SSI portable account, as described in detail above. In this example, the device 3304 represents a mobile device provisioned for the user account as an inner device. In this example, the device 3304 represents the sole device associated with, or operational within, the user account of user B. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

At some point in time, user B lends the mobile device 3304 to another user. Before lending the mobile device 3304 to the other user, user B enters the information used to overcome the local device protection resident on the mobile device 3304, and unlocks access to the mobile device 3304 (which is provisioned as the sole inner device associated with the user account). Because the mobile device 3304 is provisioned as an inner device, unlocking of the mobile device 3304 by user B in this manner (for temporary use by the other user) provides the other user with temporary, but full, access to all of the user account information, and full functionality and control of the user account. Unknown to user B, the other user is a local attacker, who now has physical access to the mobile device 3304 of user B, and temporary, but full, access to all of the user account information, and full functionality and control of the user account.

While using the mobile device 3304 of user B, the attacker uses the access provided by the mobile device 3304 to surreptitiously add another device (i.e., a device belonging to the attacker) as an inner device associated with the user account. The attacker then returns the mobile device 3304 to user B. User B is not yet aware that the attacker has added the attacker device to the user account as an inner device. In this situation the attacker now has access to the information in the user account, and can steal data from the user account. However, the attacker cannot use the attacker device (newly added as an inner device) to revoke the mobile device 3304, as the attacker device has not been associated with the user account as an inner device for greater than the period of time W, and thus does not yet have tenure. Rather, the attacker device cannot gain tenure nor the associated full capabilities of an inner device of the user account without waiting the predefined time period W for tenure.

Similarly, without tenure, the attacker cannot user the newly added attacker device to add a new device, to add a recovery account and the like.

At some point, user B may notice that a new device (the attacker device) has been added to the user account, and may use the (tenured) mobile device 3304 to revoke the attacker device. For example, messages may be broadcast to other devices associated with the user account (in this case, the mobile device 3304, which is the sole device associated with the user account) when new devices are provisioned or attempted to be provisioned with the user account. The user B may use the mobile device 3304 to revoke the attacker device. Alternatively, if user B is able to produce the user-controlled recovery factor, user B may sign into the user account to revoke the newly added attacker device. Upon completion of the above steps, the user B may regain full control of the user account. However, the attacker may have accessed some of the data associated with the user account.

User B Scenario 8—Lose Local Authentication Factor

Figure 34:
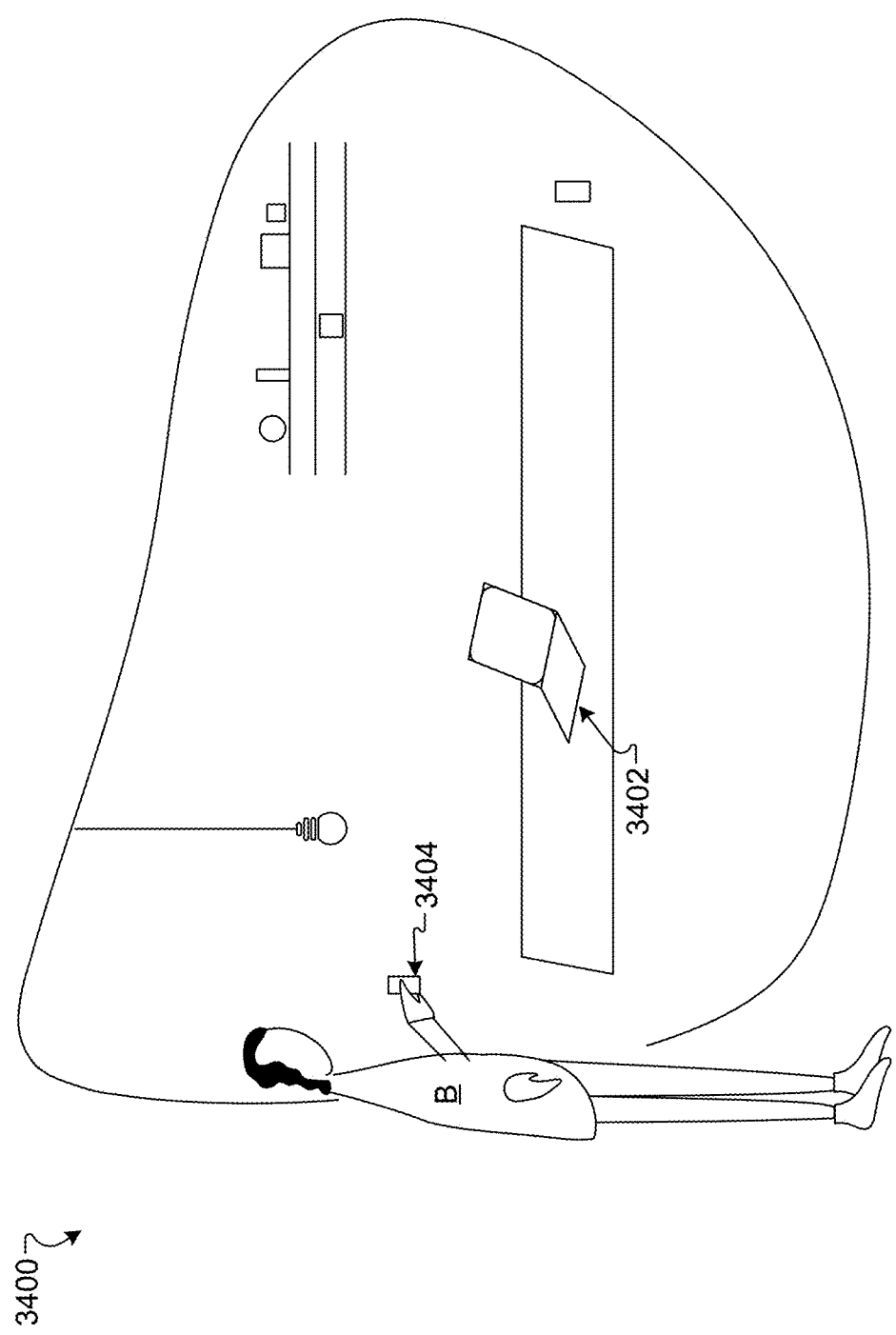

As shown in FIG. 34, a user B is shown in an environment 3400. In this example, user B has a device 3402 and a device 3404, each configured to function with a user account operating as an SSI portable account, as described in detail above. In this example, the device 3402 represents a mobile device provisioned for the user account as an inner device, and the device 3404 represents a laptop computing device provisioned for the user account as an inner device. In this example, the device A02 and the device A04 each include local device protection, in the form of a strong random passcode, for accessing the functionality of the respective device 3202, 3204, and for accessing the user account. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

At some point in time, user B is in a situation in which the device 3402 and the device 3404 are not used by the user B for a somewhat extended period of time, such as, for example, a period in which user B travels without the devices 3402, 3404, and/or a period of travel during which connectivity is not readily available. Upon returning, user B has forgotten the strong random passcode associated with the devices 3402, 3404. In this example, the devices 3402, 3404 are the devices associated with the user account, and the user account would typically be inaccessible through the devices 3402, 3404 without the (forgotten) strong random passcode.

In some situations, the user-controlled recovery factor may be a passcode, or a PIN. In some situations, policies associated with the user account may allow the user to provide other types of authentication as the user-controlled recovery factor such as, for example, known physical network locations combined with knowledge/challenge questions and the like.

If user B is able to produce the user-controlled recovery factor, user B may sign into the user account by entering the user-controlled recovery factor to (re)provision the user account with the devices 3402, 3404, and will regain full access and control of the user account.

If user B cannot produce the user-controlled recovery factor, user B has no means of accessing the user account, and has permanently lost access to the user account.

User B Scenario 9—One of Three Inner Devices is Hacked

Figure 35:
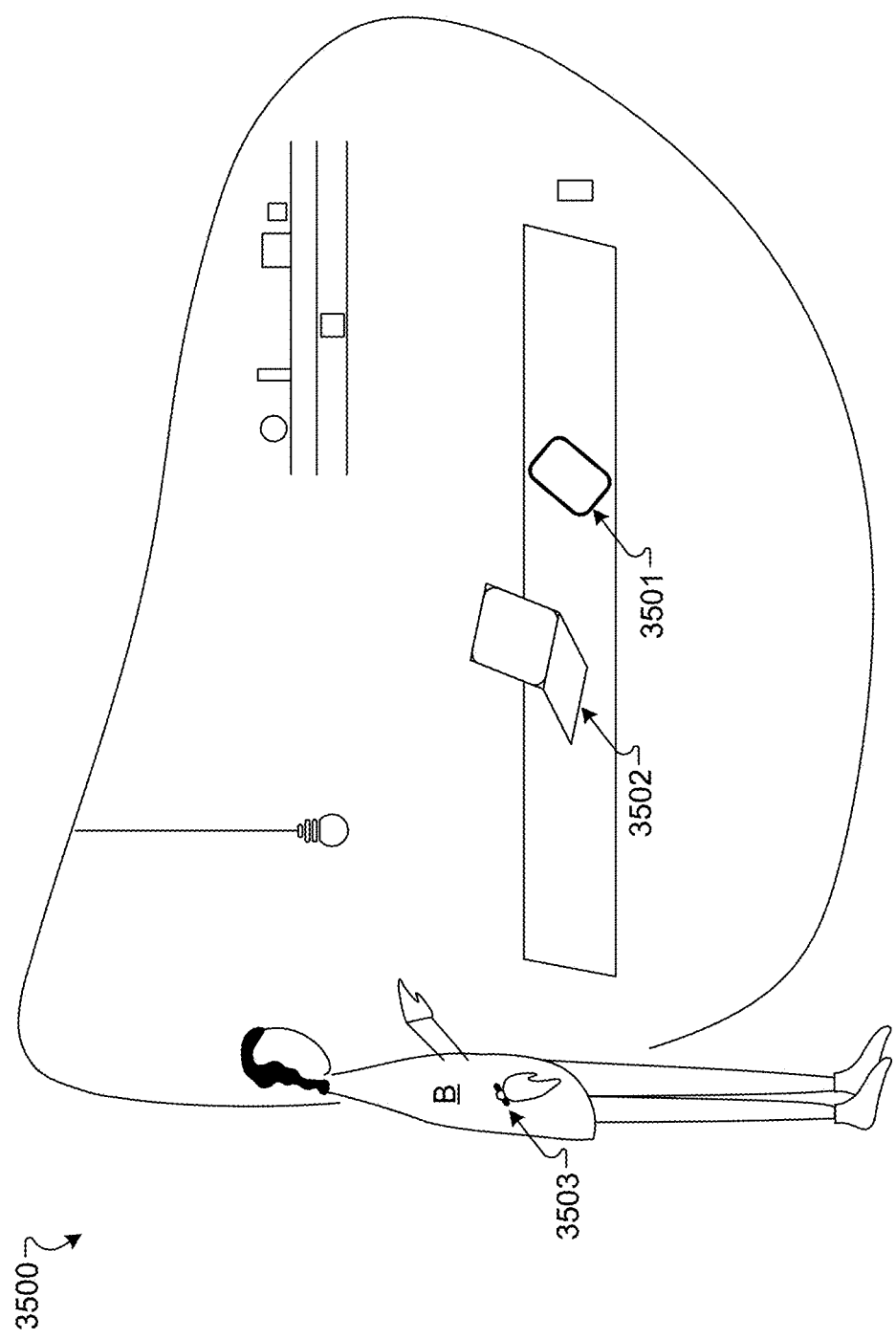

As shown in FIG. 35, a user B is shown in an environment 3500. In this example, user B has a device 3501, a device 3502 and a device 3503, each configured to function with a user account operating as an SSI portable account, as described in detail above. In this example, the device 3501 represents a tablet computing device provisioned for the user account as an inner device. The device 3502 represents a mobile device provisioned for the user account as an inner device. The device 3503 represents a wrist worn device provisioned for the user account as an inner device. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

In some situations, a remote attacker, or a network attacker, may discover a vulnerability in one, or more, of the devices 3501, 3502, 3503 associated with the user account of user B. Depending on the individual ability of the network attacker, and the security provisions associated with the user account, the network attacker may be able to provision new devices, even remotely, and without physical access to one of the inner devices 3501, 3502, 3503 associated with the user account. Similarly, the network attacker may be able to use the remotely provisioned device to remotely revoke existing devices, without physical access to one of the inner devices 3501, 3502, 3503 associated with the user account. In some situations, the network attacker may be able to remotely circumvent existing protocols regarding the tenure period W for the remotely provisioned device, and/or the rate limiting period X for revoking inner device(s), and/or the period of time Y for a (new) recovery account and/or credentials to become active. In these types of situations, the network attacker has access to the user account, and can steal information from the user account. If user B is able to produce the user-controlled recovery factor, user B may sign into the user account by entering the user-controlled recovery factor, to (re)provision the user account, to revoke devices added to the user account without the consent of user B, and the like, to regain full access and control of the user account. If user B is unable to produce the user-controlled recovery factor, user B will have difficulty in regaining control of the user account.

User B Scenario 10—Quickly Erase Data

Figure 36:
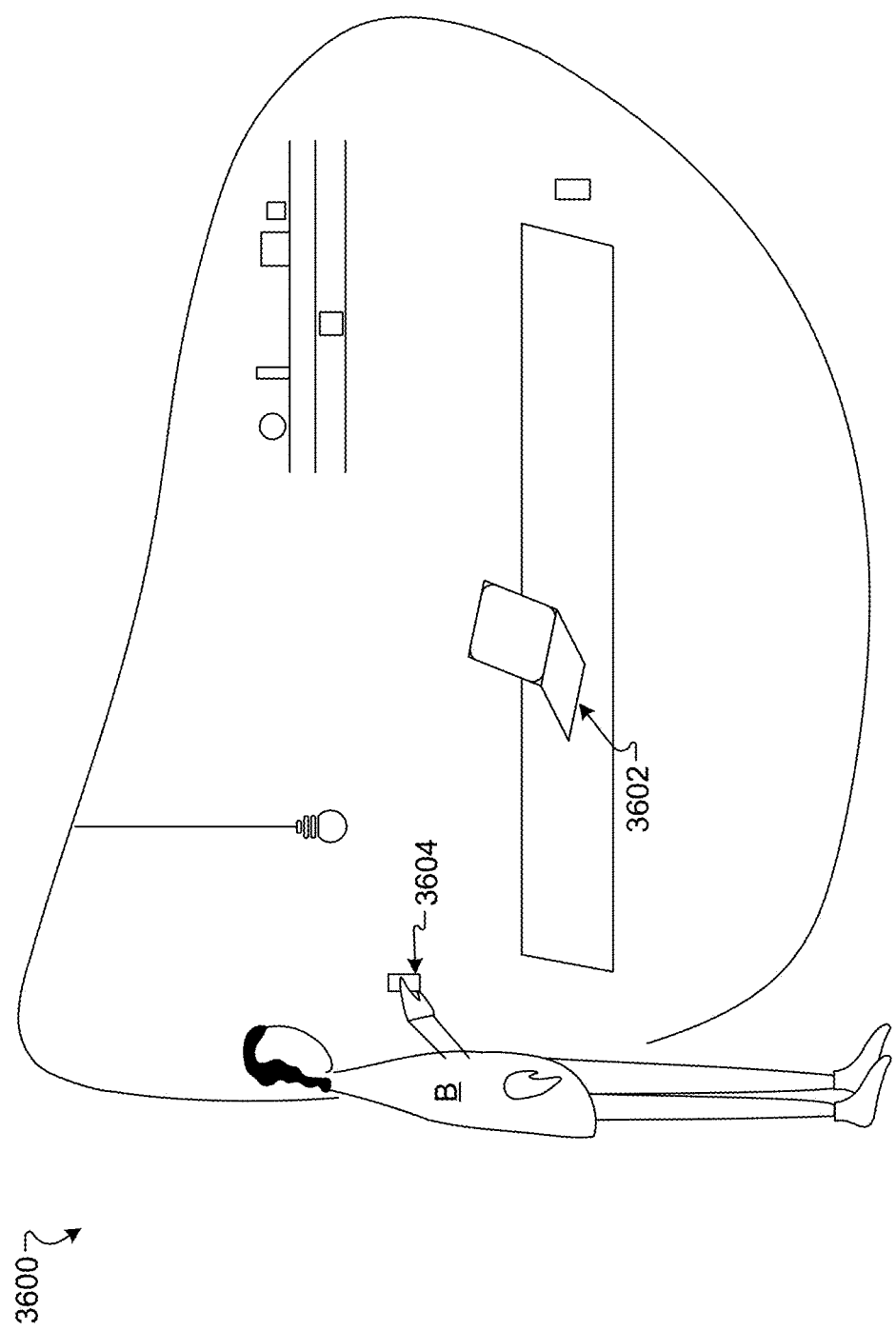

As shown in FIG. 36, a user B is shown in an environment 3600. In this example, user B has a device 3602 and a device 3604, each configured to function with a user account operating as an SSI portable account, as described in detail above. In this example, the device 3602 represents a mobile device provisioned for the user account as an inner device, and the device 3604 represents a laptop computing device provisioned for the user account as an inner device. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor.

User B may have information and data stored in association with the device(s) 3602, 3604 and with the user account. At some point in time, user B may want to permanently delete some, or all, of the information and data, so that the information and data is no longer available, for example, to an outside party. The user B may attempt to delete the user account, so that the information and data is no longer available. However, in accordance with policies associated with the user account, a period of time Z (for example, Z days) may be associated with the ability to delete a user account. Thus, user B may have to wait for the period of time Z to have elapsed before the account may be deleted. In some situations, user B may wish for the information and data to be unavailable before the period of time Z has elapsed, for example, substantially immediately. In this situation, user B may use one of the inner devices 3602, 3604 to revoke both of the inner devices 3602, 3604. User B may have to wait a period of time Y (for example, Y days) for the revocation of both of the inner devices 3602, 3604 to take effect. By revoking both of the inner devices 3602, 3604, the user account is now permanently inaccessible via either of the devices 3602, 3604, either by the user B or by an outside party, after the period of time Y. However, if user B is willing and able to produce the user-controlled recovery factor, user B (or an outside party with whom the user-controlled recovery factor is shared) may sign into the user account by entering the user-controlled recovery factor regain full access to information in the user account, and control of the user account.

User B Scenario 11—User is Incapacitated

Figure 37:
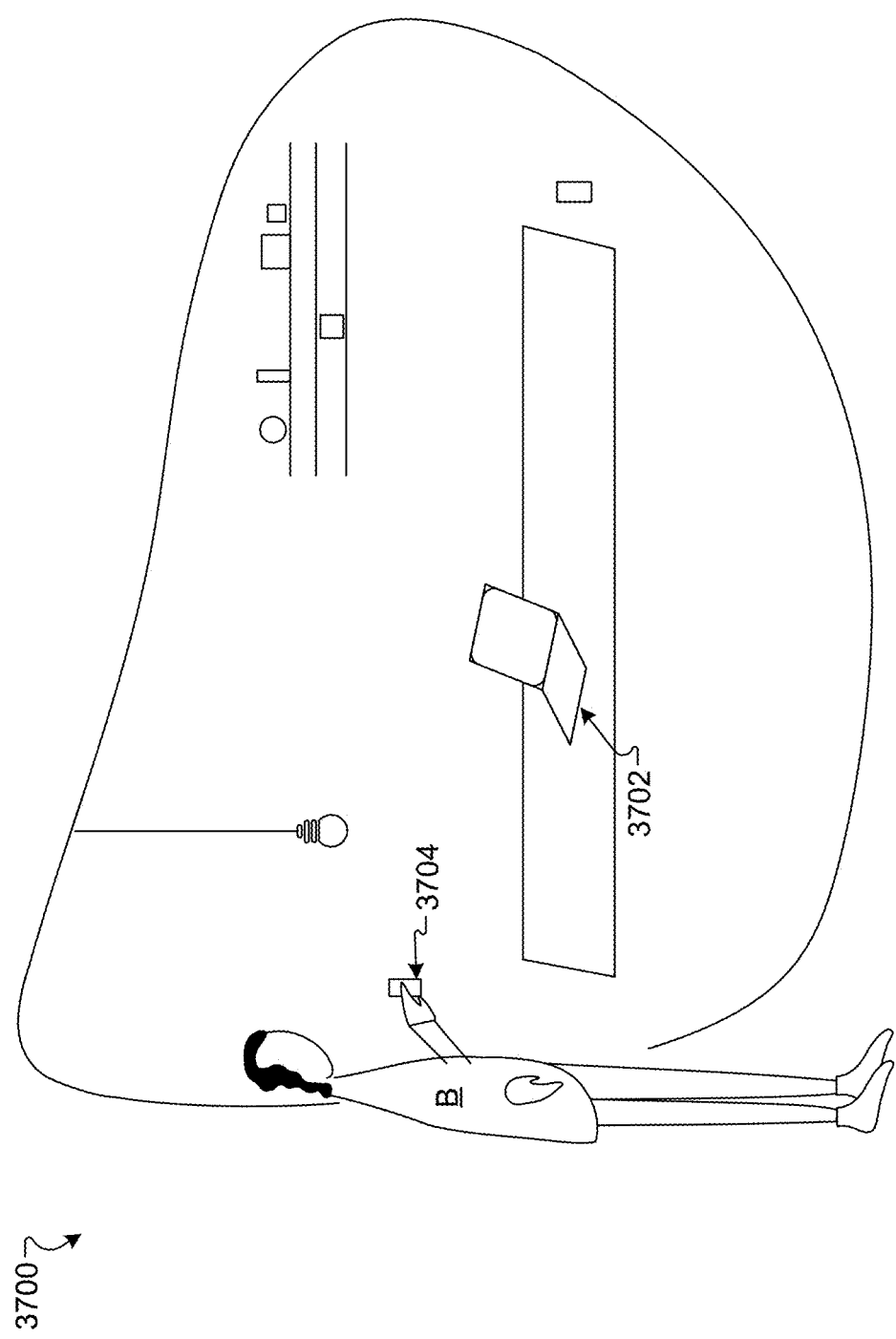

As shown in FIG. 37, a user B is shown in an environment 3700. In this example, user B has a device 3702 and a device 3704, each configured to function with a user account operating as an SSI portable account, as described in detail above. In this example, the device 3702 represents a mobile device provisioned for the user account as an inner device, and the device 3704 represents a laptop computing device provisioned for the user account as an inner device. A recovery account including a user-controlled recovery factor is configured for the user account of user B. In this example, the recovery account is not administered by an outside recovery service. Access to the recovery account relies on the ability of user B to remember, or access, or in some way provide the user-controlled recovery factor. In some situations, user accounts may include provisions for a legacy recovery account, or a specialized recovery account, to be invoked in the event the primary user becomes incapacitated.

At some point in time, user B becomes incapacitated. In some situations, user B may wish for another entity (i.e., family/friends) to have access to the user account in the event user B becomes incapacitated. In this situation, user B may leave instructions on how to locate the user-controlled recovery factor that will provide access to the user account. The instructions may be left with, for example, a trusted third party, within written legal instructions executable in the event of incapacitation, and the like. The other entity (family/friends) may use the user-controlled recovery factor to access the user account, and provision the user account for a new device (for example, a new device owned by the other entity). This may allow for the other entity to gain access to the user account, as intended by user B.

In some situations, user B may wish for another entity (i.e., family/friends) to have access to the user account in the event user B becomes incapacitated, and provides credentials in the form of, for example, a security key, to unlock one of the (inner) devices 3702, 3704 associated with the user account, to be delivered to the other entity by a trusted third party in the event of incapacitation. In this situation, the other entity may use the security key to unlock one of the devices 3702, 3704, and gain access to the user account, as intended by the user B.

In some situations, user B may wish for another entity (i.e., family/friends) to have access to some, or all of the information in the user account in the event user B becomes incapacitated. To enable this, user B establishes a shared user account, and leaves account access credentials with a trusted third party, to be provided to the other entity in the event of incapacitation. In this situation, the other entity may use the account access credentials to access the shared user account, and to access the information included in the shared user account, as intended by the user B.

In some situations, the user B may wish for another entity (i.e., family/friends) to have access to the user account in the event user B becomes incapacitated. To enable this, user B may add a specialized recovery account, that will allow for provisioning of a new device from a single use code, for example, a single use two-dimensional, or three-dimensional bar code (for example, a quick response (QR) code), which may be provided to the other entity by a trusted third party. The other entity may use the single use code to provision the user account on a new device, to gain access to the user account, as intended by the user B.

In some situations, user B may wish for another entity (i.e., family, friends) to have access to the user account in the event user B becomes incapacitated, but user B does not make provisions for providing for this access via, for example, one of the means described above. In this situation, because user B did not proactively make provisions to provide others with access to the user account in the event of incapacitation, family/friends have no access to the user account, even though user B wanted to allow for this.

User B Scenario 12—Lose Recovery Provider Account

Figure 38:
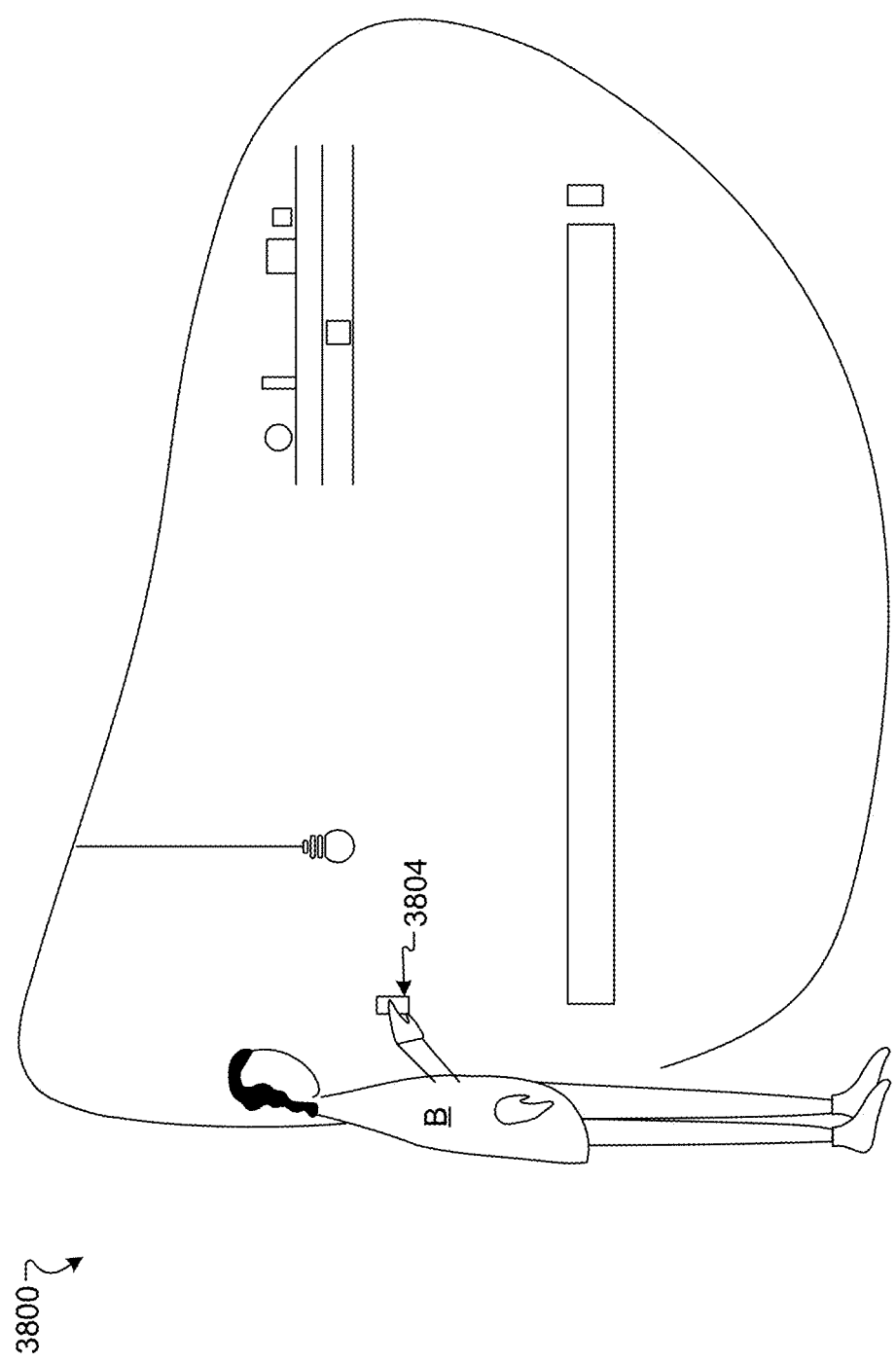

As shown in FIG. 38, a user B is shown in an environment 3800. In this example, user B has a device 3804 configured to function with a user account operating as an SSI portable account, as described in detail above. In this example, the device 3804 represents a mobile device provisioned for the user account as an inner device. In this example, the device 3804 represents the sole device associated with, or operational within, the user account of user B. A recovery account including a user-controlled recovery factor is configured for the user account of user B. In this example, the recovery account is hosted by a recovery provider, but is not administered by an outside recovery service. Access to the recovery account relies on the ability of user B to remember, or access, or in some way provide the user-controlled recovery factor.

At some point, the recovery account associated with the user account of user B is terminated, for example, by the hosting provider of the recovery account, due to, for example, use or operation outside of the confines of an original use agreement or the like. In this situation, user B maintains access to the user account through the device 3804. However, without an accessible recovery account, the user account may become compromised should the device 3804 become inoperable or unavailable. To ensure a recovery account will be available in the event it is requested, user B may attempt to add a (new) recovery account, for example, with a new hosting provider. However, one of the policies associated with the user account may require that a period of time Y (for example, Y days) have elapsed before the recovery account may be engaged. In this example, user B may maintain access and control of the user account but will have to wait a time period Y (for example, Y days) for the new recovery account to become active.

User B Scenario 13—Recovery Provider Account is Hacked

Figure 39:
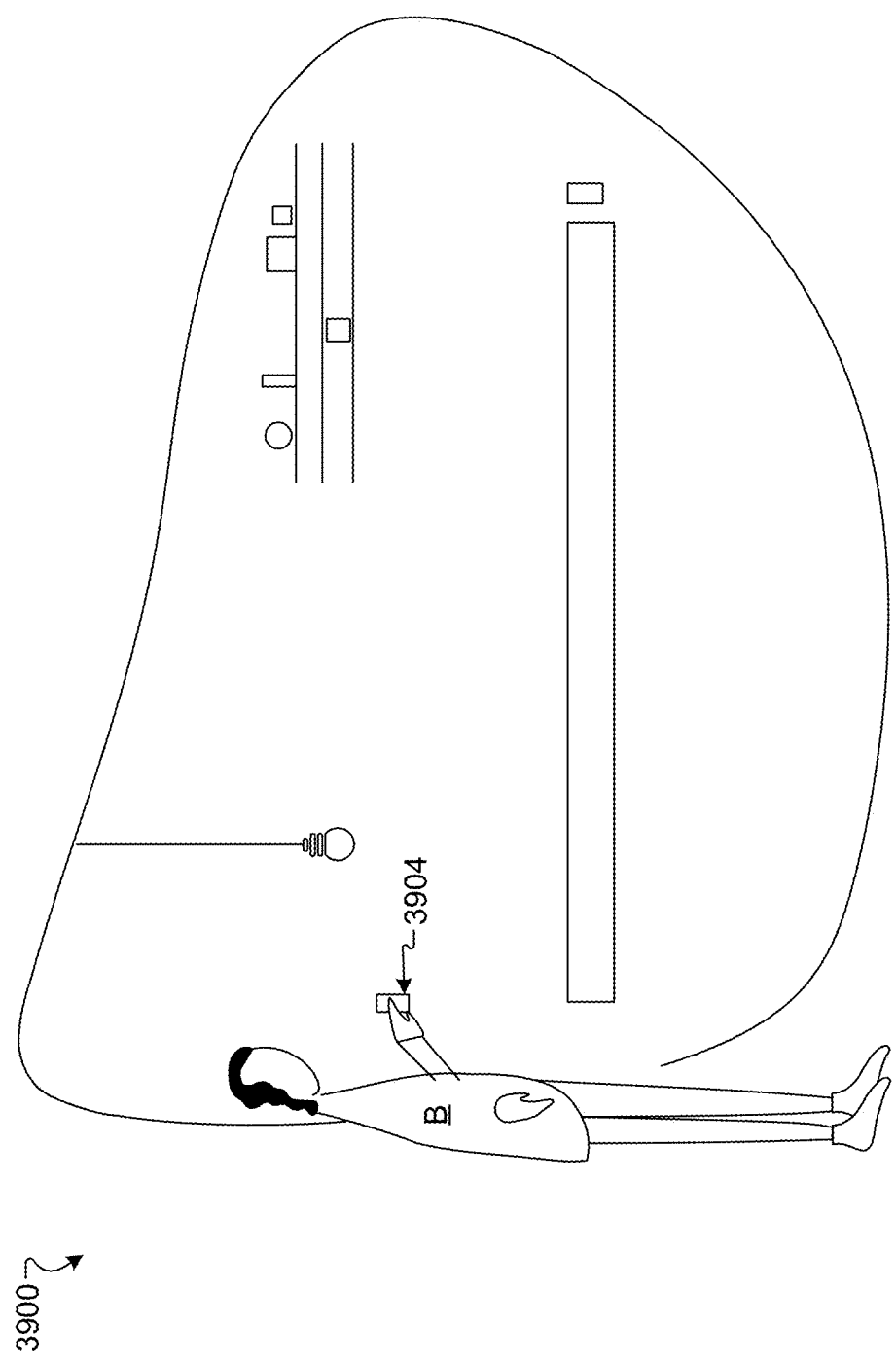

As shown in FIG. 39, a user B is shown in an environment 3900. In this example, user B has a device 3904 configured to function with a user account operating as an SSI portable account, as described in detail above. In this example, the device 3904 represents a mobile device provisioned for the user account as an inner device. In this example, the device 3904 represents the sole device associated with, or operational within, the user account of user B. A recovery account including a user-controlled recovery factor is configured for the user account of user B. In this example, the recovery account is hosted by a recovery provider, but ability to recover the user account via the recovery account also relies on the ability of user B to remember, or access, or in some way provide the user-controlled recovery factor.

At some point in time, a remote attacker, or a network attacker, steals login credentials, or defeats an initial account access inquiry, for the recovery account associated with the user account of user B.

If the remote attacker is not also able to steal, or defeat, the user-controlled recovery factor, the remote attacker will not be able to gain full access and full control of the user account. In this situation, user B maintains full access and full control of the user account.

If the remote attacker is also able to steal, or defeat, the user-controlled recovery factor, the remote attacker may provision a new device (i.e., a device owned by the attacker), and may revoke the devices of user B (i.e., the mobile device 3904, in this example). At this point, the attacker has control of both the recovery account and the user account, and can steal information. The attacker may also attempt to terminate the existing recovery account of user B, and to add a new recovery account that is not accessible to the user B. However, one of the policies associated with the user account may require that a period of time Y (for example, Y days) have elapsed before the recovery account may be engaged. The attacker may also attempt to terminate the user account, to eliminate access to the user account by user B. However, another policy associated with the user account may require that a period of time Z (for example, Z days) have elapsed before deletion of a user account may take effect.

If user B is able to verify rightful ownership of the recovery account before the periods of time Y and/or Z have elapsed (and the new recovery account replaces the original recovery account and/or the original user account is terminated), user B may then access the (original) recovery account, re-provision the mobile device 3904, and revoke all other devices that have been added by the attacker. The user B may also cancel the pending user account termination, and the pending recovery account removal/replacement. At this point, user B has regained full access to and control of the user account and the recovery account, although the attacker may have stolen some information.

If user B is not able to verify rightful ownership of the recovery account before the periods of time Y and/or Z have elapsed (and the new recovery account replaces the original recovery account and/or the original user account is terminated), the attacker gains permanent access to the user account (if it is not terminated) and the new recovery account.

User B Scenario 14—Recovery Provider is Externally Compromised or Compelled

Figure 40:
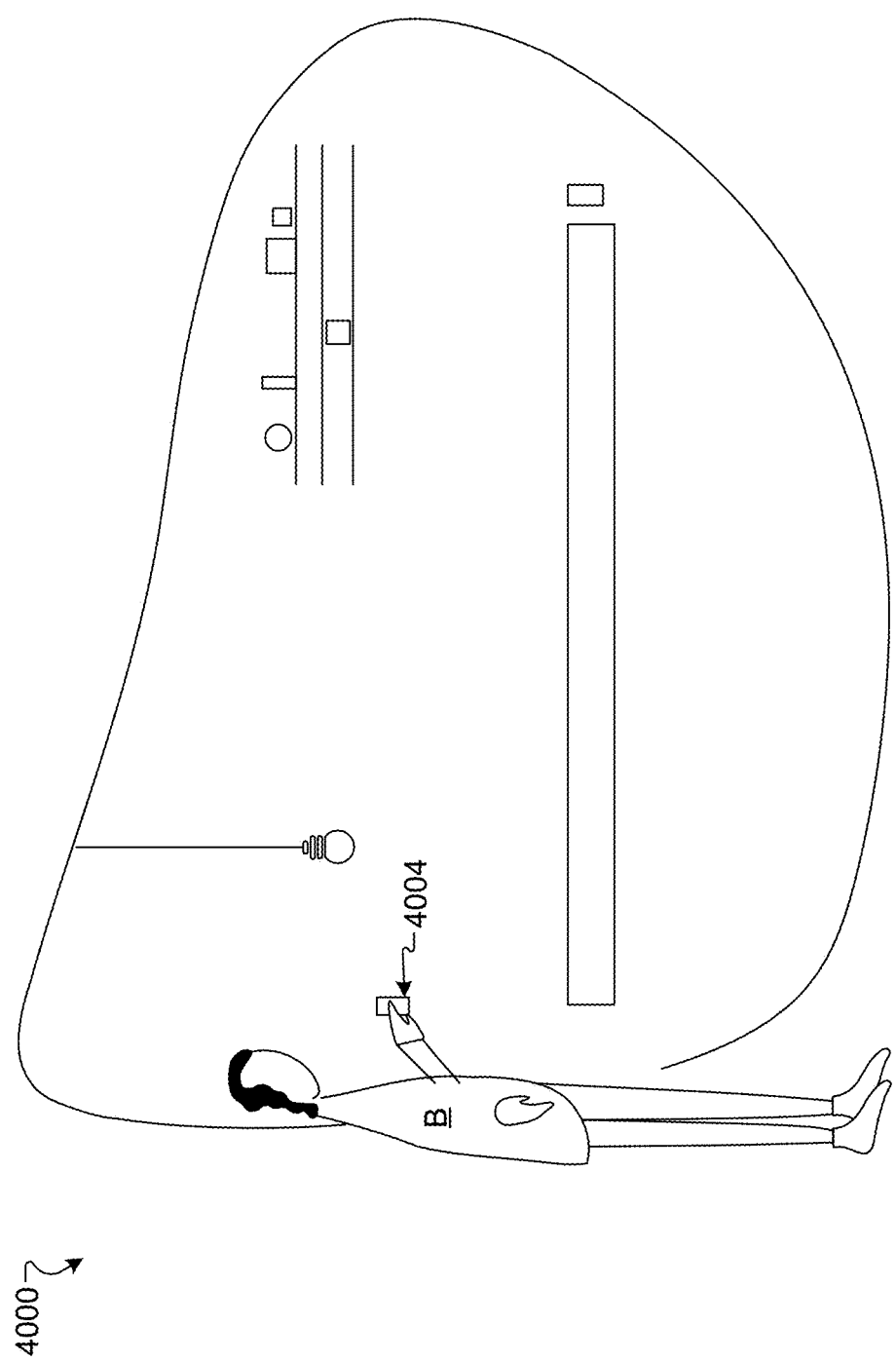

As shown in FIG. 40, a user B is shown in an environment 4000. In this example, user B has a device 4004 configured to function with a user account operating as an SSI portable account, as described in detail above. In this example, the device 4004 represents a mobile device provisioned for the user account as an inner device. In this example, the device 4004 represents the sole device associated with, or operational within, the user account of user B. A recovery account including a user-controlled recovery factor is configured for the user account of user B. In this example, the recovery account is hosted by a recovery provider, but ability to recover the user account via the recovery account also relies on the ability of user B to remember, or access, or in some way provide the user-controlled recovery factor.

At some point in time, external requirements dictate that the recovery provider provide access to information held in the recovery accounts of a designated set of users, including user B. Although the recovery provider controls to the recovery account associated with the user account of user B, using the recovery account to gain access to the user account requires provision of the user-controller recovery factor. Because user B (and not the recovery provider hosting the recovery account) has access to the user-controlled recovery factor, the recovery provider is unable to produce the user-controlled recovery factor, and thus is unable to access information contained in the user account. Thus user B retains exclusive access to the user account.

User B Scenario 15—Recovery Provider is Internally Compromised

Figure 41:
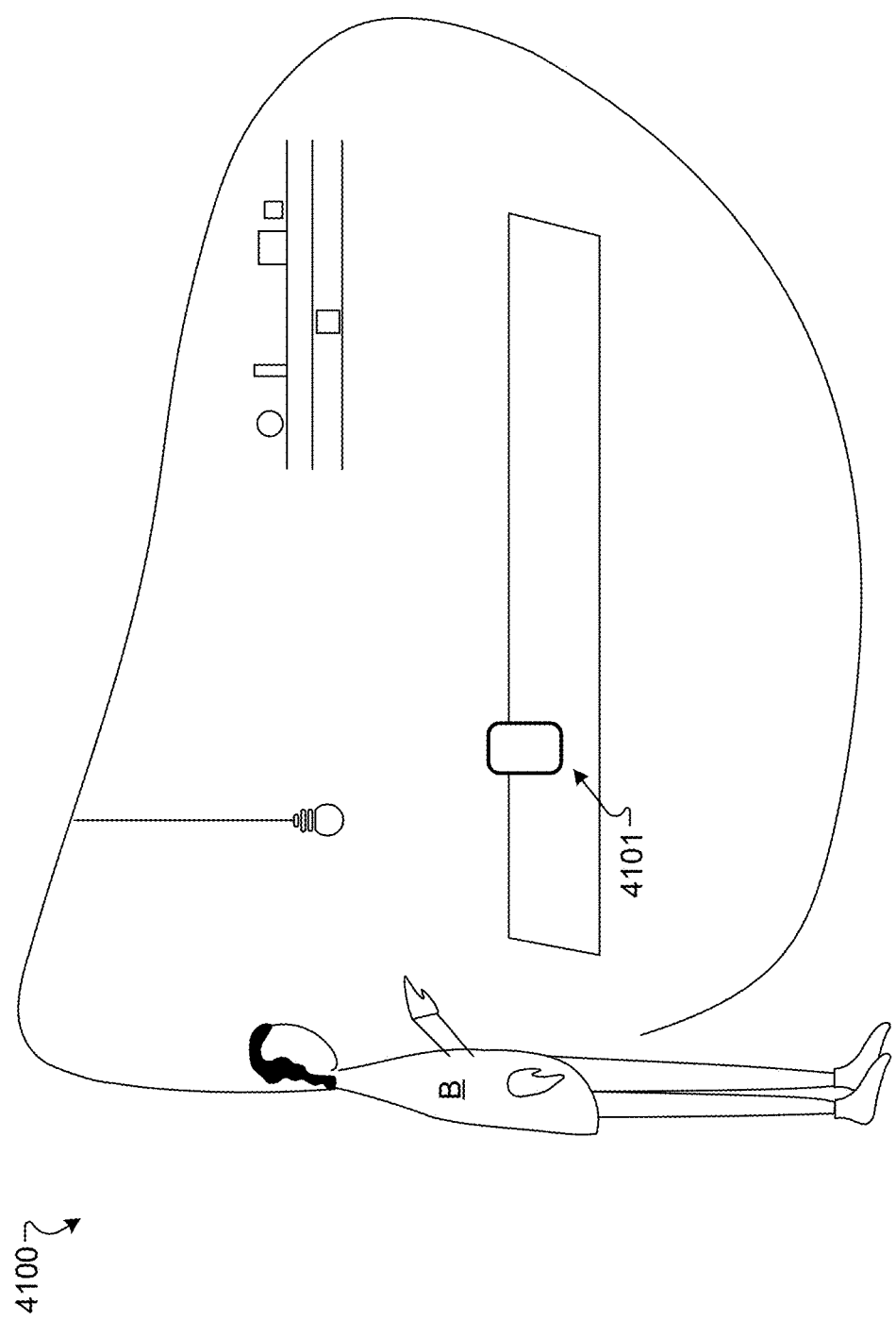

As shown in FIG. 41, a user B is shown in an environment 4100. In this example, user B has a device 4101 configured to function with a user account operating as an SSI portable account, as described in detail above. In this example, the device 4101 represents a tablet device provisioned for the user account as an inner device. In this example, the device 4101 represents the sole device associated with, or operational within, the user account of user B. A recovery account including a user-controlled recovery factor is configured for the user account of user B. In this example, the recovery account is hosted by a recovery provider, but ability to recover the user account via the recovery account also relies on the ability of user B to remember, or access, or in some way provide the user-controlled recovery factor.

At some point in time, an attacker within the recovery provider hosting the recovery account associated with the user account of user B steals credentials that grants initial account access to the recovery account associated with the user account of user B. However, if the remote attacker is not also able to steal, or defeat, the user-controlled recovery factor, the remote attacker will not be able to gain full access and full control of the recovery account, and the user account. Thus, without the user-controlled recovery factor, the attacker cannot alter the recovery account or the user account, and user B maintains full access to and full control of the recovery account and the user account.

User C Scenario 1—Lose Sole Inner Device

Figure 42:
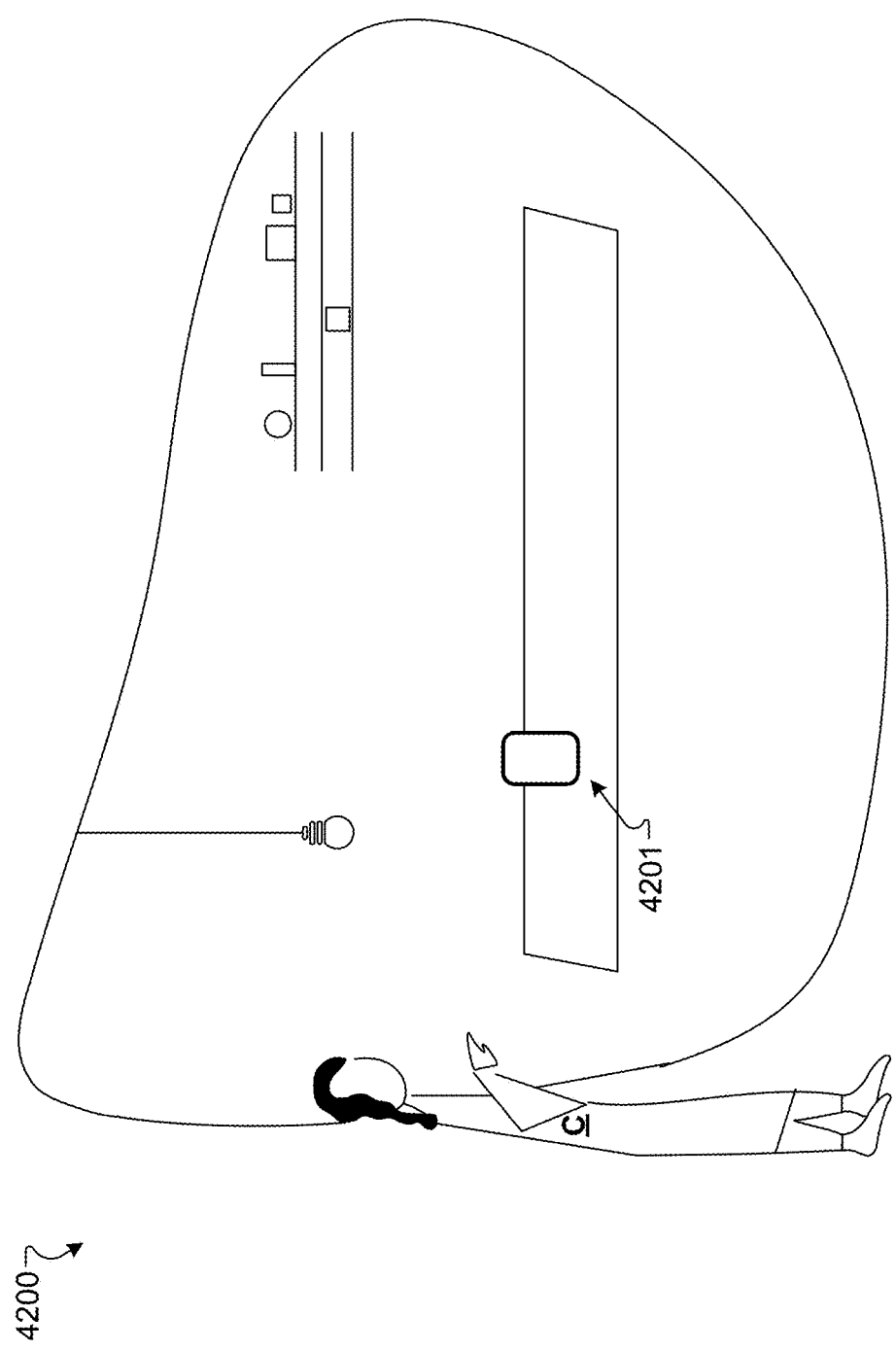
FIGS. 42 through 56 are examples of using a portable user account with a configured recovery account, in accordance with implementations described herein.

As shown in FIG. 42, a user C is shown in an environment 4200. In this example, user C has a device 4201 configured to function with a user account operating as an SSI portable account, as described in detail above. In this example, the device 4201 represents a tablet device provisioned for the user account as an inner device. In this example, the device 4201 represents the sole device associated with, or operational within, the user account of user C. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, the device 4201 is, in some manner irreparably damaged, or damaged beyond repair, such that the device 4201 is rendered inoperable. The user C may choose to replace the inoperable device 4201 with a new device (for example, a new tablet computing device) and add the new tablet computing device to the user account. The user C can log into the recovery account associated with the user account, provision the newly purchased tablet device to the user account, and revoke the now inoperable device 4201 from the user account. User C retains access to and control of the user account.

User C Scenario 2—Sole Inner Device is Stolen

Figure 43:
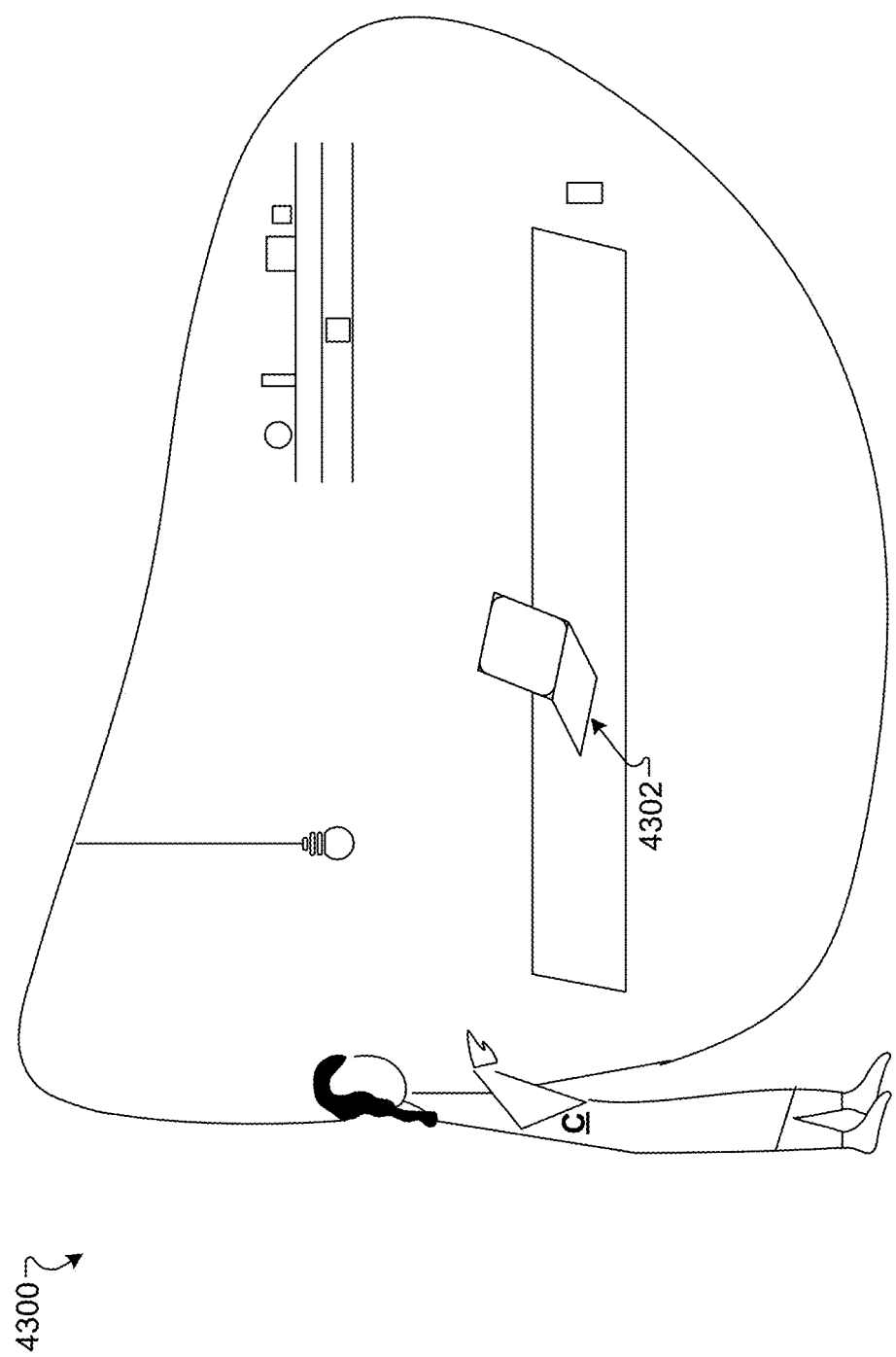

As shown in FIG. 43, a user C is shown in an environment 4300. In this example, the user C has a device 4302 configured to function with a user account operating as an SSI portable account, as described in detail above. In this example, the device 4302 represents a laptop computing device provisioned for the user account as an inner device. In this example, the device 4302 represents the sole device associated with, or operational within, the user account of user C. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, user C loses possession of the device 4302. For example, the device 4302 may have been lost by the user C, or may have been stolen while left unattended by the user C. An attacker, for example, a local attacker, may gain access, for example, physical access, to the lost/stolen device 4302, and attempt to steal user information from the lost/stolen device 4302. In this example, the device 4302 may have a local authentication protocol, such as entry of a password or personal identification number (PIN), configured as local device protection. If the attacker overcomes the local device protection, the attacker may gain access to the user account. Because the device 4302 is the single device associated with the user account, the sole other way to gain access to the user account (without the device 4302) is through the user account.

If the attacker is unable to defeat the local device protection relatively quickly, the attacker may instead perform a factory reset of the device 4302, and continue to use the device 4302, or sell the device 4302. User C may sign into the recovery account and gain full access to the user account. User C can use that access to provision a newly purchased device (to replace the stolen device 4302), and to revoke the stolen device 4302, thus regaining full control of the user account.

If the attacker is able to defeat the local device protection relatively quickly (for example, before user C realizes the device 4302 is missing and is able to access the recovery account), the attacker may gain access to the user account via the stolen device 4302, and use this access to add a new device (i.e., a device belonging to the attacker) provisioned as an inner device. However, one of the policies associated with the user account may require that a period of time W have elapsed before a newly added device gains tenure. In this example, the attacker may also attempt to add a recovery account. However, another of the policies associated with the user account may require that a period of time Y have elapsed before engaging the recovery account. In this example, the attacker may have access to the account and may steal data, but the attacker has limited capabilities within the user account during the period of time W until the newly added device gains tenure, and the period of time Y until the new recovery account can be established.

During this time, user C may sign into the recovery account using another device (for example, a borrowed device or a newly purchased device) to access the user account. User C may use this access to revoke all other devices associated with the user account, and to revoke the pending recovery account change. User C may also then revoke the borrowed device and/or provision a newly purchased device. At this point, user C has regained full control of the user account, although the attacker may have been able to steal some information.

User C Scenario 3—Lose One of Two Inner Devices

Figure 44:
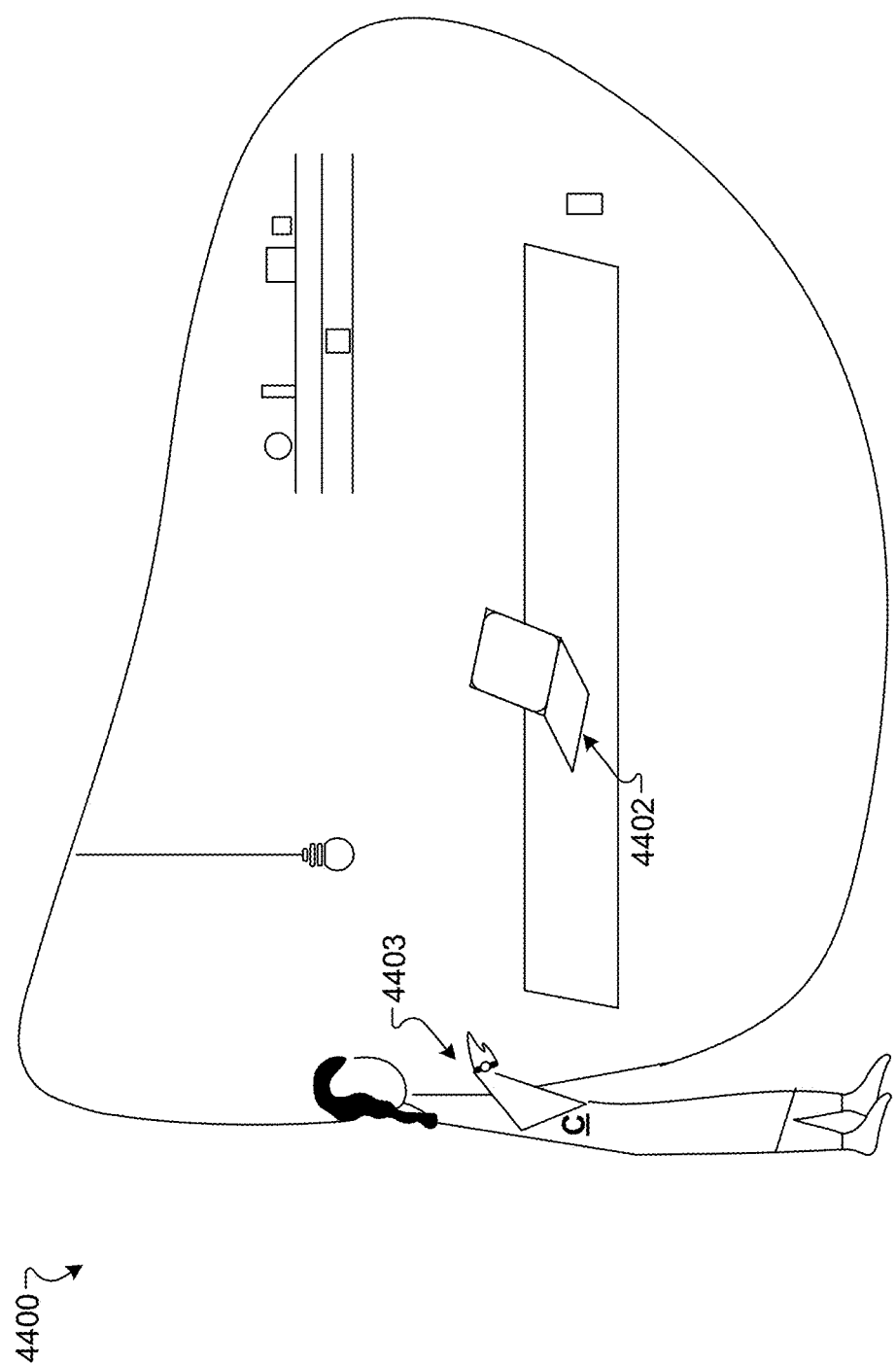

As shown in FIG. 44, a user C is shown in an environment 4400 with a number of electronic devices. For example, the user C may have a device 4402 and a device 4403 configured to function with a user account operating as an SSI portable account, as described in detail above. In this example, the device 4402 represents a laptop computing device provisioned for the user account as an inner device. The device 4403 represents a wrist-worn mobile device, or a watch, provisioned for the user account as an inner device. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, the device 4402 is, in some manner irreparably damaged, or damaged beyond repair, such that the device 4402 is rendered inoperable. In response to the determination that the device 4402 is inoperable, or beyond repair, the user C may choose to replace the device 4402 with a new device (for example, a new laptop computing device) and add the new laptop computing device to the user account. In this example, the user C has access to, and use of the device 4403, which is provisioned as an inner device for the user account. In a situation in which the remaining device 4403 is a tenured inner device, user C may use the device 4403 to revoke the now inoperable device 4402. The user C may also provision the new laptop computing device with the user account using device 4403, and maintain full control of all devices that have access to the user account. User C may also sign into the recovery account for access to the user account, and use this access to provision the newly purchased device to the user account, and to revoke the inoperable device 4403 from the user account. In some situations, the user account may be configured to include a policy or rule that disallows tenure of a new device until after a predefined time period W has elapsed, corresponding to device association to the user account.

User C Scenario 4—One of Two Inner Devices is Stolen

Figure 45:
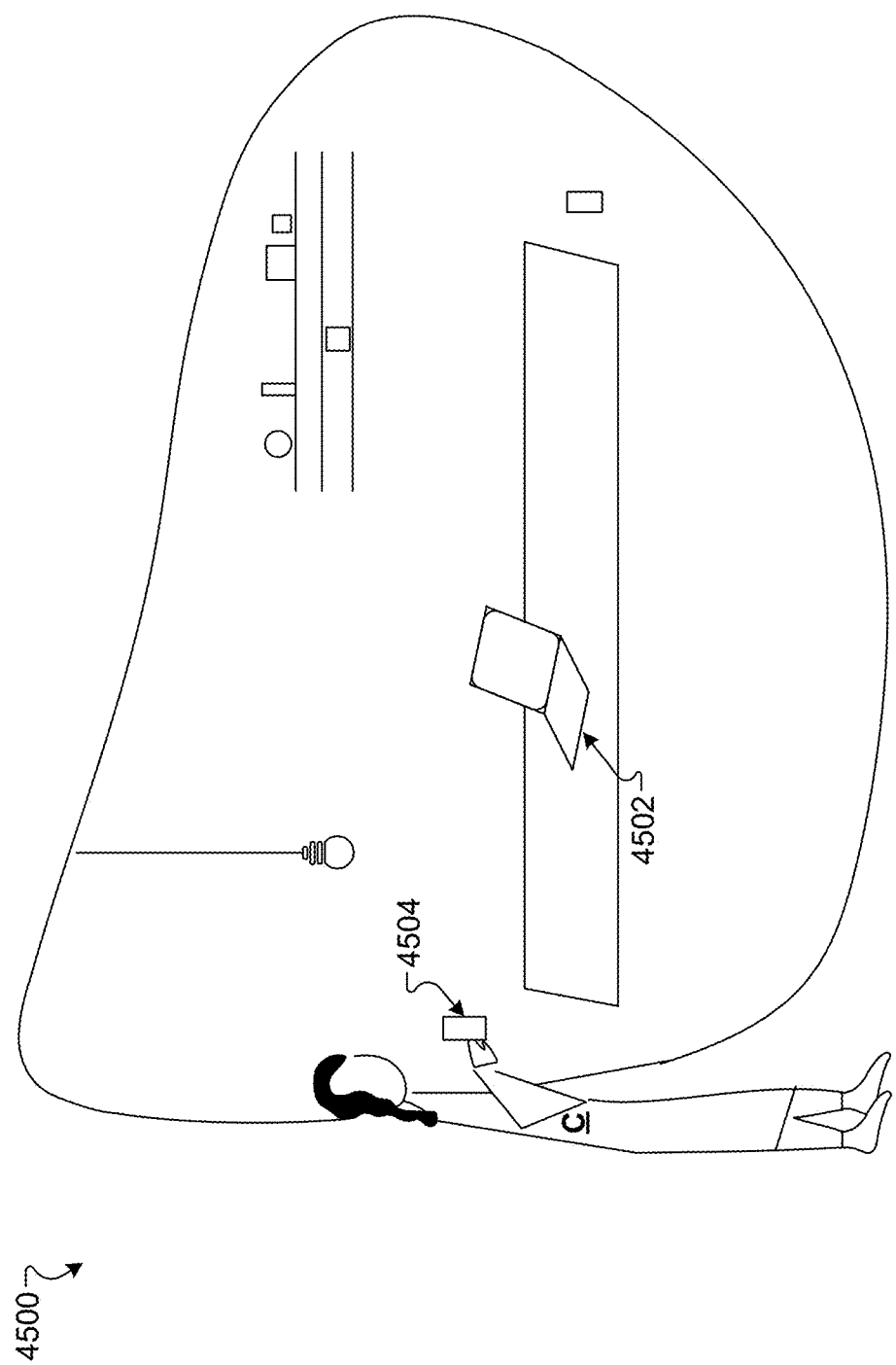

As shown in FIG. 45, a user C is shown in an environment 4500 with a number of electronic devices. For example, the user C may have a device 4502 and a device 4504 configured to function with a user account operating as an SSI portable account, as described in detail above. In this example, the device 4502 represents a laptop computing device provisioned for the user account as an inner device. The device 4504 represents a mobile device provisioned for the user account as an inner device. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, user C loses the device 4504, or the device 4504 is stolen, and the device 4504 is in the physical possession of a local attacker. The attacker may gain access, in an attempt to steal user information from the lost/stolen device 4504. In this example, the device 4504 may include local device protection in the form of, for example, a fingerprint scanner, passcode or PIN entry and the like.

If the attacker is unable to quickly defeat the local device protection, user C may use the laptop computing device 4502, which is provisioned as an inner device of the user account, to revoke the lost/stolen mobile device 4504, or may sign into the recovery account to revoke the lost/stolen mobile device 4504, and regain full control of all devices that have access to the user account. In some situations, user C may choose to provision another, temporary mobile device, for example, as an outer device of the user account (using the laptop computing device 4502, or using access to the user account via the recovery account), until user C is able to purchase a new mobile device. Once user C purchases a new mobile device, user C can use the laptop computing device 4502 (provisioned as an inner device of the user account), or access to the user account via the recovery account, to provision the newly purchased mobile device as an inner device of the user account, and to revoke the temporary mobile device, thereby maintaining full control of all devices that have access to the user account.

If the attacker is able to overcome the local device protection relatively quickly, for example, before the user C is able to use to the laptop computing device 4502 (provisioned as an inner device of the user account), or access the user account via the recovery account, to revoke the stolen mobile device 4504, the attacker may use the mobile device 4504 to revoke the laptop computing device 4502 still held by user C. This may provide the attacker with full access and control of the user account. In this example, the attacker may then attempt to add a recovery account. However, one of the policies associated with the user account may require that a period of time Y have elapsed for engaging the recovery account. In this example, the attacker may have access to the account and may steal data, but the attacker may have to wait the predefined time period Y for the recovery account to become active. If, in this situation, user C is able to sign into the recovery account to access the user account before the period of time Y has elapsed, user C may use this access to revoke all other devices associated with the user account (i.e., added by the attacker), and may revoke the pending recovery account change. User C may also then revoke a borrowed device and/or provision a newly purchased device. At this point, user C has regained full control of the user account, although the attacker may have been able to steal some information.

User C Scenario 5—One of Three Inner Devices is Stolen

Figure 46:
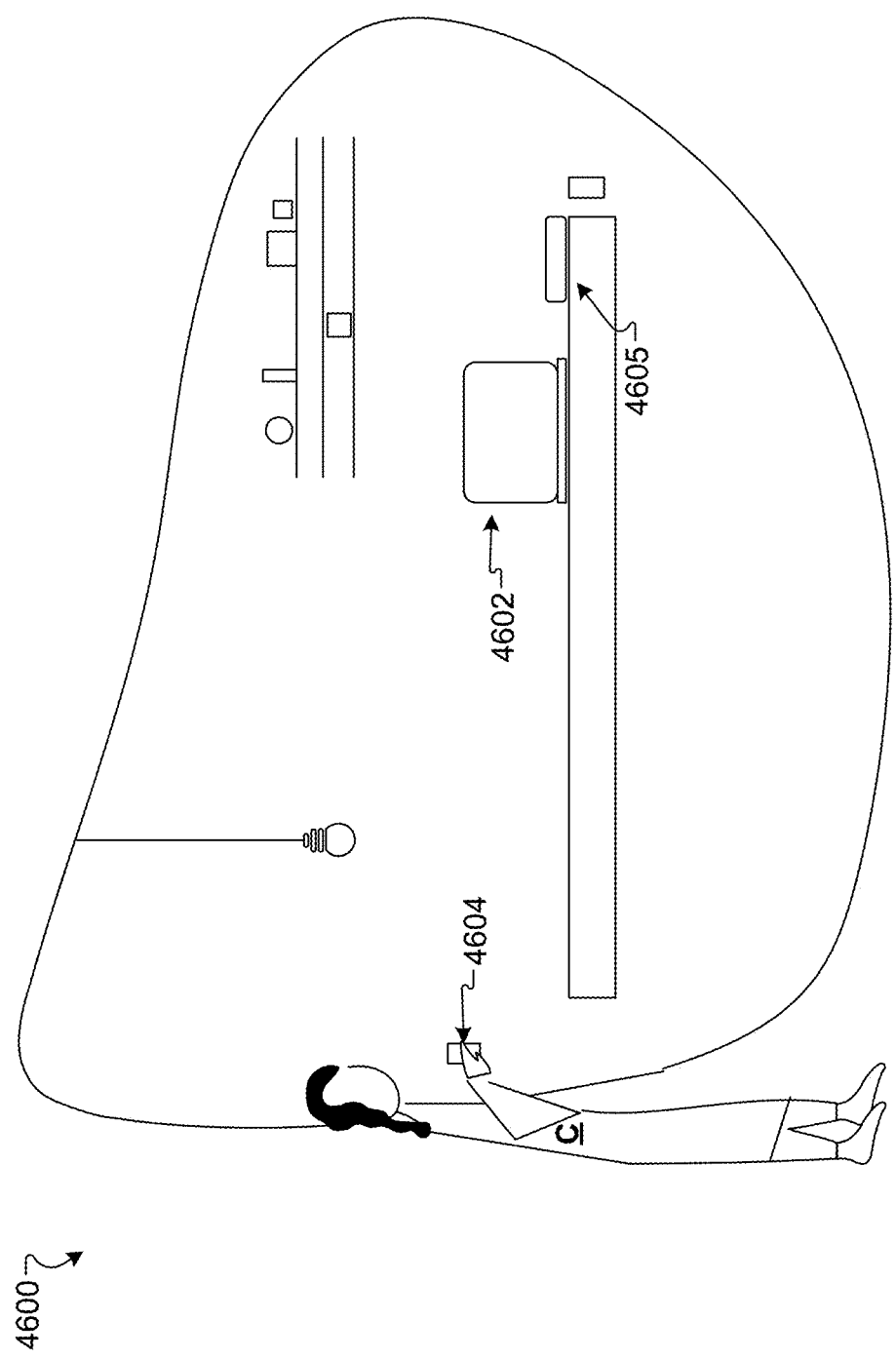

As shown in FIG. 46, a user C is shown in an environment 4600 with a number of electronic devices. For example, the user C may have three devices 4602, 4604 and 4605 configured to function with a user account operating as an SSI portable account, as described in detail above. The device 4602 represents a laptop device provisioned for the user account as an inner device. The device 4604 represents a mobile device provisioned for the user account as an inner device. The device 4605 represents a game console device provisioned for the user account as an inner device. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, user C loses the mobile device 4604. An attacker, for example, a local attacker, may gain access, for example, physical access, to the device 4604 and attempt to steal user information if the attacker finds the lost mobile device 4604. In this situation, the systems described herein may operate in accordance with a policy that allows a user in control of a majority of devices in the number of configured devices associated with a particular user account to defeat an attacker (or other user) that controls fewer devices associated with the same user account. In this example, the device 4604 may have a fingerprint scan, or passcode, or PIN configured as local device protection, as may be typical on mobile phone devices. However, if the attacker overcomes the local device protection, the user may still protect the lost device 4604. For example, because user C is still in control of the laptop computing device 4602 and the gaming console device 4605, which are each configured as inner devices of the user account, user C may take steps to protect the user account from being accessed by the attacker using the lost/stolen mobile device 4604.

If the attacker is unable to defeat the local device protection relatively quickly, user C may use the laptop device 4605 or the gaming console device 4605, or may sign into the recovery account to access the user account, to revoke the lost/stolen mobile device 4604. In addition, user C may purchase a new mobile device (to replace the lost/stolen mobile device 4604) and may provision the new mobile device with the user account using the laptop computing device 4602 or gaming console device 4605, or by signing into the recovery account to access the user account, to regain full control of all devices that have access to the user account.

In the event that the attacker is able to defeat the local device protection relatively quickly, for example, before user C is able to revoke the lost/stolen mobile device 4604, the attacker may attempt to control the user account. For example, the attacker may use the mobile device 4604 to revoke the laptop device 4602. In this example, the attacker may then attempt to add a recovery account. However, one of the policies associated with the user account may require that a period of time Y (for example, Y days) have elapsed before the recovery account may be engaged. The attacker may also attempt to add another device (e.g., a tablet device belonging to the attacker) to the user account. However, another policy associated with the user account may include disallowance of tenure of a new device until after a predefined time period W has elapsed corresponding to association of the new device with the user account. In this example, the attacker may have access to the account and may steal data, but the attacker cannot revoke the gaming console device 4605 retained by the user C. That is, policies associated with the user account may allow the attacker to revoke a first device (the laptop computing device 4602), but require that a period of time X have elapsed before another device (the gaming console device 4605) can also be revoked, because the attacker's device cannot gain tenure nor the associated abilities of an inner device of the user account without waiting the predefined time period W. Thus, the attacker will wait a time period W (for example, W days) for the newly added tablet to gain tenure, a time period X (for example, X days) for the lost/stolen mobile device 4602 to leave a rate limit, or a set period of elapsed time, associated with the ability to revoke devices (in particular the ability to revoke more than one device) from the user account, and a time period Y (for example, Y days) for the recovery account to become active. In general, W, X, and Y time periods may be in minutes, hours, days, months, etc. For example, W, X, and Y time periods may be configured by the user to be about 4 to about 15 days.

User C may sign into the recovery account to access the user account (for example, from a borrowed device or a newly purchased device) to revoke the lost/stolen mobile device 4602, to revoke a newly added device (i.e., newly added by the attacker), to (re)provision the laptop computing device 4602, to provision a newly purchased device (i.e., a mobile device newly purchased by user C), to revoke the recovery account action initiated by the attacker, and the like.

At some point, user C may return home and notice that mobile device 4604 is missing, and accordingly, may sign into the recovery account to access the user account or may use the console device 4605 to revoke any attacker devices that user C may determine to be associated with the user account. For example, messages may be broadcast to other devices associated with the user account when new devices are provisioned or attempted to be provisioned with the user account. A rate limit for revoking devices, or a time period for revoking devices, such as the device 4604 may not be met by user C because the mobile device 4604 is configured in this example as the sole device to have tenure. User C may then cancel a pending request to use the attacker's account for recovery. User C may also re-provision the laptop computing device 4602 by signing into the recovery account to access the user account or by using the console device 4605. User C may additionally purchase a new mobile device and provision the newly purchased mobile device by signing into the recovery account to access the user account or using laptop computing device 4602. Upon completion of the above steps, the user C may regain full control of the user account. However, the attacker may have accessed some of the data associated with the user account.

User C Scenario 6—an Outer Device is Stolen

Figure 47:
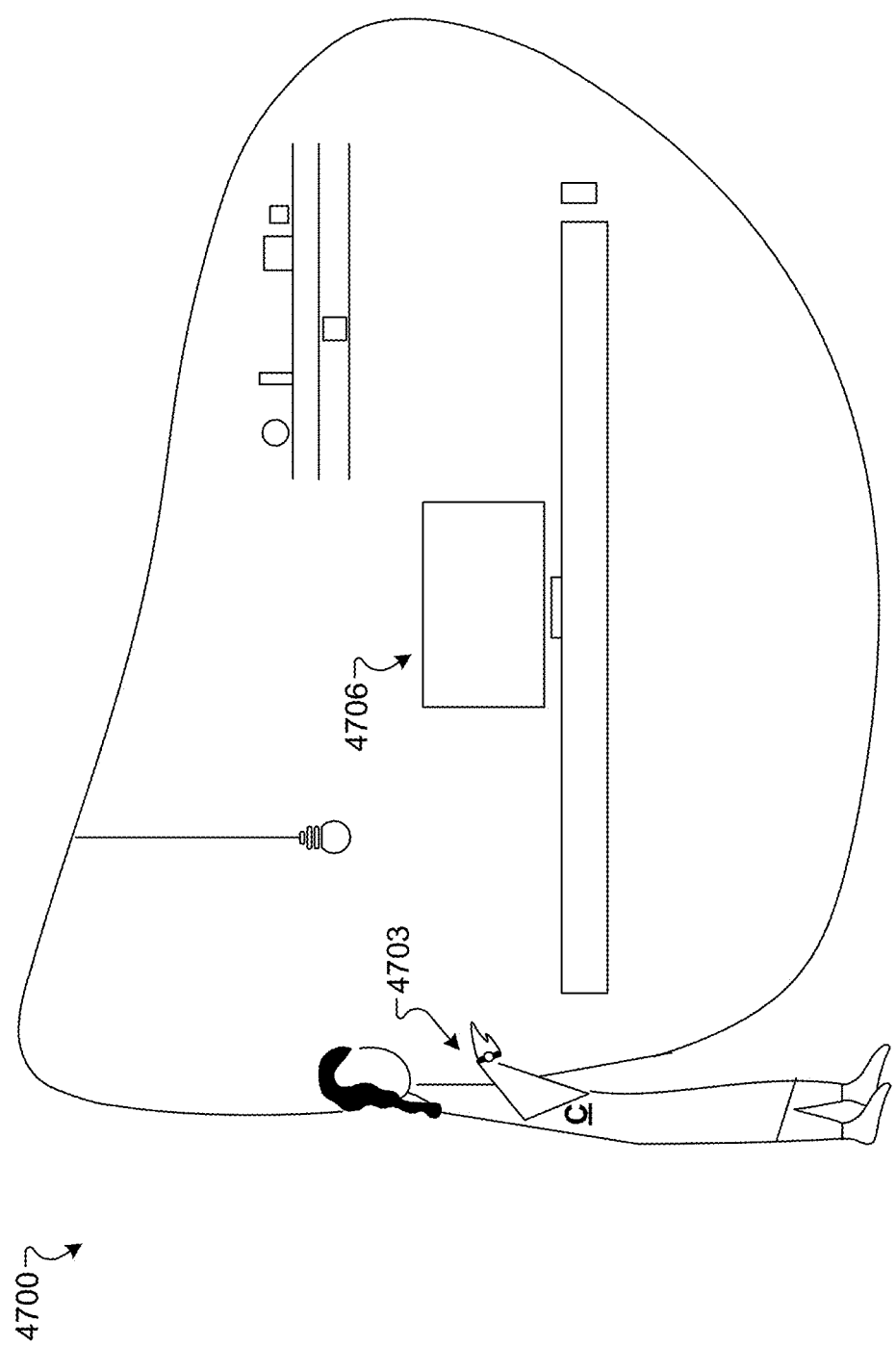

As shown in FIG. 47, a user C is shown in an environment 4700 with a number of electronic devices. For example, the user C may have a device 4703 and a device 4706, each configured to function with a user account operating as an SSI portable account, as described in detail above. In this example, the device 4703 represents a wrist worn device provisioned for the user account as an inner device. The device 4706 represents a television device provisioned for the user account as an outer device. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, the device 4706 is removed from the environment 4700, or stolen, while user C is outside of the environment 4700. An attacker, for example, a local attacker, may gain access, for example, physical access, to the stolen device 4706, and may attempt to steal user information using the stolen device 4706. In this example, the device 4706 may include local device protection for accessing the functionality of the device 4706, such as a passcode, or a PIN, or a facial image.

If the attacker is unable to defeat the local device protection relatively quickly, the attacker may still be able to use the device 4706 (for example, to watch television programming using the device 4706). However, the attacker cannot access information within the user account without defeating the local device protection.

If the attacker is able to defeat the local device protection relatively quickly, the attacker may use the device 4706 to access some information, for example, a subset of information, held in the user account, in accordance with policies associated with the device 4706 provisioned as an outer device of the user account. However, even if the attacker defeats the local device protection and gains (partial) access to the user account, the attacker cannot use the stolen device 4706 (provisioned as an outer device) to revoke the wrist worn device 4703 (provisioned as an inner device). That is, policies associated with the user account limit the capabilities of outer devices such as the device 4706.

At some point, user C may return to the environment 4700 and notice that device 4706 is missing, and accordingly, may use the wrist worn device 4703 (provisioned as an inner device), or may sign into the recovery account to access the user account, to revoke the stolen device 4706. In addition, the user C may purchase a new television (to replace the stolen device 4706) and may use the wrist worn device 4703, or may sign into the recovery account to access the user account, to provision the new television device. At this point, user C has regained full control of all devices that have access to the user account, although the attacker may have accessed some of the data from the user account.

User C Scenario 7—a New Malicious Inner Device is Added

Figure 48:
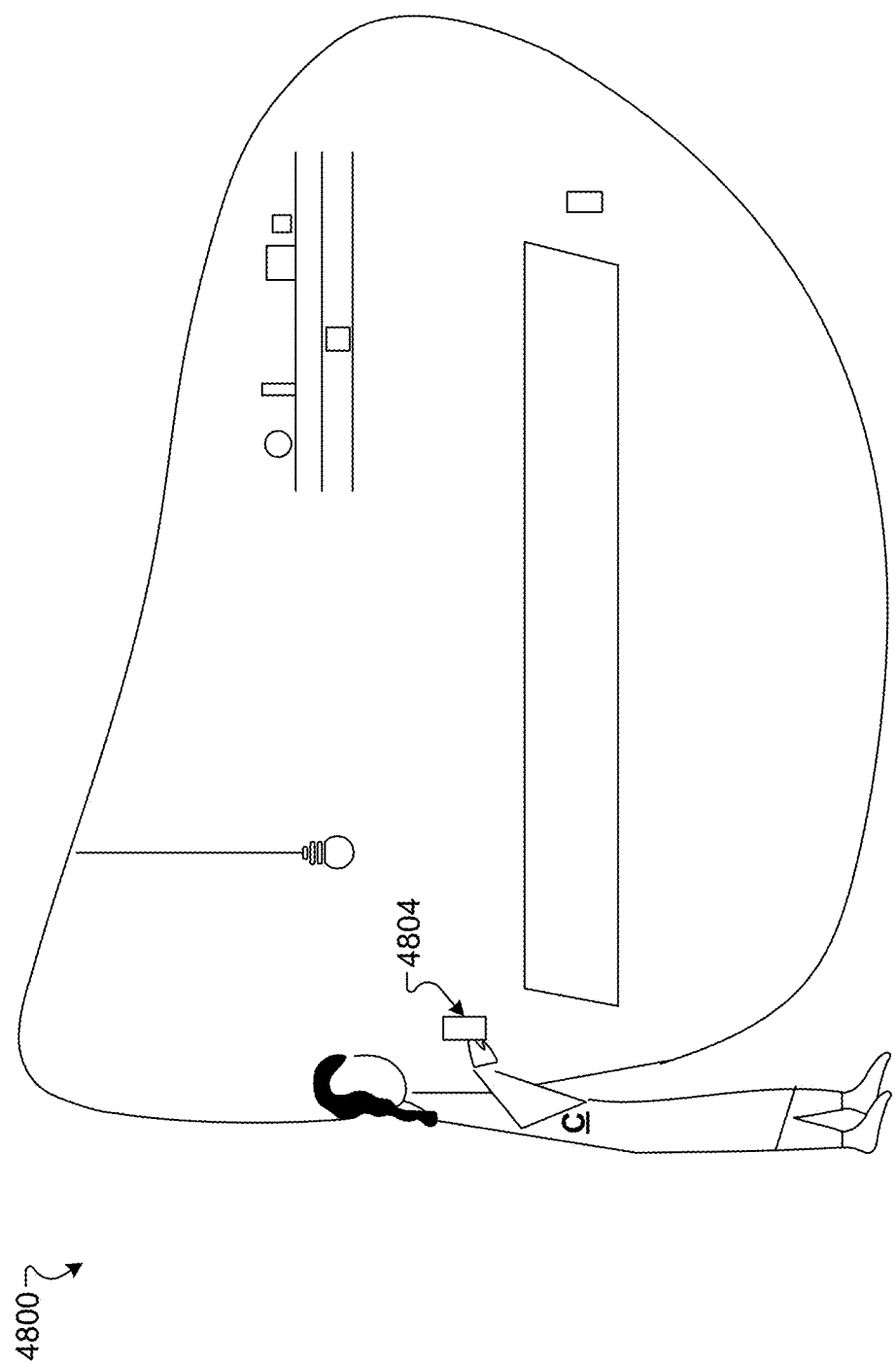

As shown in FIG. 48, a user C is shown in an environment 4800. In this example, user C has a device 4804 configured to function with a user account operating as an SSI portable account, as described in detail above. In this example, the device 4804 represents a mobile device provisioned for the user account as an inner device. In this example, the device 4804 represents the sole device associated with, or operational within, the user account of user C. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, user C lends the mobile device 4804 to another user. Before lending the mobile device 4804 to the other user, user C enters the information used to overcome the local device protection resident on the mobile device 4804, and unlocks access to the mobile device 4804 (which is provisioned as the sole inner device associated with the user account). Because the mobile device 4804 is provisioned as an inner device, unlocking of the mobile device 4804 by user C in this manner (for temporary use by the other user) provides the other user with temporary, but full, access to all of the user account information, and full functionality and control of the user account. Unknown to user C, the other user is a local attacker, who now has physical access to the mobile device 4804 of user C, and temporary, but full, access to all of the user account information, and full functionality and control of the user account.

While using the mobile device 4804 of user C, the attacker uses the access provided by the mobile device 4804 to surreptitiously add another device (i.e., a device belonging to the attacker) as an inner device associated with the user account. The attacker then returns the mobile device 4804 to user C. User C is not yet aware that the attacker has added the attacker device to the user account as an inner device. In this situation the attacker now has access to the information in the user account, and can steal data from the user account. However, the attacker cannot use the attacker device (newly added as an inner device) to revoke the mobile device 4804, as the attacker device has not been associated with the user account as an inner device for greater than the period of time W, and thus does not yet have tenure. Rather, the attacker device cannot gain tenure nor the associated full capabilities of an inner device of the user account without waiting the predefined time period W for tenure.

Similarly, without tenure, the attacker cannot use the newly added attacker device to add a new device, to add a recovery account and the like.

At some point, user C may notice that a new device (the attacker device) has been added to the user account, and may use the (tenured) mobile device 4804, or may sign into the recovery account to access the user account, to revoke the attacker device. For example, messages may be broadcast to other devices associated with the user account (in this case, the mobile device 4804, which is the sole device associated with the user account) when new devices are provisioned or attempted to be provisioned with the user account. The user C may use the mobile device 4804 to revoke the attacker device, or may sign into the recovery account to access the user account and revoke the attacker device.

Upon completion of the above steps, the user 48 may regain full control of the user account. However, the attacker may have accessed some of the data associated with the user account.

User C Scenario 8—Lose Local Authentication Factor

Figure 49:
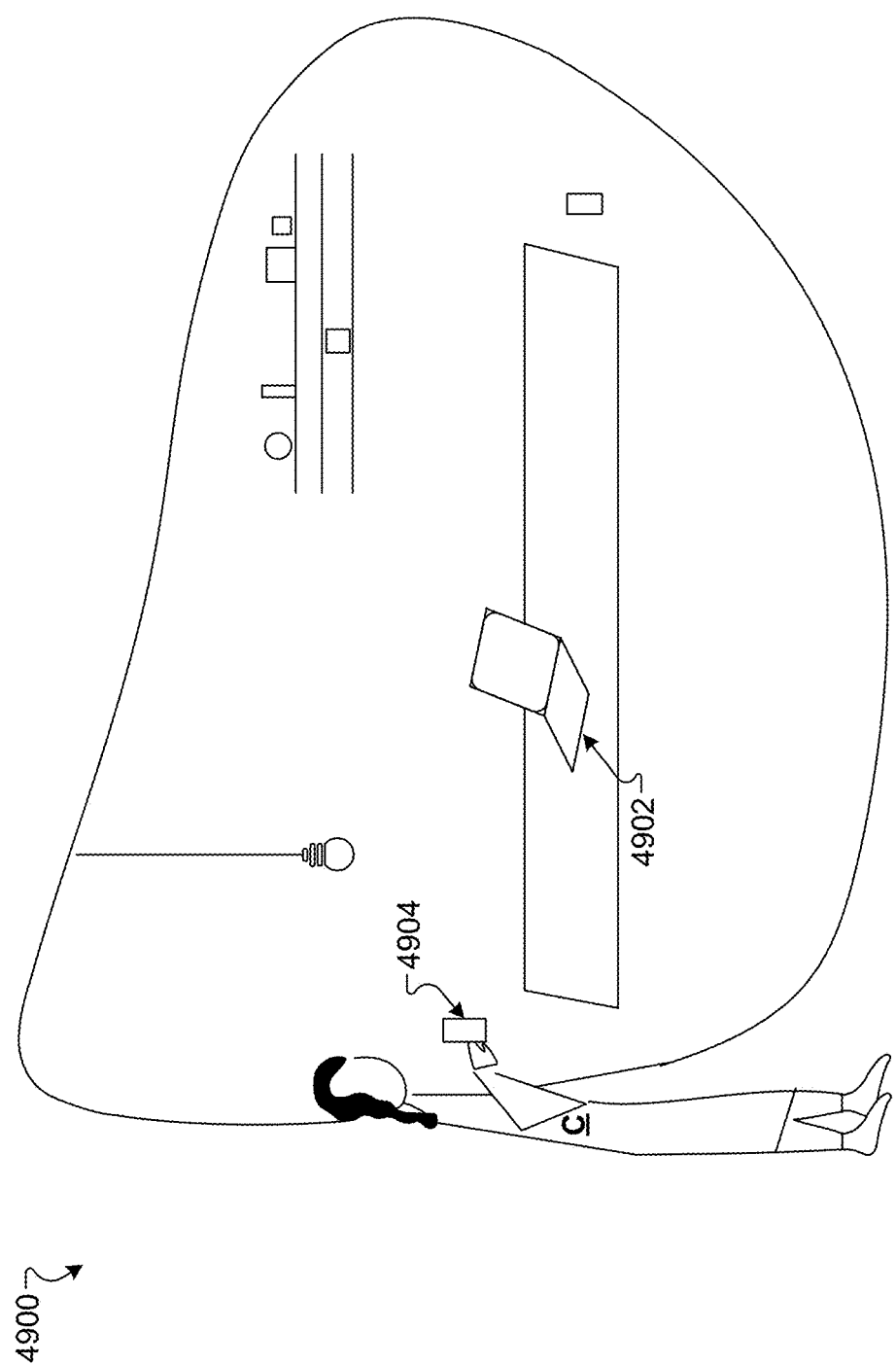

As shown in FIG. 49, a user C is shown in an environment 4900. In this example, user C has a device 4902 and a device 4904, each configured to function with a user account operating as an SSI portable account, as described in detail above. In this example, the device 4902 represents a mobile device provisioned for the user account as an inner device, and the device 4904 represents a laptop computing device provisioned for the user account as an inner device. In this example, the device 4902 and the device 4904 each include local device protection, in the form of a strong random passcode, for accessing the functionality of the respective device 4902, 4904, and for accessing the user account. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, user C is in a situation in which the device 4902 and the device 4904 are not used by the user C for a somewhat extended period of time, such as, for example, a period in which user C travels without the devices 4902, 4904, and/or a period of travel during which connectivity is not readily available. Upon returning, user C has forgotten the strong random passcode associated with the devices 4902, 4904. In this example, the devices 4902, 4904 are the devices associated with the user account, and the user account would typically be inaccessible through the devices 4902, 4904 without the (forgotten) strong random passcode.

In some situations, the user-controlled recovery factor may be a passcode, or a PIN. In some situations, policies associated with the user account may allow the user to provide other types of authentication as the user-controlled recovery factor such as, for example, known physical network locations combined with knowledge/challenge questions and the like.

User C can sign into the recovery account to access the user account, to (re)provision the user account with the devices 4902, 4904, and to regain full access to and control of the user account. If user C cannot remember the sign in credentials associated with the recovery account, user C may sign into the recovery account using known physical network locations combined with knowledge/challenge questions and the like, to regain full access to and control of the user account.

User C Scenario 9—One of Three Inner Devices is Hacked

Figure 50:
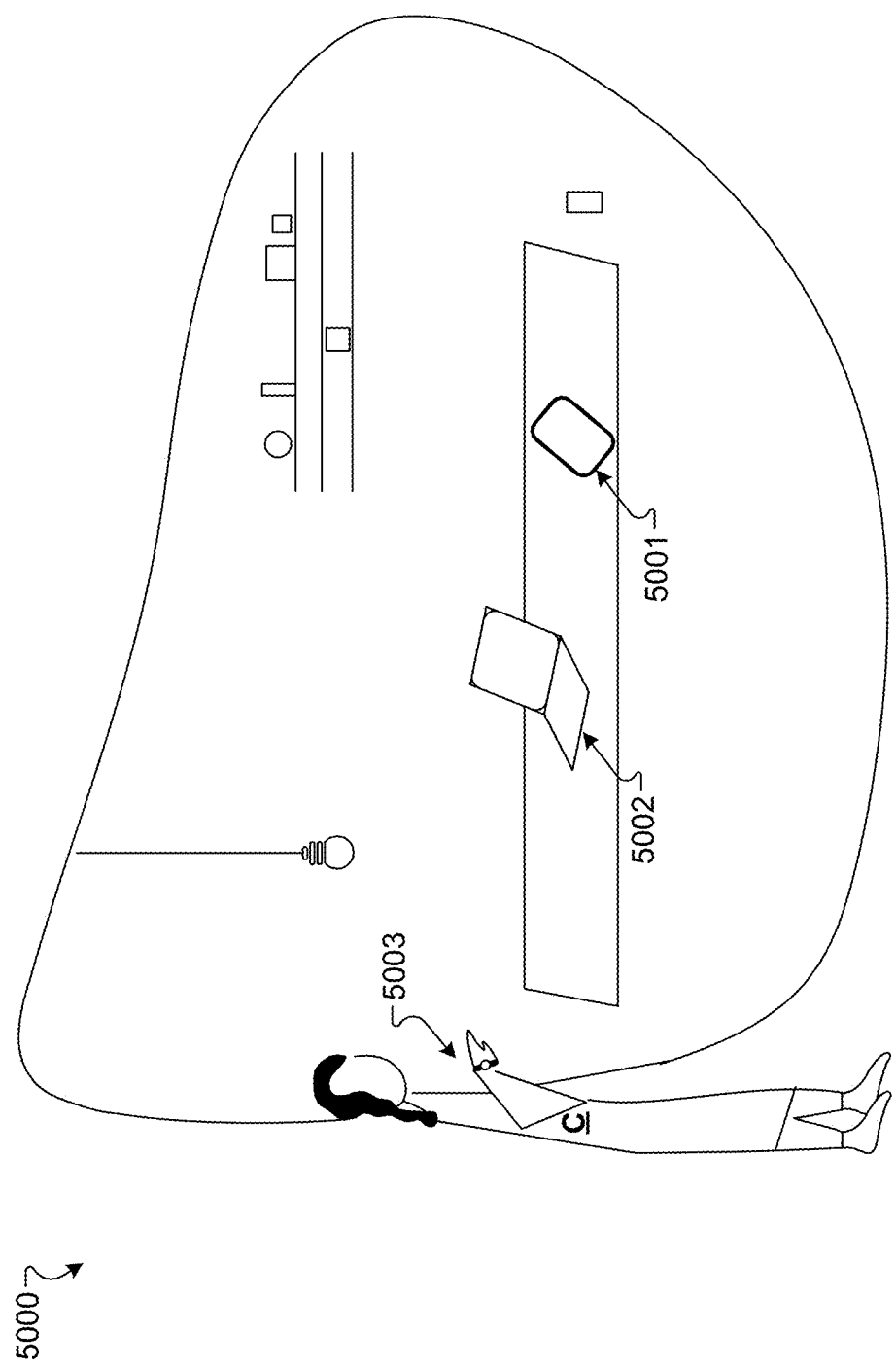

As shown in FIG. 50, a user C is shown in an environment 5000. In this example, user C has a device 5001, a device 5002 and a device 5003, each configured to function with a user account operating as an SSI portable account, as described in detail above. In this example, the device 5001 represents a tablet computing device provisioned for the user account as an inner device. The device 5002 represents a mobile device provisioned for the user account as an inner device. The device 5003 represents a wrist worn device provisioned for the user account as an inner device. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

In some situations, a remote attacker, or a network attacker, may discover a vulnerability in one, or more, of the devices 5001, 5002, 5003 associated with the user account of user C. Depending on the individual ability of the network attacker, and the security provisions associated with the user account, the network attacker may be able to provision new devices, even remotely, and without physical access to one of the inner devices 5001, 5002, 5003 associated with the user account. Similarly, the network attacker may be able to use the remotely provisioned device to remotely revoke existing devices, without physical access to one of the inner devices 5001, 5002, 5003 associated with the user account. In some situations, the network attacker may be able to remotely circumvent existing protocols regarding the tenure period W for the remotely provisioned device, and/or the rate limiting period X for revoking inner device(s), and/or the period of time Y for a (new) recovery account and/or credentials to become active. In these types of situations, the network attacker has access to the user account, and can steal information from the user account. User C may sign into the recovery account to access the user account, to revoke devices added to the user account without the consent of user C, and the like, to regain full access and control of the user account. However, in some situations, even the recovery account may be vulnerable to this type of attacker.

User C Scenario 10—Quickly Erase Data

Figure 51:
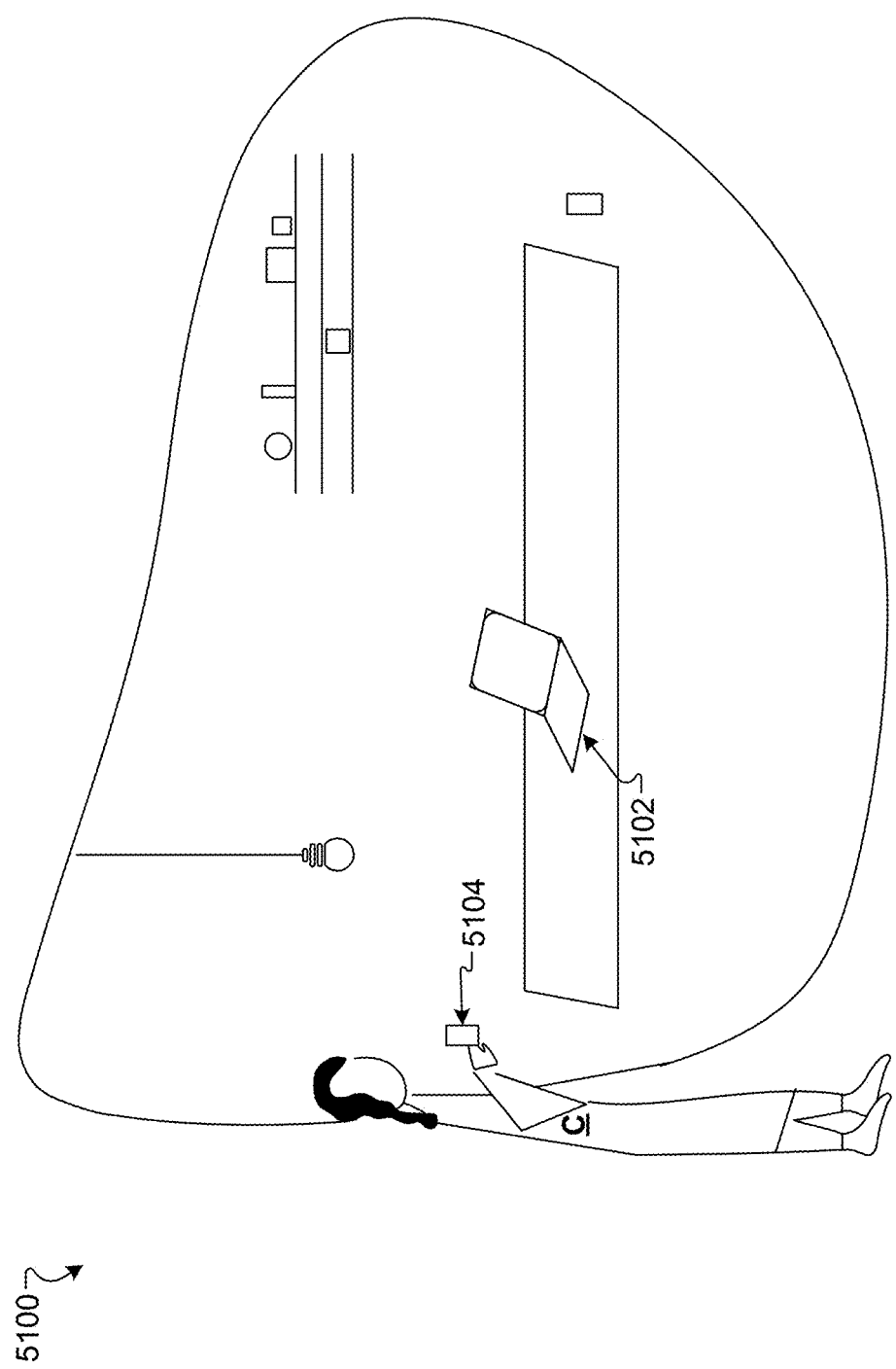

As shown in FIG. 51, a user C is shown in an environment 5100. In this example, user C has a device 5102 and a device 5104, each configured to function with a user account operating as an SSI portable account, as described in detail above. In this example, the device 5102 represents a mobile device provisioned for the user account as an inner device, and the device 5104 represents a laptop computing device provisioned for the user account as an inner device. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

User C may have information and data stored in association with the device(s) 5102, 5104 and with the user account. At some point in time, user C may want to permanently delete some, or all, of the information and data, so that the information and data is no longer available, for example, to an outside party. The user C may attempt to delete the user account, so that the information and data is no longer available. However, in accordance with policies associated with the user account, a period of time Z (for example, Z days) may be associated with the ability to delete a user account. Thus, user C may have to wait for the period of time Z to have elapsed before the account may be deleted. In some situations, user C may wish for the information and data to be unavailable before the period of time Z has elapsed, for example, substantially immediately. In this situation, user C may use one of the inner devices 5102, 5104 to revoke both of the inner devices 5102, 5104. User C may have to wait a period of time X (for example, X days) for the revocation of both of the inner devices 5102, 5104 to take effect. By revoking both of the inner devices 5102, 5104, the user account is now permanently inaccessible via either of the devices 5102, 5104, either by the user C or by an outside party, after the period of time X. Similarly, user C may terminate the recovery account, so that the user account and information/data held therein, is no longer available. However, this change in recovery account will not take effect until after the period of time Y has elapsed. Accordingly, until the periods of time X, Y and Z have elapsed, the information and data held in the user account will remain available and accessible through the recovery account provider.

User C Scenario 11—User Becomes Incapacitated

Figure 52:
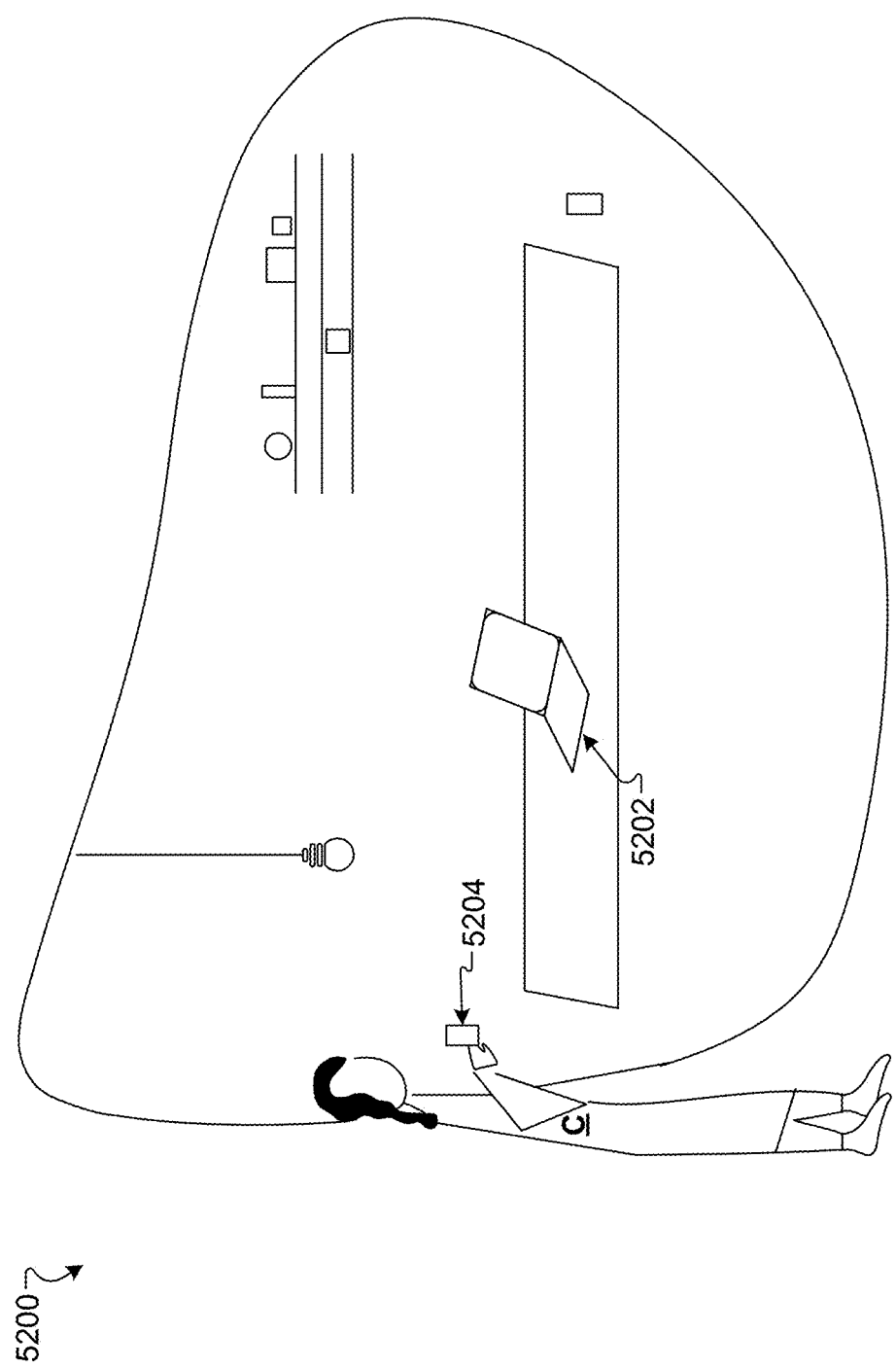

As shown in FIG. 52, a user C is shown in an environment 5200. In this example, user C has a device 5202 and a device 5204, each configured to function with a user account operating as an SSI portable account, as described in detail above. In this example, the device 5202 represents a mobile device provisioned for the user account as an inner device, and the device 5204 represents a laptop computing device provisioned for the user account as an inner device. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor In some situations, user accounts may include provisions for a legacy recovery account, or a specialized recovery account, to be invoked in the event the primary user becomes incapacitated (e.g., or passes away).

At some point in time, user C becomes incapacitated. In some situations, user C may wish for another entity (i.e., family/friends) to have access to the user account in the event user C becomes incapacitated. In this situation, user C may leave instructions on how to locate the login credentials for the recovery account that will provide access to the user account. The instructions may be left with, for example, a trusted third party, within written legal instructions executable in the event of incapacitation, and the like. The other entity (family/friends) may use the login credentials for the recovery account to access the user account, and provision the user account for a new device (for example, a new device owned by the other entity). This may allow for the other entity to gain access to the user account, as intended by user C.

In some situations, user C may wish for another entity (i.e., family/friends) to have access to the user account in the event user C becomes incapacitated, and provides credentials in the form of, for example, a security key, to unlock one of the (inner) devices 5202, 5204 associated with the user account, to be delivered to the other entity by a trusted third party in the event of incapacitation. In this situation, the other entity may use the security key to unlock one of the devices 5202, 5204, and gain access to the user account, as intended by the user C.

In some situations, user C may wish for another entity (i.e., family/friends) to have access to some, or all of the information in the user account in the event user C becomes incapacitated. To enable this, user C establishes a shared user account, and leaves account access credentials with a trusted third party, to be provided to the other entity in the event of incapacitation. In this situation, the other entity may use the account access credentials to access the shared user account, and to access the information included in the shared user account, as intended by the user C.

In some situations, the user C may wish for another entity (i.e., family/friends) to have access to the user account in the event user C becomes incapacitated. To enable this, user C may add a specialized recovery account, that will allow for provisioning of a new device from a single use code, for example, a single use two-dimensional bar code (for example, a quick response (QR) code), which may be provided to the other entity by a trusted third party. The other entity may use the single use code to provision the user account on a new device, to gain access to the user account, as intended by the user C.

In some situations, user C may wish for another entity (i.e., family, friends) to have access to the user account in the event user C becomes incapacitated, but user C does not make provisions for providing for this access via, for example, one of the means described above. In some situations, the user account of user C may still be made available to the other entity through access to the recovery account, even though user C did not proactively make provisions to provide others with access to the user account.

User C Scenario 12—Lose Recovery Provider Account

Figure 53:
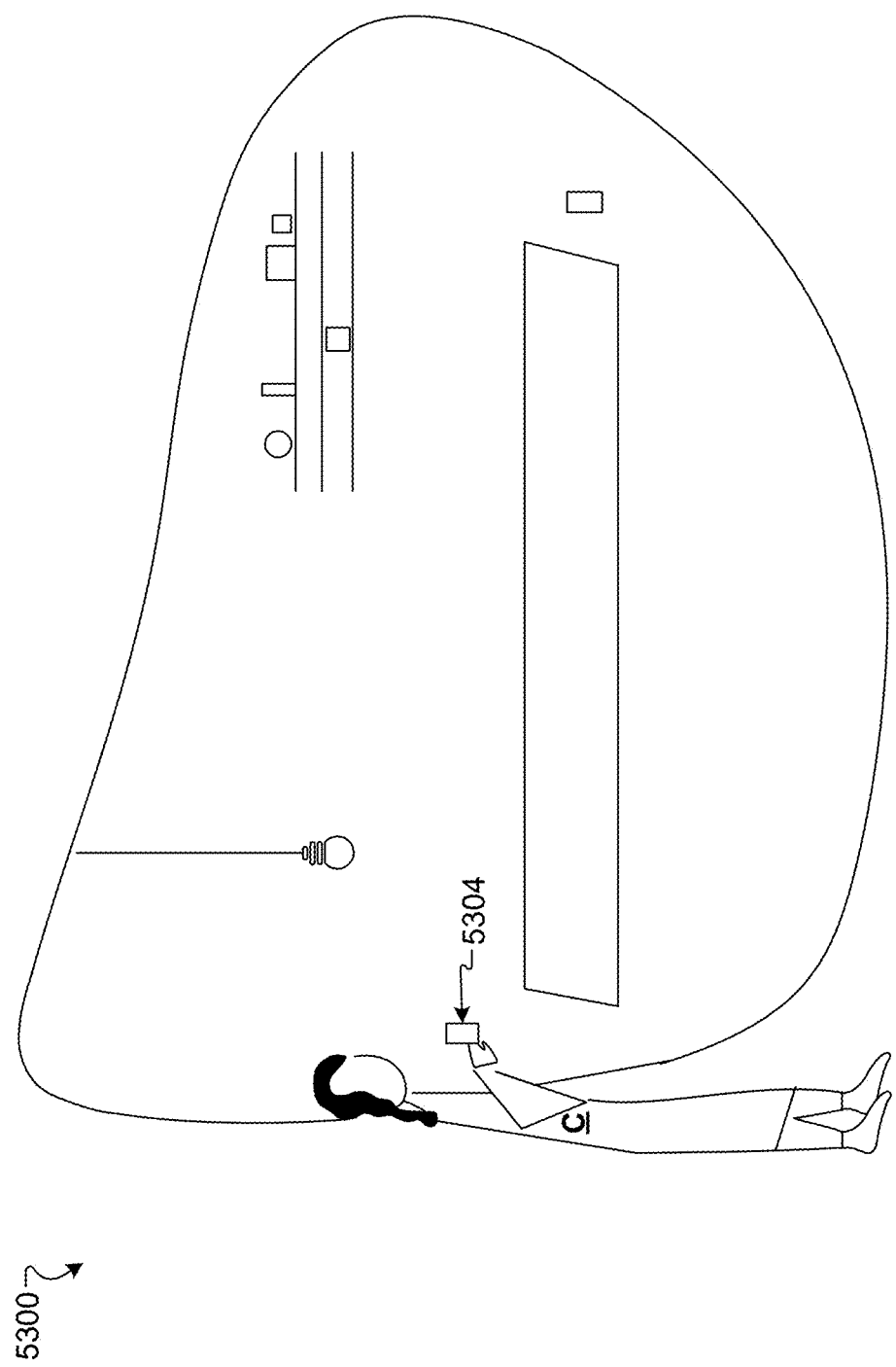

As shown in FIG. 53, a user C is shown in an environment 5300. In this example, user C has a device 5304 configured to function with a user account operating as an SSI portable account, as described in detail above. In this example, the device 5304 represents a mobile device provisioned for the user account as an inner device. In this example, the device 5304 represents the sole device associated with, or operational within, the user account of user C. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point, the recovery account associated with the user account of user C is terminated, for example, by the hosting provider of the recovery account, due to, for example, use or operation outside of the confines of an original use agreement or the like. In this situation, user C maintains access to the user account through the device 5304. However, without an accessible recovery account, the user account may become compromised should the device 5304 become inoperable or unavailable. To ensure a recovery account will be available in the event it is requested, user C may attempt to add a (new) recovery account, for example, with a new hosting provider. However, one of the policies associated with the user account may require that a period of time Y (for example, Y days) have elapsed before the recovery account may be engaged. In this example, user C may maintain access and control of the user account but will have to wait a time period Y (for example, Y days) for the new recovery account to become active.

User C Scenario 13—Recovery Provider Account is Hacked

Figure 54:
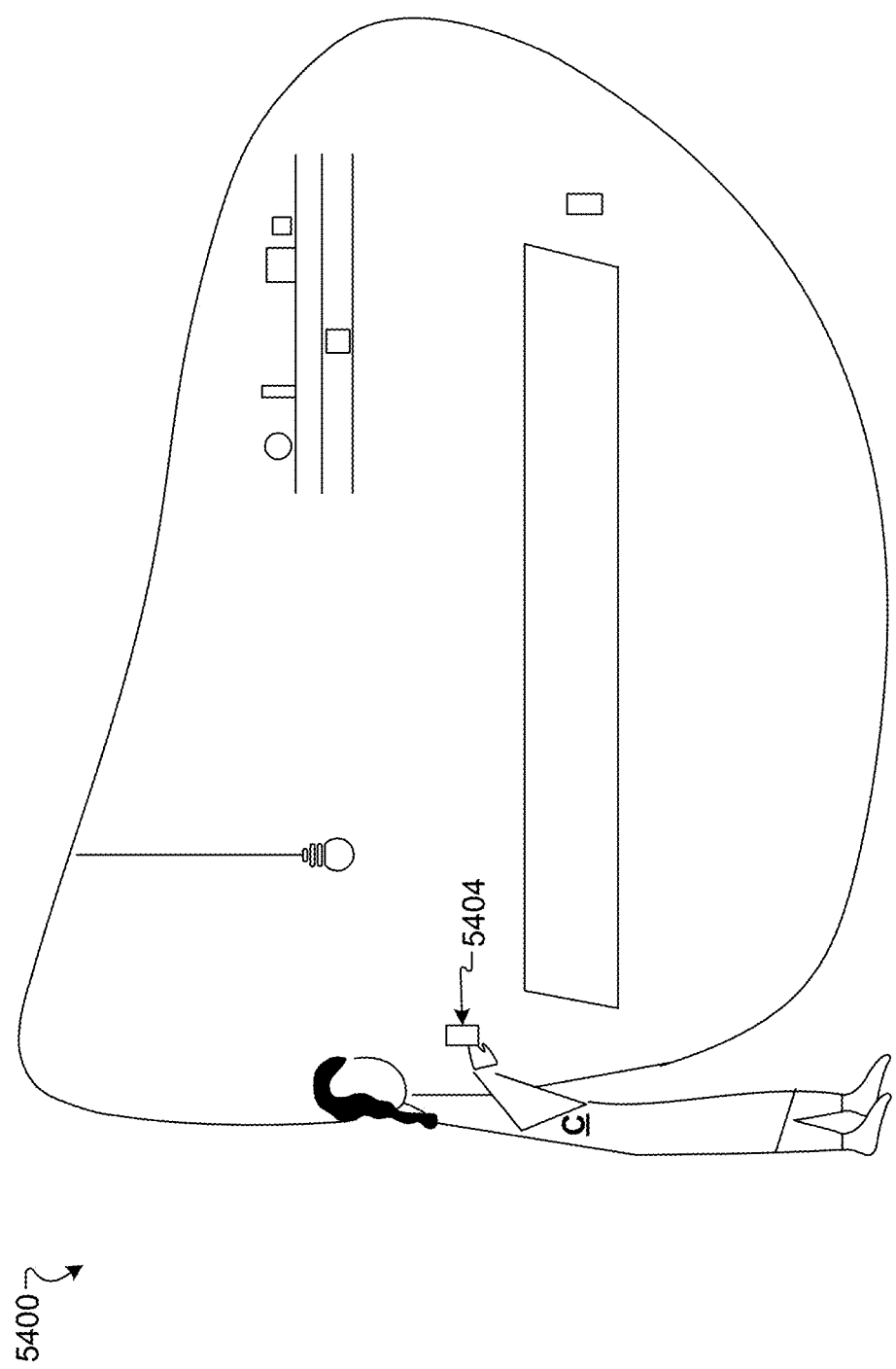

As shown in FIG. 54, a user C is shown in an environment 5400. In this example, user C has a device 5404 configured to function with a user account operating as an SSI portable account, as described in detail above. In this example, the device 5404 represents a mobile device provisioned for the user account as an inner device. In this example, the device 5404 represents the sole device associated with, or operational within, the user account of user C. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, a remote attacker, or a network attacker, steals login credentials, or defeats an account access inquiry, for the recovery account associated with the user account of user C and gains access to the recovery account. From the recovery account, the attacker may provision a new device (i.e., a device owned by the attacker), and may revoke the devices of user C (i.e., the mobile device 5404, in this example). At this point, the attacker has control of both the recovery account and the user account, and can steal information. The attacker may also attempt to terminate the existing recovery account of user C, and to add a new recovery account that is not accessible to the user C. However, one of the policies associated with the user account may require that a period of time Y (for example, Y days) have elapsed before these types of changes to the recovery account may take effect. The attacker may also attempt to terminate the user account, to eliminate access to the user account by user C. However, another policy associated with the user account may require that a period of time Z (for example, Z days) have elapsed before deletion of a user account may take effect.

If user C is able to verify rightful ownership of the recovery account before the periods of time Y and/or Z have elapsed (and the new recovery account replaces the original recovery account and/or the original user account is terminated), user C may then access the (original) recovery account, re-provision the mobile device 5404, and revoke all other devices that have been added by the attacker. The user C may also cancel the pending user account termination, and the pending recovery account removal/replacement. At this point, user C has regained full access to and control of the user account and the recovery account, although the attacker may have stolen some information.

If user C is not able to verify rightful ownership of the recovery account before the periods of time Y and/or Z have elapsed (and the new recovery account replaces the original recovery account and/or the original user account is terminated), the attacker gains permanent access to the user account (if it is not terminated) and the new recovery account.

Figure 55:
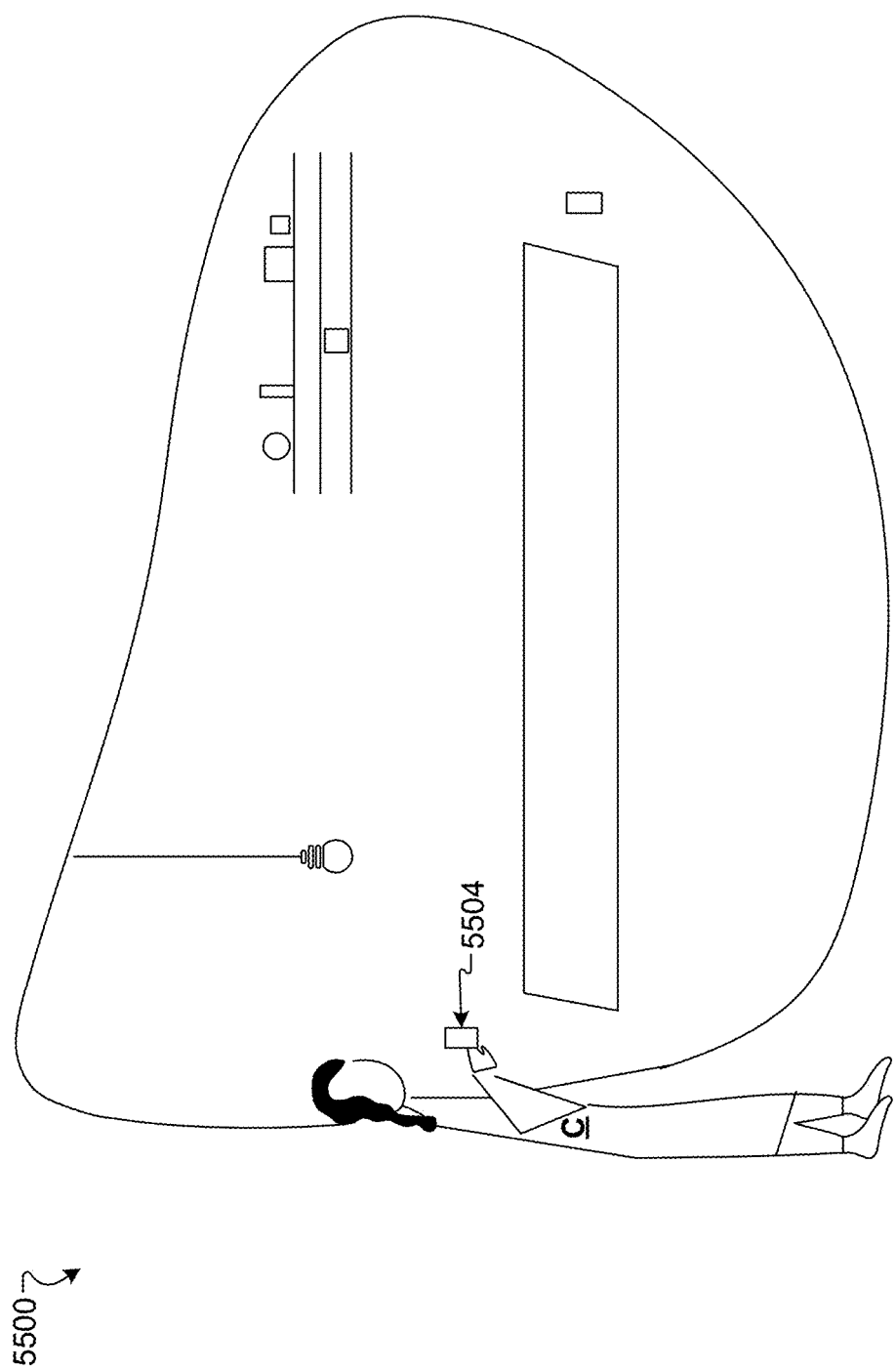

User C Scenario 14—Recovery Provider Account is Externally Compromised or Compelled As shown in FIG. 55, a user C is shown in an environment 5500. In this example, user C has a device 5504 configured to function with a user account operating as an SSI portable account, as described in detail above. In this example, the device 5504 represents a mobile device provisioned for the user account as an inner device. In this example, the device 5504 represents the sole device associated with, or operational within, the user account of user C. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, external requirements dictate that the recovery provider provide access to information held in the recovery accounts of a designated set of users, including user C. The recovery provider complies with the external requirements, and this lets the entities dictating the external requirements provision an external device on the user account of user C for access by outside entities. At some point, user C is notified of the provisioning of the external device for access by outside entities, and revokes the newly provisioned external device, and takes action to terminate the recovery account (with an associated wait period Y for the termination of the recovery account to take effect). In response, the external entity requires that the recovery provider revoke the device 5504, revoke access to the recovery account by user C, and provision another external device on the user account, for access by outside entities. As the recovery provider was required to comply with the external requirements set forth by the outside entity, user C no longer has access to the recovery account or the user account, and the outside entity has gained full access to, and full control of, the user account.

User C Scenario 15—Recovery Provider Account is Internally Compromised

Figure 56:
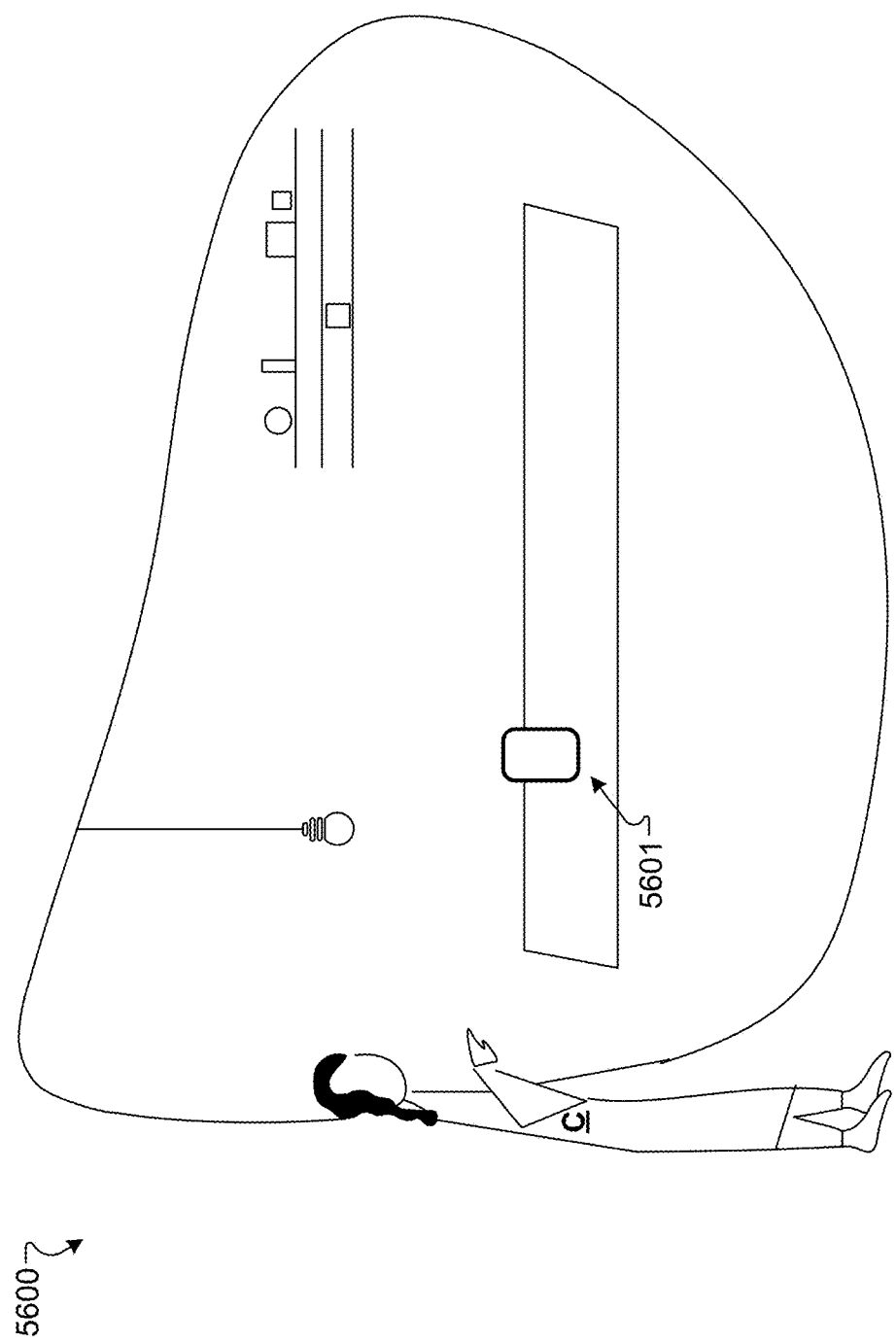

As shown in FIG. 56, a user C is shown in an environment 5600. In this example, user C has a device 5601 configured to function with a user account operating as an SSI portable account, as described in detail above. In this example, the device 5601 represents a tablet device provisioned for the user account as an inner device. In this example, the device 5601 represents the sole device associated with, or operational within, the user account of user C. A recovery account is configured for the user account of user C. In this example, the recovery account is administered by an outside recovery service. The entity controlling the recovery account (i.e., the user C and/or the outside recovery service) can also control the user account. Access to the recovery account does not rely on any type of user-controlled recovery factor.

At some point in time, an attacker within the recovery provider hosting the recovery account associated with the user account of user C steals credentials that grants account access to the recovery account associated with the user account of user C. The remote attacker uses this access to provision a device on the user account. At some point, user C is notified that a new (non-authorized) device has been provisioned. User C revokes the unauthorized device, for example, using the device 5601 or through the recovery account. User C also takes action to terminate the existing recovery account and add a new recovery account. Until the period of time Y has elapsed and the change in recovery account takes effect, the attacker still retains access to the user account and can provision and revoke devices. After the period of time Y has elapsed, the original recovery account becomes inactive, and the new recovery account is terminated. At this point, user C has regained full access to, and control of, the user account.

In summary, User A (with no configured recovery account) is immune to attacks involving powerful actors against a recovery provider but there are a range of common situations where User A can lose access to the portable user account or a local attacker can gain access. In contrast, User C (with a recovery account that does not use a user controlled factor) is safe in the majority of common loss and local attack scenarios, but gains a vulnerability to compromise by powerful attacks against a recovery provider. User B (with a recovery account that uses a user controlled factor) has some of the strengths and weaknesses of both. User B is resilient to attacks via the recovery provider but can still lose the account in loss and local attack scenarios if user B cannot remember or find the user-controlled factor.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, a computer-implemented method is described for providing decentralized access to a user account. The method may include generating, by an electronic device, a public key and a private key for the user account. The user account may be associated with the electronic device. The method may also include generating, by the electronic device, a first inner account block of a blockchain for the user account where the first inner account block including an identifier for the user account, the public key for the user account, encrypted data for the user account, and a signature over the contents of the first inner account block using the private key for the user account on the electronic device. The method may also include generating a second inner account block of the blockchain where the second inner account block includes a list of electronic devices with access to the user account or access to encrypted user account data. The second inner account block may be an updated from the first inner account block and signed by the private key for the user account. The method may further include providing using the identifier associated with the user account the blockchain to a plurality of other devices and controlling access to the user account based on portions of the blockchain.

Implementations may include any or all of the following aspects. In response to verifying that a second device, configured as an outer device and requesting account access, is listed in a most recent inner account block for the user account, the method may include providing, using the identifier associated with the user account, the blockchain to a plurality of other devices and controlling access to the user account based on portions of the blockchain. In some implementations, the method may include generating a second outer account block of the blockchain, the second outer account block including a different list of outer entities with access to the user account, the second outer account block being signed by the private key for the user account on a third device.

In some implementations, the method may include verifying that the second outer account block is signed by the private key for the user account on the third device, providing, using the identifier associated with the user account, the blockchain to a plurality of other devices, and controlling access to the user account based on portions of the blockchain.

In some implementations, the electronic device represents an inner entity that is configured to enable a plurality of additional devices to access the user account based on matching portions of a last generated block for the user account in the blockchain, the electronic device represents an inner entity that is configured to revoke access to any device associated with the user account, and the outer entity is configured to revoke access for itself. In some implementations, controlling access to the user account based on portions of the blockchain includes controlling access to a distributed storage service for the electronic device. In some implementations, controlling access to the user account based on portions of the blockchain includes controlling access to user-configured account data. In some implementations, controlling access to the user account based on portions of the blockchain includes controlling access to a distributed storage service for the electronic device and controlling access to a device name associated with the electronic device when the electronic device is configured as an inner entity.

In some implementations, the user account is a digital account for accessing a plurality of services and the user account is associated with a user identity and one or more user-defined personas where each persona is configured to access applications, user account data, and different services in the plurality of services.

In some implementations, the first inner account block further includes an inner entity revocation time that represents a last known timestamp in which the electronic device performed a revocation of itself or another device.

In some implementations, the electronic device is an inner entity, and in response to determining that the inner entity has been provisioned to access the user account beyond a threshold number of days, the method may include generating a tenured status for the inner entity and enabling devices with the tenured status to delete other tenured devices with a time delay policy, the time delay policy indicating a wait time before revocation of access to the user account.

In a second general aspect, a non-transitory computer-readable medium is described and includes at least one processor and a memory storing instructions that, when executed by the at least one processor, cause the at least one processor to perform operations that include generating, by an electronic device, a public key and a private key for a user account associated with the electronic device, generating, by the electronic device, a first inner account portion for the user account. The first inner account portion may include an identifier for the user account, the public key for the user account, encrypted data for the user account, and a signature over contents of the first inner account portion using the private key for the user account on the electronic device. The instructions may further include generating a second inner account portion, the second inner account portion being signed by the private key for the user account and including a list of electronic devices with access to the user account or access to encrypted user account data, providing, using the identifier associated with the user account, the first inner account portion and the second inner account portion to a plurality of other devices, and controlling access to the user account based on the first inner account portion and the second inner account portion.

Implementations may include any or all of the following aspects. In response to verifying that a second device, configured as an outer entity and requesting account access, has user consent to access the user account, generating a first outer account portion, the first outer account portion including the identifier for the user account, a public key verified to be generated by the second device, encrypted data for the user account, and a signature over the contents of the first outer account portion using a private key for the user account on the second device, providing, using the identifier associated with the user account, the most recent inner account portion and the first outer account portion to a plurality of other devices, and controlling access to the user account based on the most recent inner account portion and the first outer account portion.

In some implementations, the instructions further include generating a second outer account portion, the second outer account portion including a different list of outer entities with access to the user account or access to different encrypted user account data, the second outer account portion being signed by the private key for the user account on a third device, verifying that the second outer account portion is signed by the private key for the user account on the third device, and controlling access to the user account based on portions of the verifying of the second outer account portion being signed by the private key.

In some implementations, the electronic device represents an inner entity that is configured to enable a plurality of additional devices to access the user account based on matching portions of a last generated portion for the user account, the electronic device represents an inner entity that is configured to revoke access to any device associated with the user account, and the outer entity is configured to revoke access for itself.

In some implementations, controlling access to the user account includes controlling access to a distributed storage service for the electronic device and controlling access to a device name associated with the electronic device. In some implementations, the user account is a digital account for accessing a plurality of services and the user account is associated with a user identity and one or more user-defined personas. Each persona may be configured to access applications, user account data, and different services in the plurality of services.

In some implementations, the instructions further include in response to determining that the inner entity has been provisioned to access the user account beyond a threshold number of days, generating a tenured status for the inner entity and enabling devices with the tenured status to delete other tenured devices with a time delay policy, the time delay policy indicating a wait time before revocation of access to the user account.

In a third general aspect, a is described that includes memory and at least one processor coupled to the memory. The at least one processor is configured to perform operations include generating, by an electronic device, a public key and a private key for a user account associated with the electronic device, generating, by the electronic device, a first inner account block of a blockchain for the user account. The first inner account block may include an identifier for the user account, the public key for the user account, encrypted data for the user account, and a signature over contents of the first inner account block using the private key for the user account on the electronic device. The operations further include generating a second inner account block of the blockchain where the second inner account block being signed by the private key for the user account and including a list of electronic devices with access to the user account or access to encrypted user account data. The operations further include providing, using the identifier associated with the user account, the blockchain to a plurality of other devices and controlling access to the user account based on portions of the blockchain.

In some implementations, the operations further include in response to verifying that a second device, configured as an outer entity and requesting account access, has user consent to access the user account, generating a first outer account block of the blockchain, the first outer account block including the identifier for the user account, a public key verified to be generated by the second device, encrypted data for the user account, and a signature over the contents of the first outer account block using a private key for the user account on the second device and providing, using the identifier associated with the user account, the blockchain to a plurality of other devices, and controlling access to the user account based on portions of the blockchain.

In some implementations, the operations further include generating a second outer account block of the blockchain, the second outer account block including a different list of outer entities with access to the user account, the second outer account block being signed by the private key for the user account on a third device, verifying that the second outer account block is signed by the private key for the user account on the third device, providing, using the identifier associated with the user account, the blockchain to a plurality of other devices, and controlling access to the user account based on portions of the blockchain.

In some implementations, the first inner account block further includes an inner entity revocation time that represents a last known (e.g., determined, logged) timestamp in which the electronic device performed a revocation of another device. In some implementations, the electronic device is an inner entity, and the operations further include in response to determining that the inner entity has been provisioned to access the user account beyond a threshold number of days, generating a tenured status for the inner entity and enabling devices with the tenured status to delete other tenured devices with a time delay policy, the time delay policy indicating a wait time before revocation of access to the user account.

Implementations of the described techniques may include hardware, a method or process, and/or computer software on a computer-accessible medium. The details of one or more implementations are set forth in the accompanying drawings and the description below. Other features will be apparent from the description and drawings, and from the claims.

Figure 57:
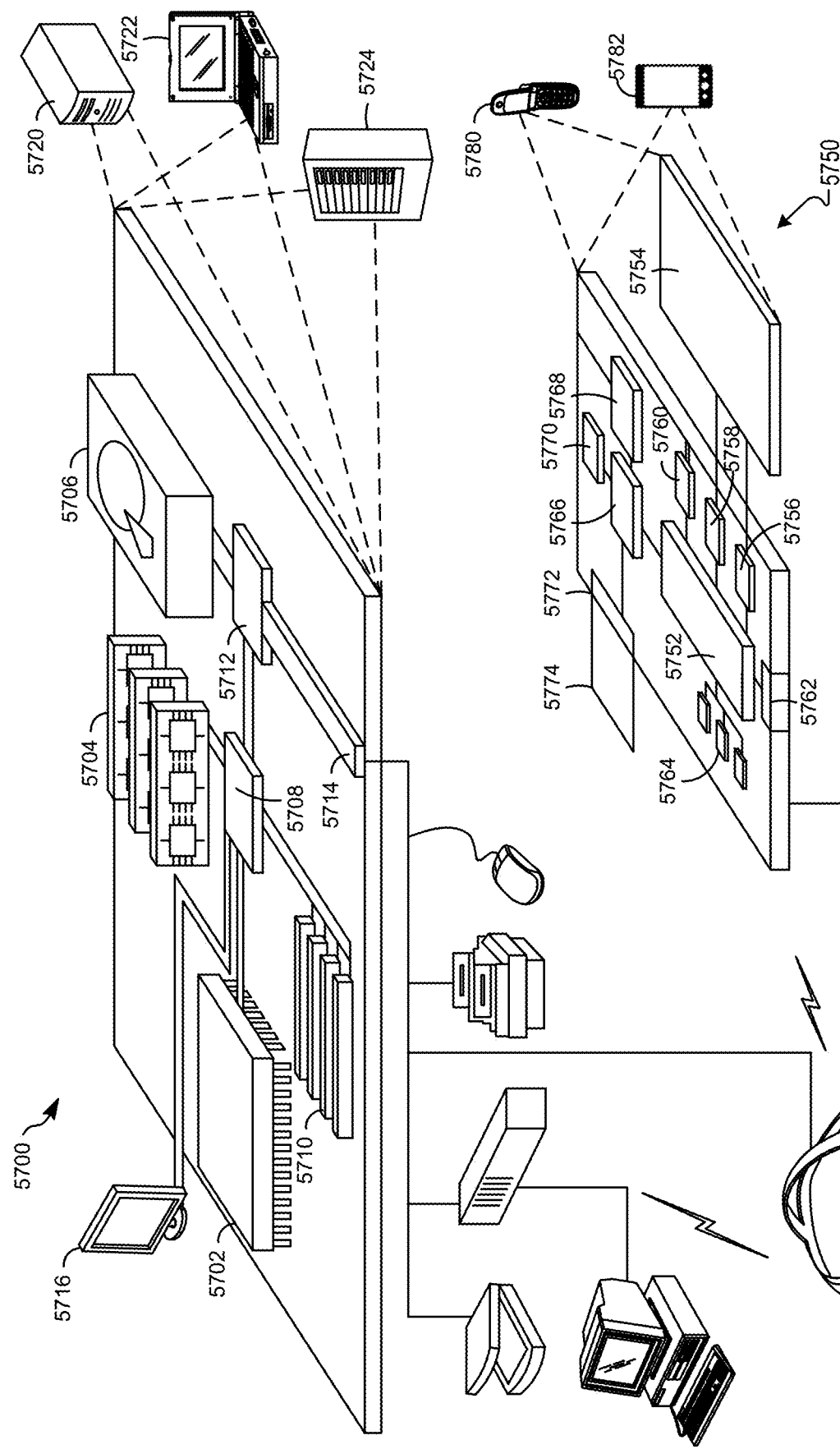
FIG. 57 is an example of a computer device and a mobile computer device that can be used to implement the techniques described herein.

FIG. 57 shows an example of a computer device 5700 and a mobile computer device 5750, which may be used with the techniques described here. Computing device 5700 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 5750 is intended to represent various forms of mobile devices, such as personal digital assistants, cellular telephones, smart phones, and other similar computing devices. The components shown here, their connections and relationships, and their functions, are meant to be exemplary, and are not meant to limit implementations of the techniques described and/or claimed in this document.

Computing device 5700 includes a processor 5702, memory 5704, a storage device 5706, a high-speed interface 5708 connecting to memory 5704 and high-speed expansion ports 5710, and a low speed interface 5712 connecting to low speed bus 5714 and storage device 5706. The processor 5702 can be a semiconductor-based processor. The memory 5704 can be a semiconductor-based memory. Each of the components 5702, 5704, 5706, 5708, 5710, and 5712, are interconnected using various busses, and may be mounted on a common motherboard or in other manners as appropriate. The processor 5702 can process instructions for execution within the computing device 5700, including instructions stored in the memory 5704 or on the storage device 5706 to display graphical information for a GUI on an external input/output device, such as display 5716 coupled to high speed interface 5708. In other implementations, multiple processors and/or multiple buses may be used, as appropriate, along with multiple memories and types of memory. Also, multiple computing devices 5700 may be connected, with each device providing portions of the operations (e.g., as a server bank, a group of blade servers, or a multi-processor system).

The memory 5704 stores information within the computing device 5700. In one implementation, the memory 5704 is a volatile memory unit or units. In another implementation, the memory 5704 is a non-volatile memory unit or units. The memory 5704 may also be another form of computer-readable medium, such as a magnetic or optical disk. In general, the computer-readable medium may be a non-transitory computer-readable medium.

The storage device 5706 is capable of providing mass storage for the computing device 5700. In one implementation, the storage device 5706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 5704, the storage device 5706, or memory on processor 5702.

The high speed controller 5708 manages bandwidth-intensive operations for the computing device 5700, while the low speed controller 5712 manages lower bandwidth-intensive operations. Such allocation of functions is exemplary only. In one implementation, the high-speed controller 5708 is coupled to memory 5704, display 5716 (e.g., through a graphics processor or accelerator), and to high-speed expansion ports 5710, which may accept various expansion cards (not shown). In the implementation, low-speed controller 5712 is coupled to storage device 5706 and low-speed expansion port 5714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 5700 may be implemented in a number of different forms, as shown in the figure. For example, it may be implemented as a standard server 5720, or multiple times in a group of such servers. It may also be implemented as part of a rack server system 5724. In addition, it may be implemented in a personal computer such as a laptop computer 5722. Alternatively, components from computing device 5700 may be combined with other components in a mobile device (not shown), such as device 5750. Each of such devices may contain one or more of computing device 5700, 5750, and an entire system may be made up of multiple computing devices 5700, 5750 communicating with each other.

Computing device 5750 includes a processor 5752, memory 5764, an input/output device such as a display 5754, a communication interface 5766, and a transceiver 5768, among other components. The device 5750 may also be provided with a storage device, such as a microdrive or other device, to provide additional storage. Each of the components 5750, 5752, 5764, 5754, 5766, and 5768, are interconnected using various buses, and several of the components may be mounted on a common motherboard or in other manners as appropriate.

The processor 5752 can execute instructions within the computing device 5750, including instructions stored in the memory 5764. The processor may be implemented as a chipset of chips that include separate and multiple analog and digital processors. The processor may provide, for example, for coordination of the other components of the device 5750, such as control of user interfaces, applications run by device 5750, and wireless communication by device 5750.

Processor 5752 may communicate with a user through control interface 5758 and display interface 5756 coupled to a display 5754. The display 5754 may be, for example, a TFT LCD (Thin-Film-Transistor Liquid Crystal Display) or an OLED (Organic Light Emitting Diode) display, or other appropriate display technology. The display interface 5756 may comprise appropriate circuitry for driving the display 5754 to present graphical and other information to a user. The control interface 5758 may receive commands from a user and convert them for submission to the processor 5752. In addition, an external interface 5762 may be provided in communication with processor 5752, so as to enable near area communication of device 5750 with other devices. External interface 5762 may provide, for example, for wired communication in some implementations, or for wireless communication in other implementations, and multiple interfaces may also be used.

The memory 5764 stores information within the computing device 5750. The memory 5764 can be implemented as one or more of a computer-readable medium or media, a volatile memory unit or units, or a non-volatile memory unit or units. Expansion memory 5774 may also be provided and connected to device 5750 through expansion interface 5772, which may include, for example, a SIMM (Single In Line Memory Module) card interface or a DIMM (Dual In Line Memory Module). Such expansion memory 5774 may provide extra storage space for device 5750, or may also store applications or other information for device 5750. Specifically, expansion memory 5774 may include instructions to carry out or supplement the processes described above, and may include secure information also. Thus, for example, expansion memory 5774 may be provided as a security module for device 5750, and may be programmed with instructions that permit secure use of device 5750. In addition, secure applications may be provided via the SIMM or DIMM cards, along with additional information, such as placing identifying information on the SIMM or DIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 5764, expansion memory 5774, or memory on processor 5752, that may be received, for example, over transceiver 5768 or external interface 5762.

Device 5750 may communicate wirelessly through communication interface 5766, which may include digital signal processing circuitry if applicable. Communication interface 5766 may provide for communications under various modes or protocols, such as GSM voice calls, SMS, EMS, or MMS messaging, CDMA, TDMA, PDC, WCDMA, CDMA, or GPRS, among others. Such communication may occur, for example, through radio-frequency transceiver 5768. In addition, short-range communication may occur, such as using a Bluetooth, Wi-Fi, or other such transceiver (not shown). In addition, GPS (Global Positioning System) receiver module 5770 may provide additional navigation- and location-related wireless data to device 5750, which may be used as appropriate by applications running on device 5750.

Device 5750 may also communicate audibly using audio codec 5760, which may receive spoken information from a user and convert it to usable digital information. Audio codec 5760 may likewise generate audible sound for a user, such as through a speaker, e.g., in a handset of device 5750.

Such sound may include sound from voice telephone calls, may include recorded sound (e.g., voice messages, music files, etc.) and may also include sound generated by applications operating on device 5750.

The computing device 5750 may be implemented in a number of different forms, as shown in the figure. For example, it may be implemented as a cellular telephone 5780. It may also be implemented as part of a smart phone 5782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to the embodiments set forth herein.

The terminology used herein is for the purpose of describing particular embodiments and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A system comprising:
   a plurality of devices configured with a portable user account to synchronize account events to a distributed log, the plurality of devices including a first provisioned device that includes memory and at least one processor configured to execute operations, the operations comprising:
   in response to receiving, by the first provisioned device and from a non-provisioned device, a request to access the portable user account:
      triggering a query to determine access rights for the non-provisioned device, the request including information associated with the non-provisioned device, the information associated with the non-provisioned device identifying a block author for a device configured as an inner entity;
   in response to receiving an approval response to the query:
      assigning a provision status to the non-provisioned device, the provision status indicating whether the non-provisioned device is assigned as an inner entity or as an outer entity for the portable user account;
      determining, using a valid account block retrieved from the distributed log, whether the block author from the request is identified in the valid account block;
      in response to the block author from the request being determined as identified in the valid account block, providing, for the non-provisioned device, access to at least a subset of the portable user account according to the provision status; and
      updating the distributed log to include the non-provisioned device as a second provisioned device for the portable user account based on the provision status.

2. The system of claim 1, wherein the information associated with the non-provisioned device includes at least one unique access key.

3. The system of claim 1, wherein the operations further comprise:
   in response to receiving a disapproval response to the query:
      denying access to the portable user account for the non-provisioned device; and
      updating the distributed log to include an event corresponding to the query.

4. The system of claim 1, wherein updating the distributed log comprises:
   generating a device access event by generating a new block for the distributed log; and
   appending the new block in the distributed log to record the request and the device access event in the distributed log.

5. The system of claim 1,
wherein assigning the provision status includes assigning the non-provisioned device as the inner entity, the inner entity configured to add an additional device to the plurality of devices or remove a device from the plurality of devices, wherein the inner entity is configured to delay addition of the additional device or delay removal of the device according to a policy associated with the portable user account.

6. The system of claim 1, wherein the first provisioned device includes a mobile device configured as the inner entity, the inner entity being capable of maintaining the portable user account in combination with other provisioned inner entities in a local log configured to synchronize with the distributed log using distributed log transactions, the portable user account being a self-sovereign identity account.

7. The system of claim 1, wherein the operations further comprise:
generating a recovery account for the portable user account, the recovery account being generated as a recovery block in the distributed log, the recovery block including at least a timestamp at which the recovery account becomes valid, an identity of a service provider configured to provide access to the portable user account, and an encrypted key readable both by devices provisioned as inner entities and by the service provider during recovery;
in response to detecting use of the recovery account, generating a recovery account access event by generating a new block for the distributed log; and
appending the new block in the distributed log to memorialize the recovery account access event in the distributed log.

8. The system of claim 1, wherein the portable user account is associated with a plurality of personae, each of the plurality of personae configured to:
obfuscate an identity of a user associated with the portable user account; and
include customized data for the portable user account that disassociates others of the plurality of personae.

9. A computer-implemented method comprising:
in response to receiving a request, at a first provisioned device of a plurality of devices configured to synchronize account events associated with a portable user account to a distributed log, to access to the portable user account:
triggering a query to determine access rights for a non-provisioned device, the request including information associated with the non-provisioned device, the information associated with the non-provisioned device identifying a block author for a device configured as an inner entity;
in response to receiving an approval response to the query:
assigning a provision status to the non-provisioned device, the provision status indicating whether the non-provisioned device is assigned as an inner entity or as an outer entity for the portable user account;
determining, using a valid account block retrieved from the distributed log, whether the block author from the request is identified in the valid account block;
in response to the block author from the request being determined as identified in the valid account block, providing, for the non-provisioned device, access to at least a subset of the portable user account according to the provision status, and
updating the distributed log to include the non-provisioned device as a second provisioned device based on the provision status.

10. The computer-implemented method of claim 9, wherein the information associated with the non-provisioned device includes at least one unique access key.

11. The computer-implemented method of claim 9, further comprising:
in response to receiving a disapproval response to the query:
denying access to the portable user account for the non-provisioned device; and
updating the distributed log to include an event corresponding to the query.

12. The computer-implemented method of claim 9, wherein the portable user account is provisioned on a mobile device configured as an inner entity, the inner entity being capable of maintaining the portable user account in combination with other provisioned inner entities in a local log configured to synchronize with the distributed log using distributed log transactions, the portable user account being a self-sovereign identity account.

13. The computer-implemented method of claim 9, further comprising:
generating a recovery account for the portable user account, the recovery account being generated as a recovery block in the distributed log, the recovery block including at least a timestamp at which the recovery account becomes valid, an identity of a service provider configured to provide access to the portable user account, and an encrypted key readable both by devices provisioned as inner entities and by the service provider during recovery;
in response to detecting use of the recovery account, generating a recovery account access event by generating a new block for the distributed log; and
appending the new block in the distributed log to memorialize the recovery account access event in the distributed log.

14. The computer-implemented method of claim 9, wherein the portable user account is associated with a plurality of personae, each of the plurality of personae configured to:
obfuscate an identity of a user associated with the portable user account; and
include customized data for the portable user account that disassociates others of the plurality of personae.

15. A non-transitory computer-readable medium comprising:
at least one processor; and
a memory storing instructions that, when executed by the at least one processor, cause the at least one processor to execute operations, the operations comprising:
generating a portable user account on an electronic device, the portable user account configured to store account data, grant access rights to devices provisioned for the portable user account, and synchronize events associated with the portable user account to a distributed log capable of negotiating transactions corresponding to the events;
in response to receiving, at a provisioned device and from a non-provisioned device, a request to access the portable user account;
triggering a query to determine access rights for the non-provisioned device, the request including information associated with the non-provisioned device, the information associated with the non-provisioned device identifying a block author for a device configured as an inner entity;

in response to receiving an approval response to the query:
assigning a provision status to the non-provisioned device, the provision status assigning the non-provisioned device a provision status as an inner entity or as an outer entity for the portable user account;
determining, using a valid account block retrieved from the distributed log, whether the block author from the request is identified in the valid account block;
in response to the block author from the request being determined as identified in the valid account block, providing, for the non-provisioned device, access to at least a subset of the portable user account according to the provision status; and
updating the distributed log to include the non-provisioned device as a provisioned device for the portable user account based on the provision status.

16. The non-transitory computer-readable medium of claim 15, wherein the operations further comprise:
in response to receiving a disapproval response to the query:
denying access to the portable user account for the non-provisioned device; and
updating the distributed log to include an event corresponding to the query.

17. The non-transitory computer-readable medium of claim 15, wherein the portable user account is provisioned on a mobile device configured as an inner entity, the inner entity being capable of maintaining the portable user account in combination with other provisioned inner entities in a local log configured to synchronize with the distributed log using distributed log transactions, the portable user account being a self-sovereign identity account.

18. The non-transitory computer-readable medium of claim 15, wherein the operations further comprise:
generating, using the electronic device, a recovery account for the portable user account, the recovery account being generated as a recovery block in the distributed log, the recovery block including at least:
a timestamp at which the recovery account becomes valid,
an identity of a service provider configured to provide access to the portable user account; and
an encrypted key readable by devices provisioned as inner entities;
in response to detecting use of the recovery account, generating a recovery account access event by generating a new event for the distributed log; and
appending the new event in the distributed log to memorialize the recovery account access event.

19. The system of claim 1, wherein the information associated with the non-provisioned device includes an account block creation time, wherein the operations further comprise:
determining whether the account block creation time is identified in the valid account block.

* * * * *